US009958561B2

(12) United States Patent
Bellinger et al.

(10) Patent No.: US 9,958,561 B2
(45) Date of Patent: May 1, 2018

(54) APPARATUS AND METHOD FOR THE DETERMINATION OF ONE OR MORE NEUTRON SOURCE CHARACTERISTICS

(71) Applicants: Steven L. Bellinger, Manhattan, KS (US); Simon Bolding, Garden City, KS (US); Anthony N. Caruso, Overland Park, KS (US); Brian Cooper, Manhattan, KS (US); Joseph A. Crow, Raytown, MO (US); James Currie, Kansas City, MO (US); Ryan G. Fronk, Manhattan, KS (US); Cory B. Hoshor, Kansas City, MO (US); Douglas S. McGregor, Riley, KS (US); William H. Miller, Rocheport, MO (US); Eliot R. Myers, Kansas City, MO (US); Thomas M. Oakes, Albuquerque, NM (US); Brent J. Rogers, Columbia, MO (US); John K. Shultis, Manhattan, KS (US); Philip B. Ugorowski, Manhattan, KS (US); Stephen M. Young, Columbia, MO (US)

(72) Inventors: Steven L. Bellinger, Manhattan, KS (US); Simon Bolding, Garden City, KS (US); Anthony N. Caruso, Overland Park, KS (US); Brian Cooper, Manhattan, KS (US); Joseph A. Crow, Raytown, MO (US); James Currie, Kansas City, MO (US); Ryan G. Fronk, Manhattan, KS (US); Cory B. Hoshor, Kansas City, MO (US); Douglas S. McGregor, Riley, KS (US); William H. Miller, Rocheport, MO (US); Eliot R. Myers, Kansas City, MO (US); Thomas M. Oakes, Albuquerque, NM (US); Brent J. Rogers, Columbia, MO (US); John K. Shultis, Manhattan, KS (US); Philip B. Ugorowski, Manhattan, KS (US); Stephen M. Young, Columbia, MO (US)

(73) Assignees: The Curators of the University of Missouri, Columbia, MO (US); Kansas State University Research Foundation, Manhattan, KS (US)

(*) Notice: Subject to any disclaimer, the term of this patent is extended or adjusted under 35 U.S.C. 154(b) by 0 days. days.

(21) Appl. No.: 15/289,955

(22) Filed: Oct. 10, 2016

(65) Prior Publication Data
US 2017/0153340 A1    Jun. 1, 2017

Related U.S. Application Data

(63) Continuation-in-part of application No. 14/544,924, filed on Mar. 5, 2015, now Pat. No. 9,465,120, which
(Continued)

(51) Int. Cl.
*G01T 3/06* (2006.01)
*G01T 3/08* (2006.01)

(52) U.S. Cl.
CPC ............ *G01T 3/065* (2013.01); *G01T 3/085* (2013.01)

(58) Field of Classification Search
CPC ............ G01T 3/035; G01T 3/08; G01T 3/085
See application file for complete search history.

(56) References Cited

U.S. PATENT DOCUMENTS

| 4,593,195 A * | 6/1986 | Bienfait ............... G01V 5/107 250/253 |
| 2012/0223242 A1* | 9/2012 | Brown .................. G01T 3/008 250/391 |
| 2013/0048849 A1* | 2/2013 | Li ........................ G01V 5/101 250/269.8 |

* cited by examiner

*Primary Examiner* — David Porta
*Assistant Examiner* — Faye Boosalis
(74) *Attorney, Agent, or Firm* — Suiter Swantz pc llo

(57) ABSTRACT

A neutron detection apparatus includes a neutron detector and an analyzer. The neutron detector includes a plurality of neutron detector assemblies, where each of the neutron detector assemblies includes a plurality of neutron detection devices. The neutron detector also includes a moderating volume. The plurality of neutron detector assemblies are disposed within the moderating volume so as to form a three-dimensional array of neutron detection devices within
(Continued)

the moderating volume. The analyzer is communicatively coupled to each of the neutron detection devices of the plurality of neutron detector assemblies. The analyzer configured to receive one or more measured response signals from each of the neutron detection devices, and perform one or more analysis procedures to determine one or more characteristics associated with the one or more neutron sources based at least on the received one or more measured response signals.

53 Claims, 41 Drawing Sheets

Related U.S. Application Data is a continuation-in-part of application No. 13/694,104, filed on Oct. 29, 2012, now Pat. No. 9,081,100, application No. 15/289,955, which is a continuation-in-part of application No. 14/716,678, filed on May 19, 2015, now Pat. No. 9,625,590, which is a continuation of application No. 13/694,104, filed on Oct. 29, 2012, now Pat. No. 9,081,100, application No. 15/289,955, which is a continuation-in-part of application No. 13/391,585, filed as application No. PCT/US2010/046188 on Aug. 20, 2010, now abandoned.

(60) Provisional application No. 61/274,753, filed on Aug. 20, 2009, provisional application No. 61/274,689, filed on Aug. 20, 2009, provisional application No. 61/966,878, filed on Mar. 5, 2014, provisional application No. 61/198,413, filed on Oct. 27, 2011.

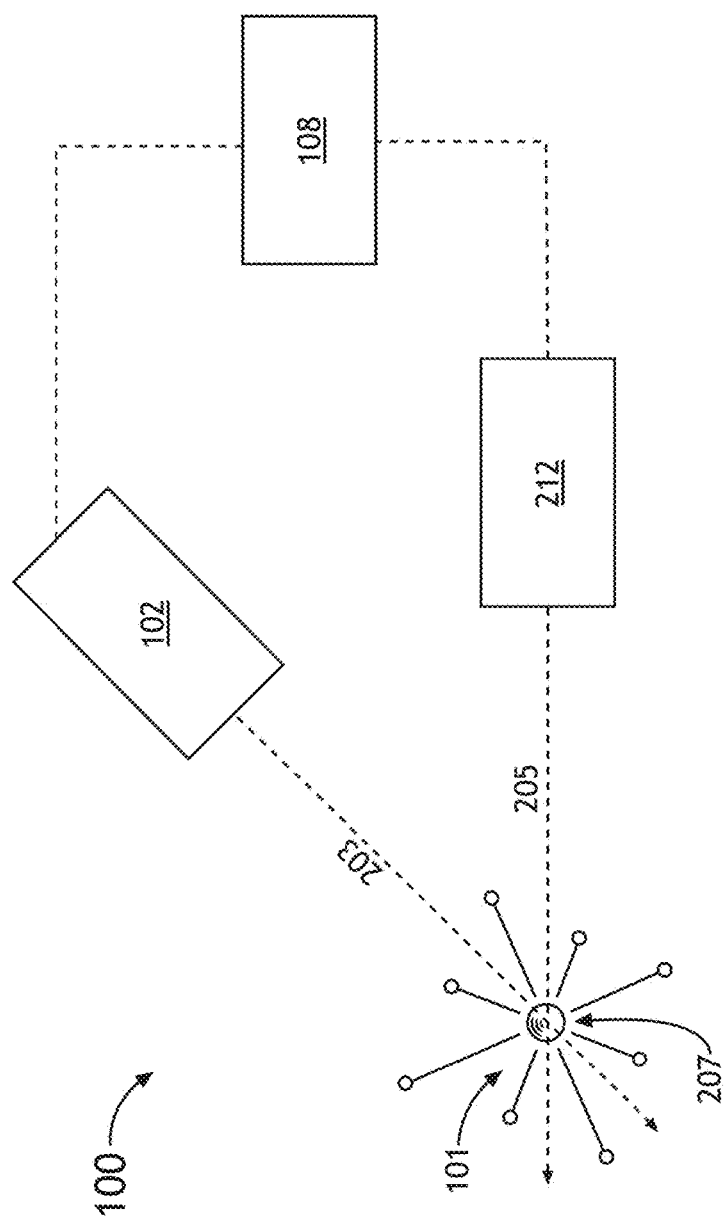

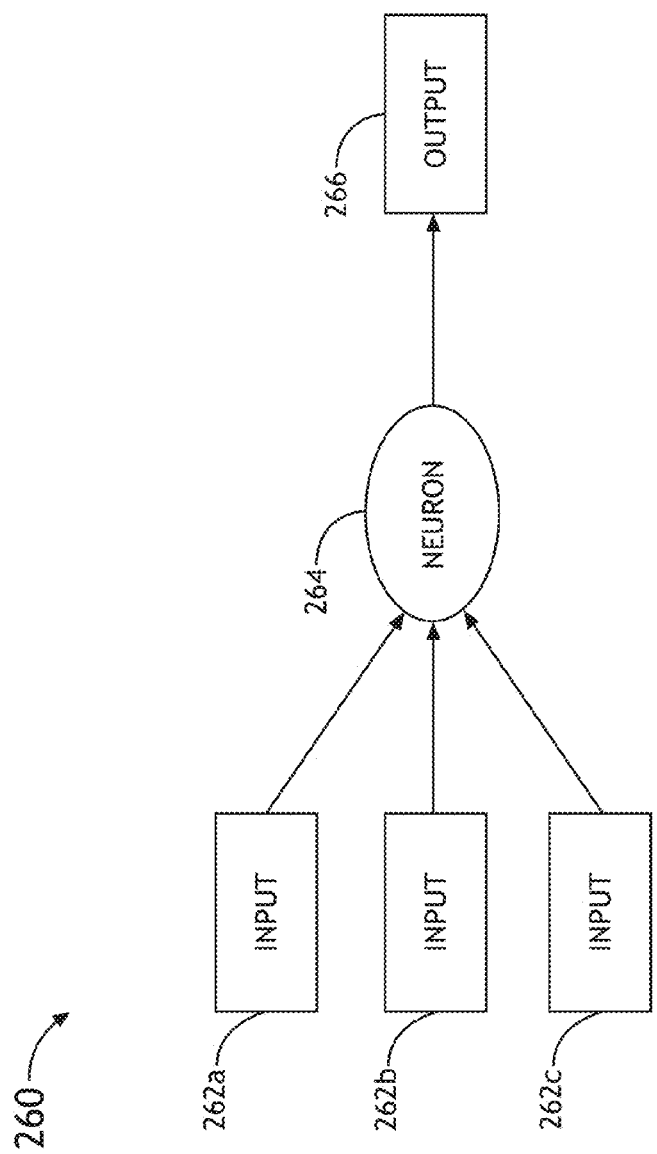

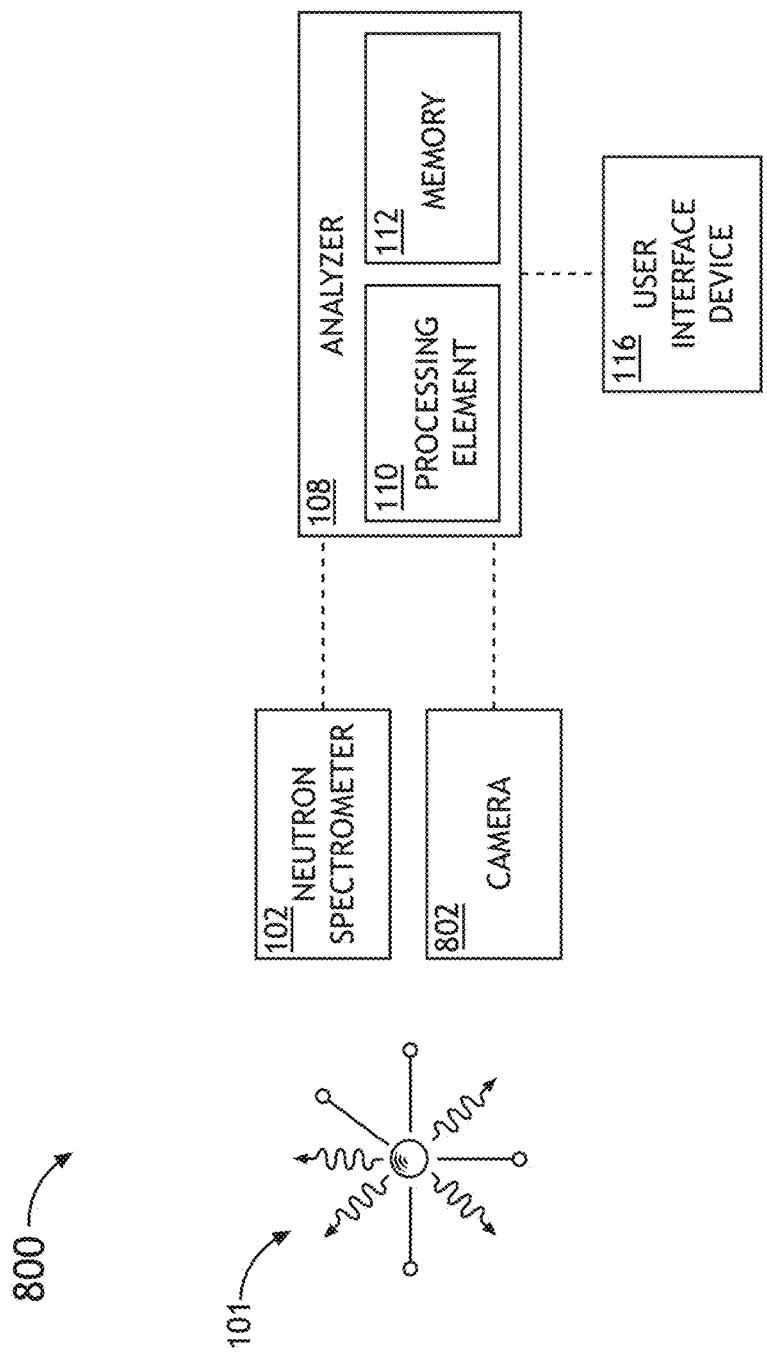

APPARATUS AND METHOD FOR THE DETERMINATION OF ONE OR MORE NEUTRON SOURCE CHARACTERISTICS

CROSS-REFERENCE TO RELATED APPLICATION

The present application is related to and claims the benefit of the earliest available effective filing date(s) from the following listed application(s). The present application constitutes a continuation-in-part application of co-pending U.S. application Ser. No. 14/544,924, filed on Mar. 5, 2015, which claims the benefit of U.S. Provisional Patent Application No. 61/966,878, filed on Mar. 5, 2014, and also constitutes a continuation-in-part of U.S. application Ser. No. 13/694,104, filed on Oct. 29, 2012, which claims the benefit of U.S. Provisional Patent Application No. 61/198,413, filed on Oct. 27, 2011. In addition, the present application constitutes a continuation-in-part of U.S. application Ser. No. 14/716,678, filed May 19, 2015, which constitutes a continuation of U.S. application Ser. No. 13/694,104, filed Oct. 29, 2012, which claims priority to U.S. Provisional Patent Application No. 61/198,413, filed Oct. 27, 2011. In addition, the present application constitutes a continuation-in-part of U.S. application Ser. No. 13/391,585, filed Feb. 21, 2012, which constitutes a national stage of PCT/US2010/046188, filed Aug. 20, 2010, which claims priority to U.S. Provisional Patent Application No. 61/274,689, filed Aug. 20, 2009; and U.S. Provisional Patent Application No. 61/274,753, filed Aug. 20, 2009. Each of the above-listed applications is incorporated herein by reference in the entirety.

STATEMENT REGARDING FEDERALLY SPONSORED RESEARCH OR DEVELOPMENT

This invention was made with government support under Award N00014-11-1-0157 awarded by the Office of Naval Research. The government has certain rights in the invention.

TECHNICAL FIELD

The present invention generally relates to a method and apparatus for one or more characteristics of a neutron source, and more particularly to a neutron detection system allowing for more efficient detection of neutrons.

BACKGROUND

Neutron source localization and identification using passive real-time collection of the neutron source emissions requires measurement and comparison of distinguishing features from the given neutron emitting source. Distinguishing features at or greater than one meter (i.e., not primary beta or alpha particles) include x-rays, gamma-rays, and/or neutrons, although one normally only measures the photon intensity, photon energy spectrum, neutron intensity, or neutron energy spectrum. Current instruments merely individually measure quantities proportional to the neutron energy spectra or photon energy spectra from the neutron source. These systems lack accuracy, precision and portability. Therefore, it would be desirable to provide an apparatus and method for curing the shortcomings of current instruments such as those of the identified above.

SUMMARY

An apparatus for determination of one or more neutron source characteristics is disclosed, in accordance with one or more embodiments of the present disclosure. In one embodiment, the apparatus includes a neutron detector. In another embodiment, the neutron detector includes a plurality of neutron detector assemblies, each of the neutron detector assemblies including a plurality of neutron detection devices, wherein the neutron detection devices are configured to detect one or more characteristics of neutrons emanating from one or more neutron sources and impinging on the one or more neutron detection devices. In another embodiment, the neutron detector includes a moderating volume, wherein the plurality of neutron detector assemblies are disposed within the moderating volume so as to form a three-dimensional array of neutron detection devices within the moderating volume, wherein the moderating volume is configured to moderate the energy of neutrons impinging on one or more of the neutron detector assemblies. In another embodiment, the apparatus includes an analyzer communicatively coupled to each of the neutron detection devices of the plurality of neutron detector assemblies. In another embodiment, the analyzer is configured to receive one or more measured response signals from each of the neutron detection devices, the one or more measured response signals indicative of a detected neutron event. In another embodiment, the analyzer is configured to perform one or more analysis procedures to determine one or more characteristics associated with the one or more neutron sources based at least on the received one or more measured response signals.

An apparatus for determination of one or more neutron source characteristics is disclosed, in accordance with one or more additional embodiments of the present disclosure. In one embodiment, the apparatus includes a neutron-photon detector. In another embodiment, the neutron-photon detector includes a plurality of neutron-photon detector assemblies, each of the neutron-photon detector assemblies including a plurality of detection devices, wherein the detection devices are configured to detect one or more characteristics of at least one of neutrons or photons emanating from one or more neutron sources and impinging on one or more of the detection devices. In another embodiment, the neutron-photon detector includes a moderating volume, wherein the plurality of neutron-photon detector assemblies are disposed within the moderating volume so as to form a three-dimensional array of detection devices within the moderating volume, wherein the moderating volume is configured to moderate the energy of neutrons impinging on one or more of the neutron detector assemblies. In another embodiment, the apparatus includes an analyzer communicatively coupled to each of the detection devices of the plurality of neutron-photon detector assemblies. In one embodiment, the analyzer is configured to receive one or more measured response signals from each of the detection devices, the one or more measured response signals indicative of at least one of a detected neutron event or a detected photon event. In another embodiment, the analyzer is configured to determine one or more characteristics of the one or more neutron sources based on the received one or more measured response signals.

An apparatus for determination of one or more neutron source characteristics is disclosed, in accordance with one or more additional embodiments of the present disclosure. In one embodiment, the apparatus includes a neutron detector. In another embodiment, the neutron detector includes a plurality of neutron detector assemblies, each of the neutron detector assemblies including a plurality of neutron detection devices, wherein the neutron detection devices are configured to detect one or more characteristics of neutrons emanating from one or more sources and impinging on one or more of the neutron detection devices. In another embodiment, the neutron detector includes a moderating volume, wherein the plurality of neutron detector assemblies are disposed within the moderating volume so as to form a three-dimensional array of neutron detection devices within the moderating volume. In another embodiment, the apparatus includes a photon detector disposed at a location remote from the neutron detector. In another embodiment, the apparatus includes an analyzer communicatively coupled to each of the neutron detection devices of the plurality of neutron detector assemblies, the analyzer communicatively coupled to the photon detector. In another embodiment, the analyzer is configured to receive one or more measured neutron response signals from each of the neutron detection devices, the one or more measured response signals indicative of a detected neutron event. In another embodiment, the analyzer is configured to receive one or more measured photon response signals from the photon detector indicative of a detected photon event. In another embodiment, the analyzer is configured to determine one or more characteristics of the one or more neutron sources based on the received one or more measured neutron response signals and the received one or more measured photon response signals. In another embodiment, the analyzer is configured to perform a measurement fusion process on the one or more neutron response signals and the one or more photon response signals to form a combined response signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention

BRIEF DESCRIPTION OF THE DRAWINGS

The numerous advantages of the disclosure may be better understood by those skilled in the art by reference to the accompanying figures in which:

FIG. 2I illustrates a detection volume of a detector broken into octants, in accordance with one or more embodiment of the present disclosure;

FIG. 2N illustrates a block diagram view of a detection system equipped with an additional neutron detector/spectrometer for determining a location of one or more neutron sources, in accordance with one or more embodiments of the present disclosure;

FIG. 2O illustrates a conceptual view of the operation of an artificial neural network, in accordance with one or more embodiments of the present disclosure;

FIG. 8A illustrates a detection system for mapping a location of a neutron source to imagery data, in accordance with one or more embodiments of the present disclosure;

DETAILED DESCRIPTION OF THE INVENTION

Figure 1A:
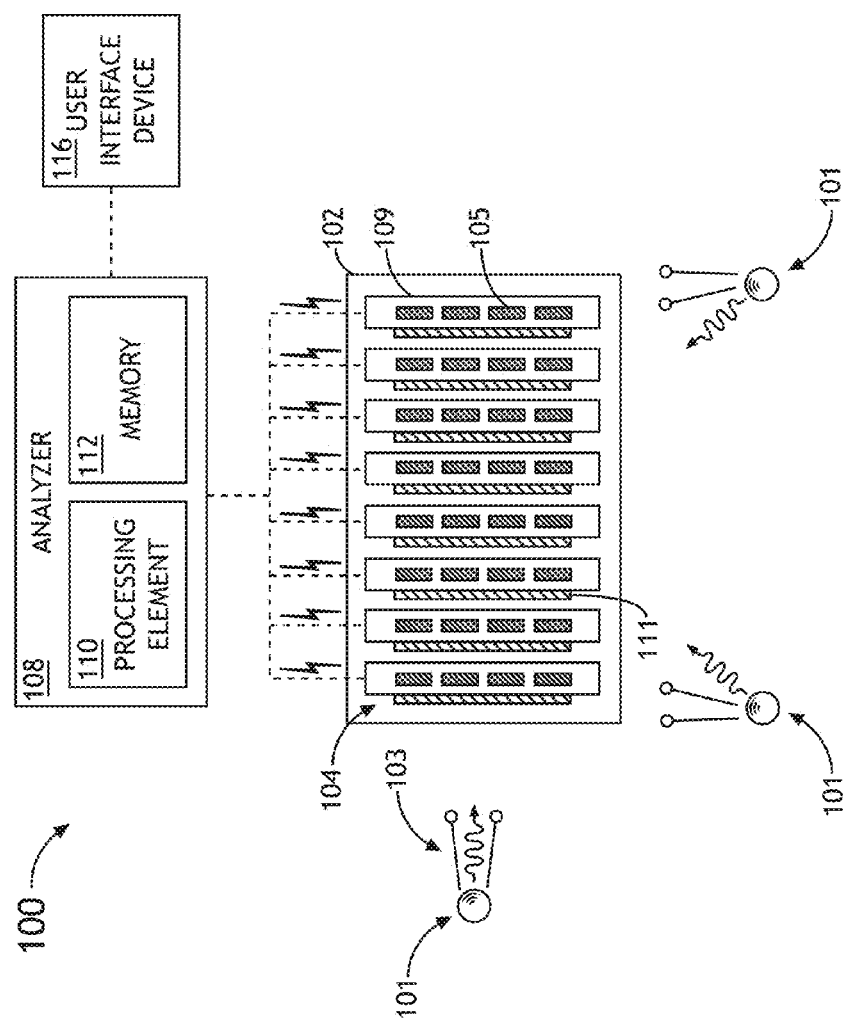
FIG. 1A illustrates a block diagram view of a detection system, in accordance with one or more embodiments of the present disclosure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1A through 9, one or more detection systems suitable for determination of one or more neutron source characteristics are described in accordance with the present disclosure. Embodiments of the present disclosure are directed to a measurement system capable of directly and/or indirectly measuring characteristics associated with a neutron-emitting source through the measurement of neutron and/or photon (e.g., x-ray or gamma-ray) characteristics. For example, the detection system of the present disclosure may directly and/or indirectly measure characteristics associated with a neutron-emitting source by measuring any one or more of neutron intensity, photon intensity, neutron energy and photon energy. In addition, some embodiments of the present disclosure serve to determine a direction and/or location of a neutron source from the detection system of the present disclosure. Additional embodiments of the present disclosure provide for the identification of a neutron source and/or the local configuration (e.g., surrounding shielding and/or moderating materials). Embodiments of the present disclosure may also determine neutron dose and neutron kinetic energy.

It is further noted that materials used to attenuate (shield) or moderate a photon or neutron source may be useful in identifying the presence and type of photon or neutron source, and potentially, the intended application of said source. For instance, when shielding and/or moderating material is in range of a radioactive material, characteristic photons and/or neutrons may be generated. The intensity and/or noise range of the photons and/or neutrons emitted from the shielding and/or moderating material may provide for better analysis of the photon/neutron source than the characteristic photons and/or neutrons of the originating source. Because certain naturally occurring isotopes are used in conjugation with certain radioactive isotopes to fabricate unique nuclear and/or radiological devices, libraries of such combinations may be used to identify the probable application of the combination of such identified isotopes.

Some embodiments of the present disclosure provide for the combination of photon and neutron sensitive elements to yield a photon-neutron sensitive spectroscopy/detector instrument. Such an instrument is designed to be man-portable for real-time passive sensing missions, but may be adapted for vehicle or static mounting.

Additional embodiments of the present disclosure provide for the combination of outputs from individual photon and neutron sensitive spectrometer/detector devices or instruments to yield improved detection and analysis results. A variety of analysis techniques may be utilized to combine the output data from the neutron and photon sensitive devices and/or instruments. For instance, template-matching methods (e.g., cross-correlation method, goodness-of-fit method), machine learning techniques and/or other correlation methods may be used to analyze combined neutron and photon data streams to output a unique result.

The neutron and photon detectors can be derived from the same active material, or, may be separate, although both are part of one instrument or system. It is also possible to fuse the measurements from two separate instruments (e.g., one for neutron spectroscopy and one for photon spectroscopy) to yield more information, with the analysis methods disclosed here, than is possible by the individual instruments and their analysis methods alone. Features of the instruments and analysis methods described herein may include the ability to determine the following: (1) presence of a neutron source with greater certainty than is afforded by a photon or neutron counting instrument alone; (2) relative direction of or to a neutron source with greater accuracy than the previous approaches; (3) distance to a neutron source without a coded aperture; (4) neutron source type with greater certainty than is afforded by neutron or photon spectroscopy methods alone; (5) neutron source type with greater accuracy than is afforded by prior neutron spectroscopy or identification methods; (6) neutron kinetic energy spectrum with greater accuracy than is afforded by prior deconvolution techniques; (7) elements (or isotopes) comprising shielding and/or moderating materials surrounding a radioactive material; (8) neutron dose with greater accuracy.

It is noted that a number of analysis procedures may be applied to determine one or more characteristics associated with a given neutron source. In one embodiment, one or more spatial analysis procedures may be implemented to determine one or more characteristics associated with one or more neutron sources (e.g., direction/location). In another embodiment, one or more template-matching procedures may be implemented to determine one or more characteristics associated with one or more neutron sources (e.g., direction/location, a neutron dose, source identification, etc.). In another embodiment, one or more machine learning procedures may be implemented to determine one or more characteristics associated with one or more neutron sources (e.g., direction/location, a neutron dose, kinetic energy of incident neutrons, source identification, etc.).

In some embodiments, improved source localization is accomplished by the combination of the moderating type neutron spectrometer geometry of the detector-moderator elements and the gamma-ray analysis methods. The moderating type neutron spectrometer geometry allows for very high absolute and intrinsic neutron detection efficiency over the thermal to top end of the evaporation neutron spectrum range. The gamma-ray analysis methods include algorithms that look for, not only the direct gamma-rays from the potential source material, but the interaction of the source materials primary emissions with materials in its proximity.

In some embodiments, the relative direction to a neutron emitting source may be determined by neutrons alone using the moderating type neutron spectrometer geometry. A number of analysis methods are described throughout the present disclosure. In one embodiment, one or more spatial analysis procedures (e.g., detection volume ratio or vectorization) are applied. In another embodiment, one or more a template-matching procedures are applied. In this method, libraries or templates of the source relative to the spectrometer are pre-determined, then used to compare against the detected field. In another embodiment, one or more machine learning procedures are applied.

Because the moderating type neutron spectrometer described above is sensitive to the angle at which neutrons are scattered from the ground, pre-determined neutron intensities as a function of axial depth can be used (as a template comparison) to provide information about the source distance from the spectrometer. Note, this depth resolution is possible without the use of a coded aperture.

A moderating type neutron spectrometer that employs thermal neutron detectors in two- or three-dimensions can yield more accurate template matching properties than in a one-dimensional analysis. The improvement is observed in the increase in certainty of the source chosen from the template matching procedure, as well as in the separation of the figure or merit or score by which the template match is characterized. In other terms, some embodiments of the present disclosure describe a marriage between multi-dimensional cross-correlation (e.g., 3-D Pearson product moment cross-correlation) and the multi-dimensional data available from the moderating type neutron spectrometer described above to yield both a more sensitive and more accurate result.

An improved method for determining the neutron dose equivalent can be extracted by utilizing the template-matching. By identifying a source type and its configuration (i.e., bare, specific shielding and/or moderator) from pre-computed source and source geometries, the incident neutron energy spectrum can be determined with very high accuracy.

FIG. 1A illustrates a high-level block diagram of a detection system 100, in accordance with one embodiment of the present disclosure. In one embodiment, the detection system 100 includes one or more detectors 102. In another embodiment, the one or more detectors 102 may include, but are not limited to, a plurality of detector assemblies 104. In another embodiment each of the detector assemblies 104 includes a plurality of detection devices 105. In one embodiment, the detection devices 105 are configured to detect one or more characteristics of neutrons and/or photons emanating from the one or more neutron sources 101 and impinging on one or more of detection devices 105.

In one embodiment, the detection system 100 includes a moderating volume. In this regard, the neutron detector assemblies 104 (or at least the detection devices 105) are disposed within the moderating volume so as to form a three-dimensional array of neutron detection devices 105 within the moderating volume. In another embodiment, the moderating volume is formed from a plurality of discrete moderating elements 109. In one embodiment, each of the discrete moderating elements are disposed proximate to one or more detector assemblies 104 and are configured to moderate the energy of neutrons (and/or photons) impinging on one or more of the detector assemblies 104. In another embodiment, the plurality of detector assemblies 104 and the plurality of discrete moderating elements 109 are disposed along a common axis.

It is noted that, while FIG. 1A depicts the moderating volume as being formed from a set of discrete moderating elements, such a configuration is not a limitation on the scope of the present disclosure and is provided merely for illustrative purposes. For example, the moderating volume may include, but is not limited to, a continuous moderating volume that surrounds the various detector devices 105, In another embodiment, the detection system 100 includes an analyzer 108 communicatively coupled to an output of each of the detector assemblies 104, or coupled to an output of the detection device 105 of each assembly 104. In one embodiment, the analyzer 108 may include one or more processing elements 110. For example, the one or more processing elements 110 may include any processing and/or logic elements known in the art, such as, but not limited to, one or more processors, FPGAs, ASICs, or the like. Further, the analyzer 108 may include, but is not limited to, a non-transitory storage medium 112 (i.e., memory medium) containing program instructions configured to cause the one or more processing elements 110 to carry out one or more of the various steps (e.g., system control steps, data analysis steps, and the like) described through the present disclosure. For instance, the non-transitory medium 112 may include, but is not limited to, a read-only memory, a random access memory, a magnetic memory, an optical memory device, a solid state memory device and the like.

In another embodiment, the one or more processing elements 110 of the analyzer 108 are configured to execute one or more analysis procedures. In this regard, the analyzer 108 may receive one or more measured response signals from one or more of the detection devices 105 and determine (e.g., determine in real-time, near real-time, or delayed time) one or more characteristics (e.g., energy, energy spectrum, neutron source type, direction of neutron emanation, location, dose, flux, and the like) of one or more neutron sources 101 (e.g., a characteristic of neutrons 103 or photon emanating from neutron source 101) impinging on the one or more detection devices 105. In another embodiment, the analyzer 108 may be communicatively coupled to a user interface device 116 (e.g., display device and user input).

The user interface device 116 may include any user interface known in the art. For example, the user interface device may include a user input device such as, but not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel mounted input device or the like. In the case of a touchscreen interface device, those skilled in the art should recognize that a large number of touchscreen interface devices may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

The display of the user interface device 116 may include any display device known in the art. In one embodiment, the display device may include, but is not limited to, a liquid crystal display (LCD). In another embodiment, the display device may include, but is not limited to, an organic light-emitting diode (OLE©) based display. In another embodiment, the display device may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present disclosure.

It is noted herein that the spatial resolution of the locations of neutron and/or photon interaction events (e.g., capture, induced-fission or scattering events) within the detector 102 allows for the determination, by analyzer 108, of one or more energy or spatial characteristics of the neutrons 103 and/or photons emanating from the neutron source 101. The one or more energy or spatial characteristics include, but are not limited to, energy, energy spectrum, dose, source type, source configuration, source direction and/or source location.

In one embodiment, one or more spatial analysis procedures may be implemented by analyzer 108 to determine one or more characteristics associated with one or more neutron sources (e.g., direction/location). For example, the analyzer 108 may execute, but is not limited to, a vectorization procedure or a detector volume ratio procedure to determine direction and/or location to a neutron source.

In another embodiment, one or more template-matching procedures may be implemented by analyzer 108 to determine one or more characteristics associated with one or more neutron sources (e.g., direction/location, a neutron dose, source identification, etc.). For example, the analyzer 108 may execute, but is not limited to, a cross-correlation procedure or a goodness-of-fit procedure to determine direction/location, a neutron dose and/or the type of neutron source.

In another embodiment, one or more machine learning procedures may be implemented by analyzer 108 to determine one or more characteristics associated with one or more neutron sources (e.g., direction/location, a neutron dose, kinetic energy of incident neutrons, source identification, etc.). For example, the analyzer 108 may execute, but is not limited to, an artificial neural network and/or genetic algorithm to determine direction/location, a neutron dose, neutron kinetic energy and/or the type of neutron source.

It is noted herein that a moderating-type neutron spectrometer/detector configuration suitable for measuring one or more characteristics of a neutron source is described in U.S. patent application Ser. No. 13/694,104 to Steven Bellinger et al., filed on Oct. 29, 2012, which is incorporated by reference in the entirety above.

In one embodiment, the detection devices 105 of detector 102 are neutron detection devices. For example, the neutron detection devices used to form the individual detector assemblies 104 and, thus, the detector 102 include any neutron detection device known in the art. For example, the detection devices 105 may include, but are not limited to, semiconductor-based, scintillator-based, gas-based, bolometery-based or like neutron detection devices. Neutron detection devices are described generally in U.S. patent application Ser. No. 13/694,104 to Steven Bellinger et al., filed on Oct. 29, 2012, which is incorporated by reference in the entirety above.

In one embodiment, the one or more detection devices 104 may include, but are not limited to, microstructured semiconductor neutron detectors (MSNDs). In one embodiment, the MSND-based semiconductor devices of the present disclosure may include devices consisting of a semiconductor substrate including microscopic cavities (e.g., holes) etched into the semiconductor surface, whereby the etched cavities are subsequently filled with a neutron reactive material, such as $^{10}B$ or $^{6}LiF$ submicron powders. It has been shown that these devices may be capable of thermal detection efficiencies exceeding 35%.

In another embodiment, the MSND-based detection devices 104 of the system 100 may be formed by etching cavities into float-zone-refined (FZR) Si to produce a selected pattern (e.g., overall hexagonal or square pattern). The cavities may be etched so that they do not reach completely through the device. In this embodiment, holes or trenches of various shapes are etched into the semiconductor surface, wherein the trenches may extend across the semiconductor substrate and are etched almost through the substrate and are subsequently filled with neutron reactive material. Microstructured Neutron Detection devices are described in detail by McGregor et al. in U.S. Pat. No. 7,164,138, issued on Jan. 16, 2007, and U.S. Pat. No. 6,545,281, issued on Apr. 8, 2003, which are incorporated herein by reference in their entirety.

In another embodiment, the detector assemblies 104 of detector 102 are neutron-photon detector assemblies, which are capable of detecting both neutrons and photons (e.g., gamma rays or x-rays). In one embodiment, the neutron-photon detector assemblies are constructed from detector devices 105 capable of detecting both neutron events and photon events (e.g., gamma ray or x-ray events). For example, dual-purposed detection devices may include, but are not limited to, germanium semiconductors, elpasolites, scintillator-type detectors and recoil based liquids or plastics that are capable of discriminating neutrons and photons by pulse shape. In this embodiment, the dual-purposed neutron-photon detection devices may provide information related to detected neutrons and photons to the analyzer 108 nearly simultaneously.

In another embodiment, a neutron-photon detector assembly may be formed through the combination of neutron-detection devices and photon-detection devices. In this regard, a portion of the detection devices 105 of a given detector assembly 104 are dedicated to neutron detection, while an additional portion of the detection devices of the given detector assembly 104 are dedicated to photon (e.g., gamma ray or x-ray) detection. In this regard, the neutron-dedicated devices and the photon-dedicated devices may operate in conjunction with one another or may operate as independent spectrometers with interlaced detection volumes. The neutron-dedicated portion of devices 105 may include any neutron detection devices noted previously herein. In addition, the photon-dedicated portion of devices 105 may include, but are not limited to, scintillator-type detection devices (e.g., gamma ray scintillator devices).

Figure 1B:
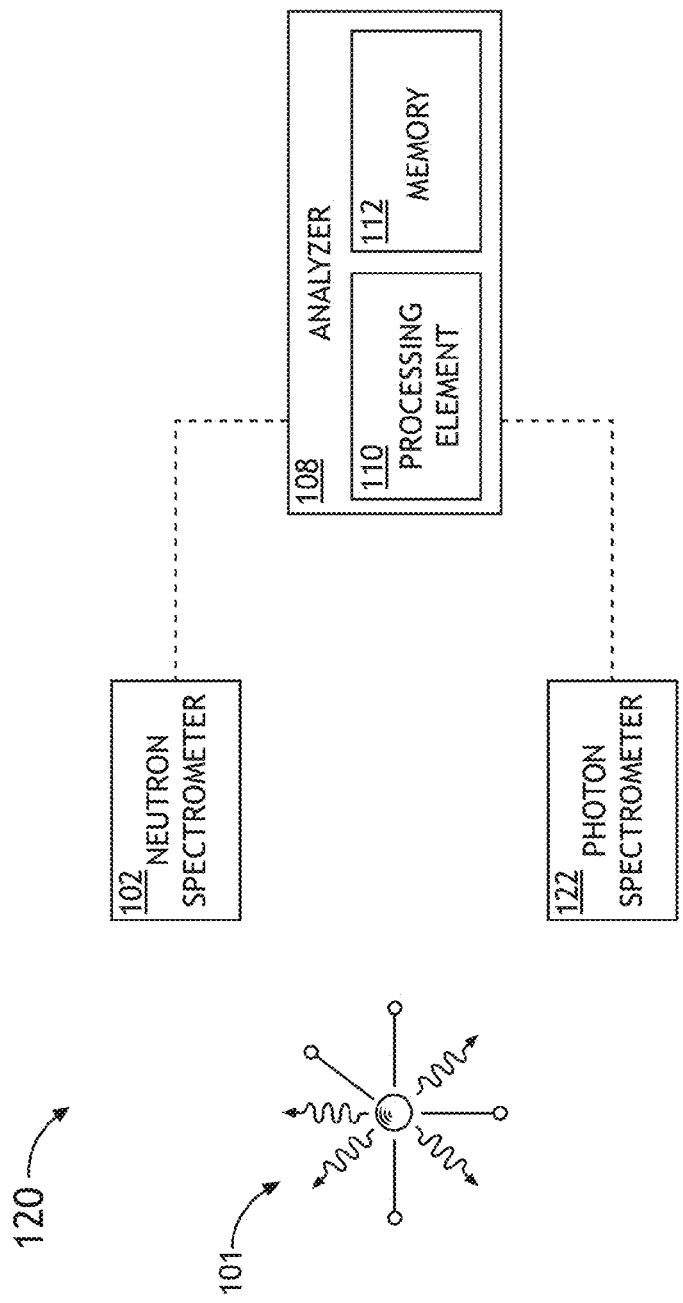
FIG. 1B illustrates a block diagram view of a detection system equipped with a photon spectrometer located independently from a neutron spectrometer, in accordance with one or more embodiments of the present disclosure.

FIG. 1B illustrates system 100 equipped with a photon spectrometer 122 (or detector) located independently from the neutron spectrometer 102 (or detector), in accordance with one embodiment of the present disclosure. In this regard, the photon spectrometer/detector 122 (e.g., gamma ray spectrometer/detector) may be positioned separate from the neutron spectrometer/detector 102. Such a configuration provides for independent measurement of neutrons and photons of a given neutron- and photon-emitting source. As described in more detail further herein, the data streams from the neutron spectrometer 102 and the photon spectrometer 122 may be combined, or fused, to generate an improved interrogation of the given neutron source. In another embodiment, the neutron spectrometer 102 and the photon spectrometer 122 may each be coupled to the analyzer 108. In another embodiment, the analyzer 108 may cause the two spectrometers 102, 122 to acquire neutron and photon data from the given source 101 with a selected measurement window (e.g., 1-10 seconds). It is noted herein that time-correlating neutron measurements with photon measurements increases the confidence in the given source 101 measurement process.

It is noted herein that the photon spectrometer 122 and neutron spectrometer 102 may be arranged in any manner suitable for acquiring time- and space-correlated measurements of a given neutron/photon source 101.

For example, the photon spectrometer 122 may be positioned in a user-worn backpack such that the photon spectrometer 122 is communicatively coupled to the analyzer 108 carried on the casing of the neutron spectrometer 102 (carried by the user). By way of another example, the photon spectrometer 122 may be positioned in a portion of the casing or assembly of the neutron spectrometer 102 (e.g., handle of the neutron spectrometer 102) with the photon spectrometer 122 being communicatively coupled to the analyzer 108 carried on the body of neutron spectrometer 102. By way of another example, the photon spectrometer 122 may be positioned adjacent to the neutron spectrometer 102 to form a compact neutron-photon detection instrument with the photon spectrometer 122 being communicatively coupled to the analyzer 108 carried on the body of neutron spectrometer 102. In each of these embodiments, data from the neutron detector/spectrometer 102 may be fused with data from the photon detector/spectrometer 122 by the analyzer 108 in order to enhance the characterization of the neutron- and/or photon-emitting source 101.

Figure 1C:
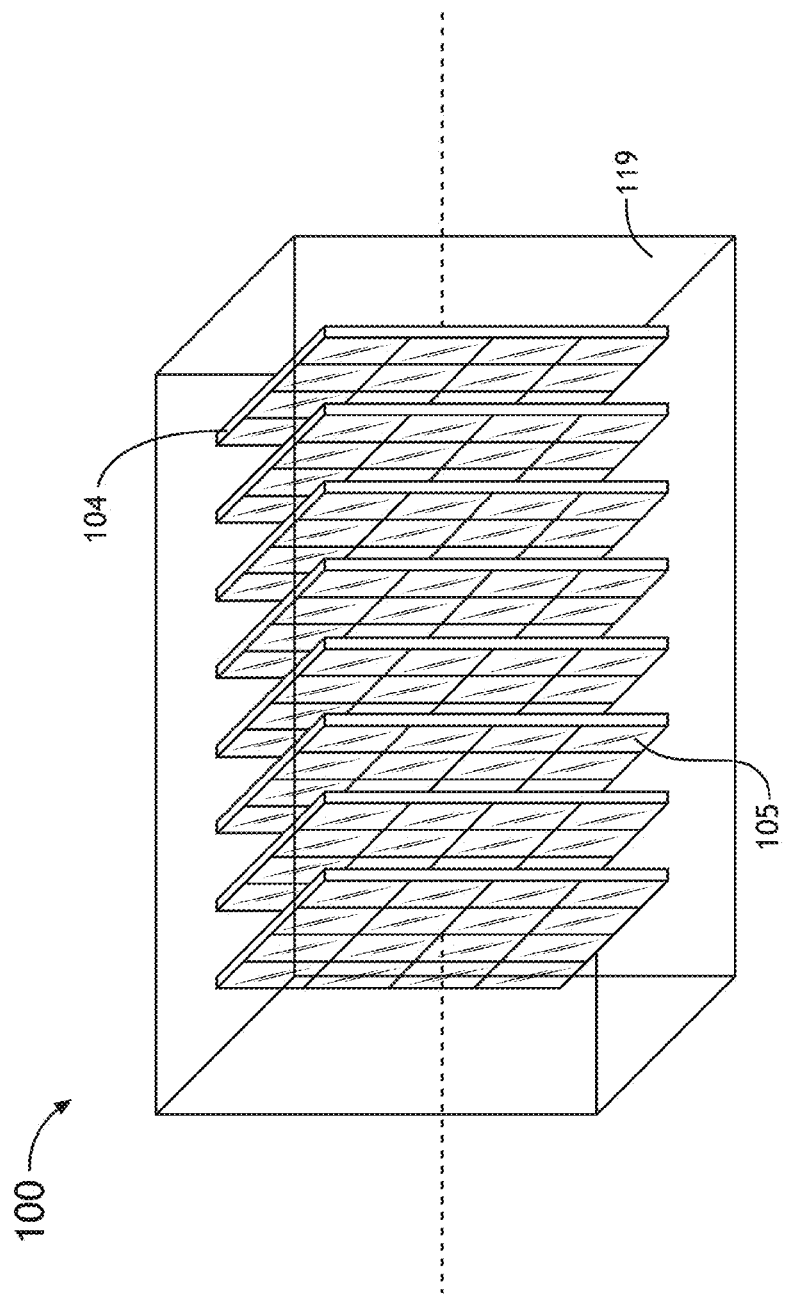
FIG. 1C illustrates a simplified schematic view of detector assemblies and corresponding detection devices, in accordance with one or more embodiments of the present disclosure.

Referring now to FIG. 1C, a simplified schematic diagram of one configuration of detector assemblies 104 and corresponding detection devices 105 is depicted, in accordance with one embodiment of the present disclosure. In one embodiment, the detection devices 104 of the neutron detection system 100 may be disposed within a volume of neutron moderating material 119 (e.g., continuous volume of moderating material or volume of moderating material formed with discrete moderating elements 109). In an additional embodiment, as shown in FIG. 1C, one or more of the detector assemblies 104 may include two or more detection devices 105 (e.g., independent neutron and/or photon reactive elements) suitable for detecting impinging neutrons and/or photons.

In another embodiment, the plurality of detector assemblies 104 may be configured such that one or more of the detector assemblies 104 are aligned in a substantially parallel manner. For example, as shown in FIG. 1C, eight detection assemblies 104 are aligned such that the surfaces of the individual devices 105 are substantially parallel with respect to one another. For example, a first detector assembly, a second detector assembly, and up to and including an Nth detector assembly may be aligned such that the surfaces of the individual devices 105 are substantially parallel with respect to one another.

In another embodiment, the plurality of detector assemblies 10 of the detector 102 may include a 'stack' of a selected number of individual detector assemblies 104. For example, a stack of a selected number of substantially planar and parallel aligned detector assemblies 104 may be disposed within a volume of a chosen neutron moderating material 119 (e.g., formed with a set of discrete moderating elements 109). For instance, as shown in FIGS. 1A and 1E, a stack of eight substantially planar and parallel aligned detector assemblies 104 are disposed within a moderating material by arranging each of the detector assemblies 104 between two moderator slabs 109 (e.g., cylinders). It should be recognized by those skilled in the art that the use of eight assemblies is not a limitation and that the detection system 100 may employ any number of detector assemblies 104, based on the specific demands on the detection system 100. It is noted herein that increasing the number of detection device layers in the neutron detection system 100 may improve both neutron capture efficiency and neutron spectral and directional measurement accuracy up to the limit at which the moderator in between planar devices compromises the scattering-energy (i.e., moderation) relationship.

In another embodiment, the detector assemblies 104 may be positioned along a common orientation axis. For example, as shown in FIGS. 1A and 1C, the detector assemblies 104 may be spaced linearly along an axial direction. For instance, the detector assemblies 104 within a stack of detection assemblies 104 may be periodically spaced along a common axis at a selected interval (e.g., 0.25 to 5 cm interval). It should be recognized by those skilled in the art that the specific linear spacing interval of the detector assemblies 104 is not a limitation and that various spacing intervals may be used in the detection system 100, with the specific spacing chosen according to specific efficiency, accuracy, and sensitivity requirements of the given system. By way of another example, the detector assemblies 104 of the detector 102 may be spaced nonlinearly along a common axis. For instance, the detector assemblies 104 may be spaced along a common axis at intervals of 0.5, 1.0, 1.5, 2.0, 3.0, 5.0, 7.5, 10, 15, and 20 cm, as measured from a front surface of the detector 102. It should be recognized by those skilled in the art that the specific nonlinear spacing intervals of neutron detection devices 104 is not a limitation and that various spacing intervals may be used in the detection system 100, with the specific spacing chosen according to specific efficiency, accuracy, and sensitivity requirements of the given system for a known incident neutron energy.

Figure 1D:
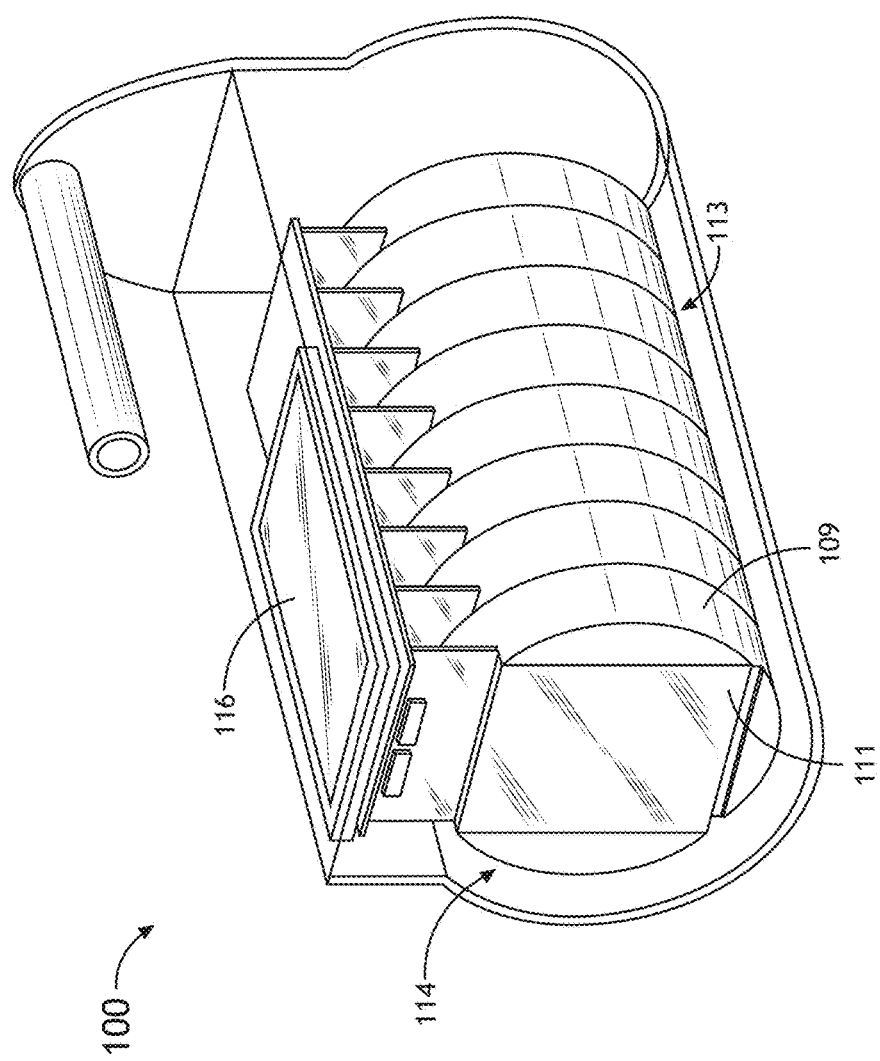
FIG. 1D illustrates a schematic view of a neutron detection system, in accordance with one or more embodiments of the present disclosure.
Figure 1E:
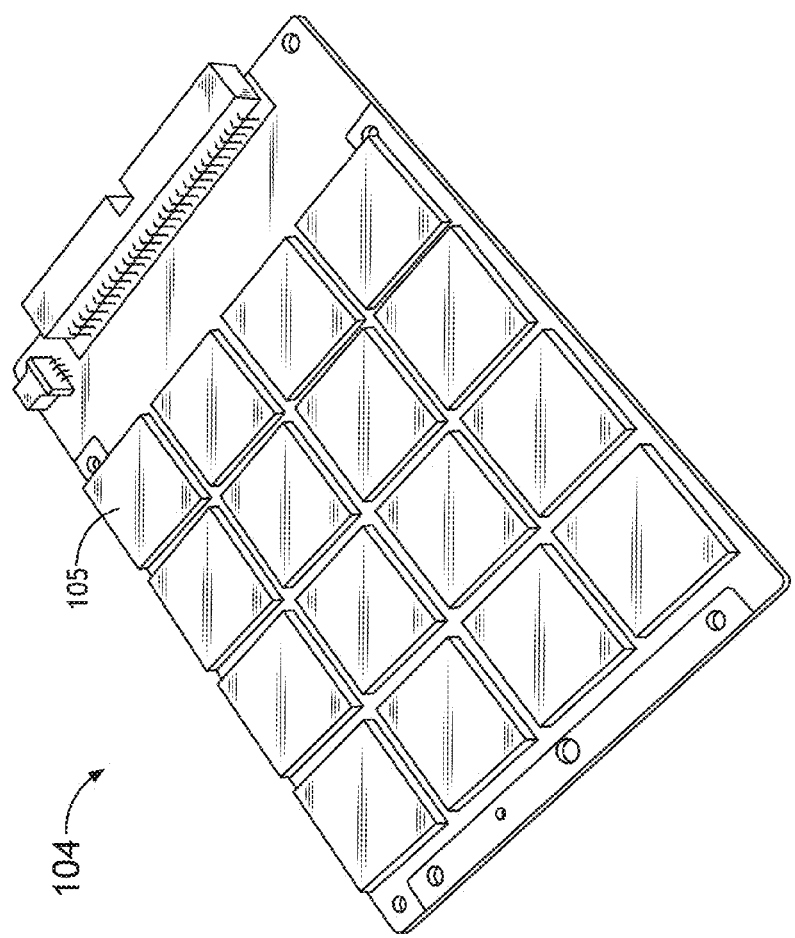
FIG. 1E illustrates a schematic view of a detection assembly including a set of detection devices, in accordance with one or more embodiments of the present disclosure.

FIG. 1D illustrates a schematic view of the neutron detection system 100 of the present disclosure. FIG. 1E illustrates a schematic view of a detection assembly 104 including a set of detection devices 105 of the present disclosure.

In one embodiment, the moderating volume 119 may substantially encapsulate the detection devices 105, as shown in FIG. 1C. In another embodiment, the moderating volume 119 may be formed with a set of discrete moderating elements 109, such as, but not limited to, a set of cylinders or blocks of moderating material positioned between adjacent detection devices, as shown in FIGS. 1A and 1D. In one embodiment, in the case of a parallelepiped-shaped detector 102, as shown in FIGS. 1A, 1C and 1D, a series of parallelepiped-shaped moderating elements (not shown) may be positioned between adjacent detector assemblies 104. In another embodiment, as shown in FIGS. 1D and 1E, the parallelepiped-shaped detector assemblies 104 may be embedded in moderating elements having a cylindrical external shape. It is noted that the present disclosure is not limited to the above examples, which are provided merely for illustrative purposes. It is recognized that the detection devices, detector assemblies and moderating elements/volume may take on any geometrical configuration suitable for neutron and/or photon detection. A variety of geometrical configurations are described in U.S. patent application Ser. No. 13/694,104 to Steven Bellinger et al., filed on Oct. 29, 2012, which is incorporated by reference in the entirety above. A variety of geometrical configurations are also described in U.S. patent application Ser. No. 13/391,585 to Anthony Caruso et al., filed on Feb. 21, 2012, which is incorporated by reference in the entirety above.

Suitable neutron moderating materials include materials with a high content of low atomic weight atoms having a relatively large cross section for neutron scattering but a relatively low neutron capture cross sections, such as hydrogen, boron-11, beryllium, carbon and nitrogen. For example, suitable moderator materials include, but are not limited to, elemental, compounded, or mixture form of water (e.g., light or heavy), organic compounds, such as carbon-based polymers (e.g., plastics, polyethylene, high density polyethylene, and the like), granular inorganic materials, and graphite. For instance, each of the moderator elements 109 of the detector 102 may be formed from high density polyethylene (HDPE). It should be recognized that the use of a HDPE as a neutron moderator is not a limitation and that the neutron detector assemblies 104 may be embedded or surrounded by other suitable neutron moderating materials. It will be recognized by those skilled in the art that the choice of neutron moderator material will depend on the exact purposes of the given neutron detection system 100 and different moderators may be more or less suitable in different contexts (e.g., size limitations, portability requirements, energy sensitivity requirements, or directional sensitivity requirements). The use of HDPE and other moderator materials for moderating neutrons in a neutron detection setting is described in U.S. Pat. No. 7,514,694 filed on Jun. 19, 2007, which is incorporated herein by reference in the entirety.

Figure 1F:
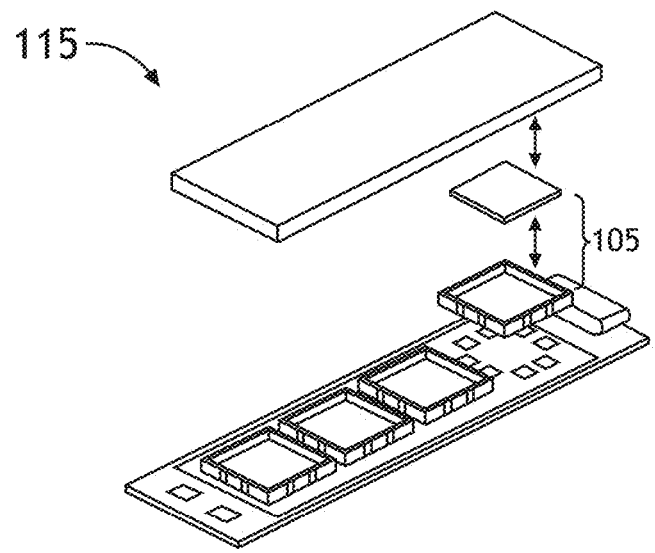
FIG. 1F illustrate a simplified schematic view of a linear detection strip, in accordance with one or more embodiments of the present disclosure.
Figure 1G:
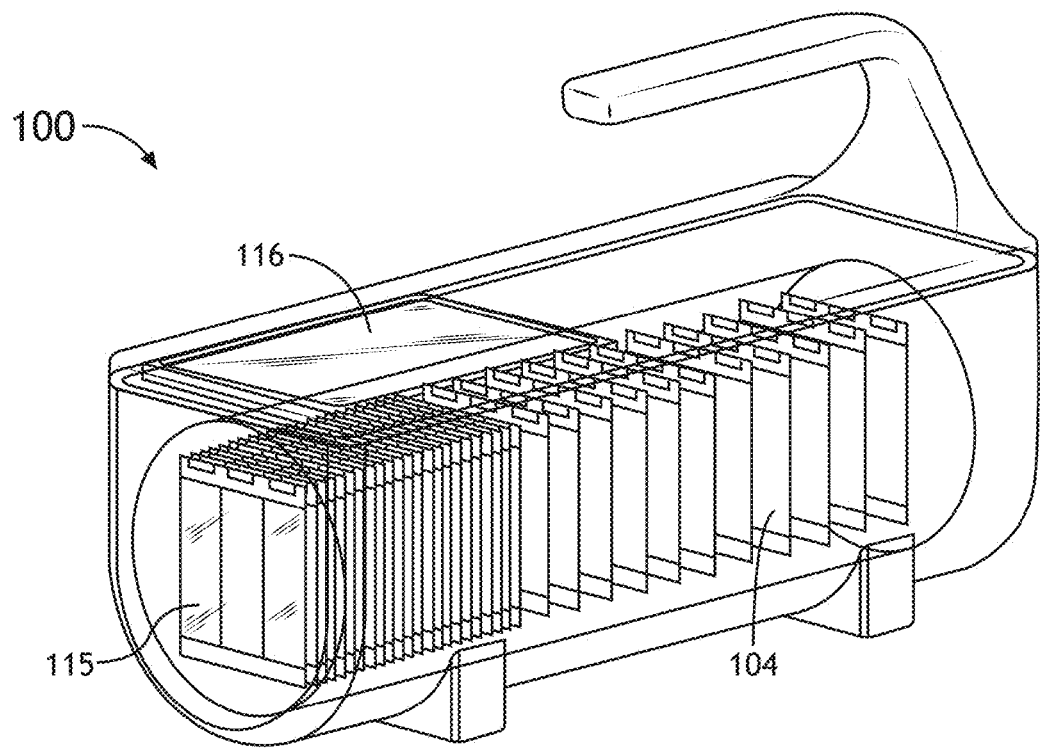
FIG. 1G illustrates a schematic view of a detection system equipped with linear detection strips, in accordance with one or more embodiments of the present disclosure.

FIGS. 1F-1G illustrate an alternative configuration of system 100, where linear detection strips 115 are implemented. In this embodiment, each detection strip 115 may include a set of detection devices 105.

Figure 1H:
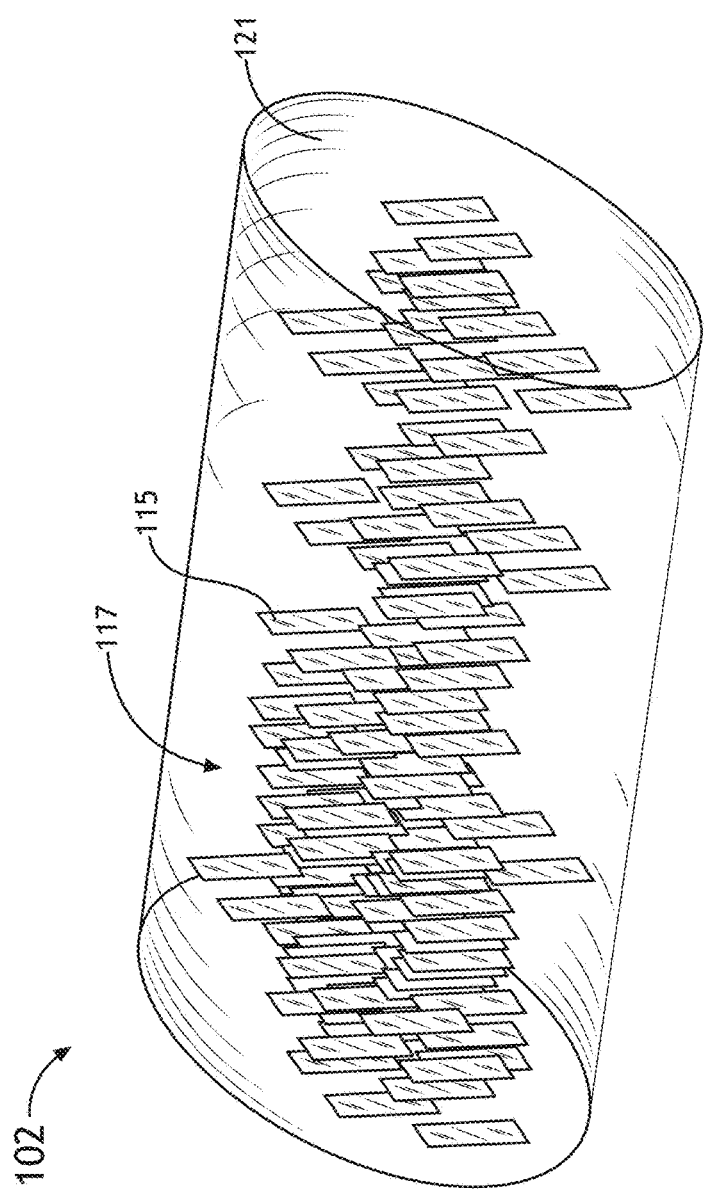
FIG. 1H illustrates a schematic view of a detection system equipped with a set of detection elements arranged in a selected patter, in accordance with one or more embodiments of the present disclosure.

FIG. 1H illustrates an additional schematic view of a detector 102 of system 100, in accordance with one embodiment of the present disclosure. In one embodiment, the detector region 117 of the detector is formed with the arrangement of a plurality of strip detection elements 115 in a selected pattern. The pattern used to position the detection elements 115 may be chosen to optimize (or at least improve) one or more selected measurement parameters.

In one embodiment, the arrangement of the detector region 117 is designed using a combination of Monte Carlo N-Particle (MCNP) simulation and Genetic Algorithm (GA) methods. The method generates and parses MCNP simulations according to a selected decision making criteria. In the example shown in FIG. 1H, the simulations used 128 detector boards with 1×4 linear strips 115 of 1-cm^2 detectors. The figure of merit was selected such that the genetic algorithm optimized the intrinsic efficiency of the device to 252-Cf and AmBe, as well as optimizing the difference in the response to 252-Cf and AmBe. The arrangement shown in FIG. 1H seeks to achieve an increase in detected neutrons, while making the device signatures (used in the cross correlation methods) look less alike. In one embodiment, the detector strips 115 were variably spaced along all 3 axes in the moderating volume 121. In this regard, each layer along an axis, may be closer or further spread out from the previous and/or next layer. Such an arrangement shows improved efficiency and device response, when there are more detectors positioned around the region to which the peak emission rate as a function of energy is probalistically most likely to thermalize in the given moderator (e.g., HDPE). For example, 252-Cf peak emission is approximately 1 MeV and the mean free path for thermalization in HDPE is roughly 5-9 cm, while AmBe has a peak emission of approximately 2 MeV and a mean free path of approximately 8-14 cm. As such, preferentially locating more detectors in the range of 5-15 cm increases efficiency and decreases the similarity of the responses of the two sources. In another embodiment, the similarity of the two sources may also be decreased by variable spacings (e.g., a large grouping of detectors in the rear of the device). In another embodiment, preferentially locating detector strips 115 at the front of the moderator 121 may lead to an improvement in efficiency. It is noted that the application of a genetic algorithm to optimize detector position is described in more detail further herein (see FIGS. 6A-6D).

Figure 2A:
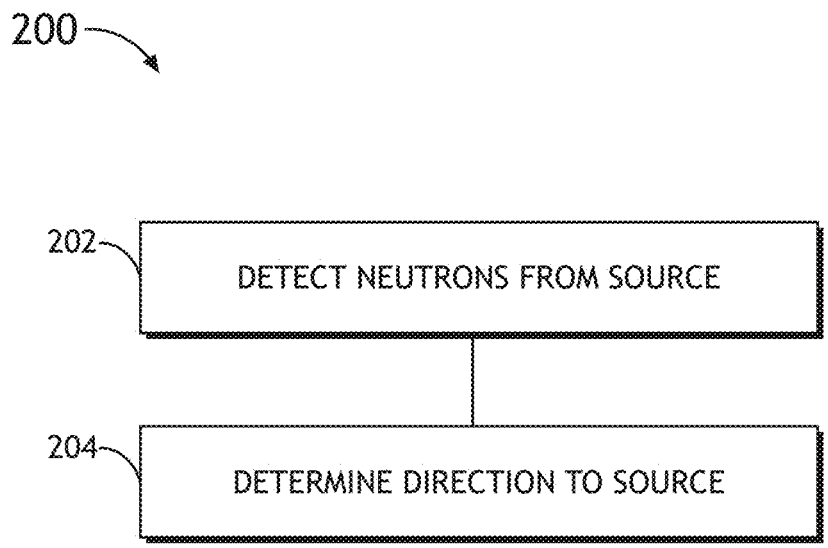
FIG. 2A illustrates a process flow diagram depicting a method for determining the direction to a neutron source, in accordance with one or more embodiments of the present disclosure.
Figure 2B:
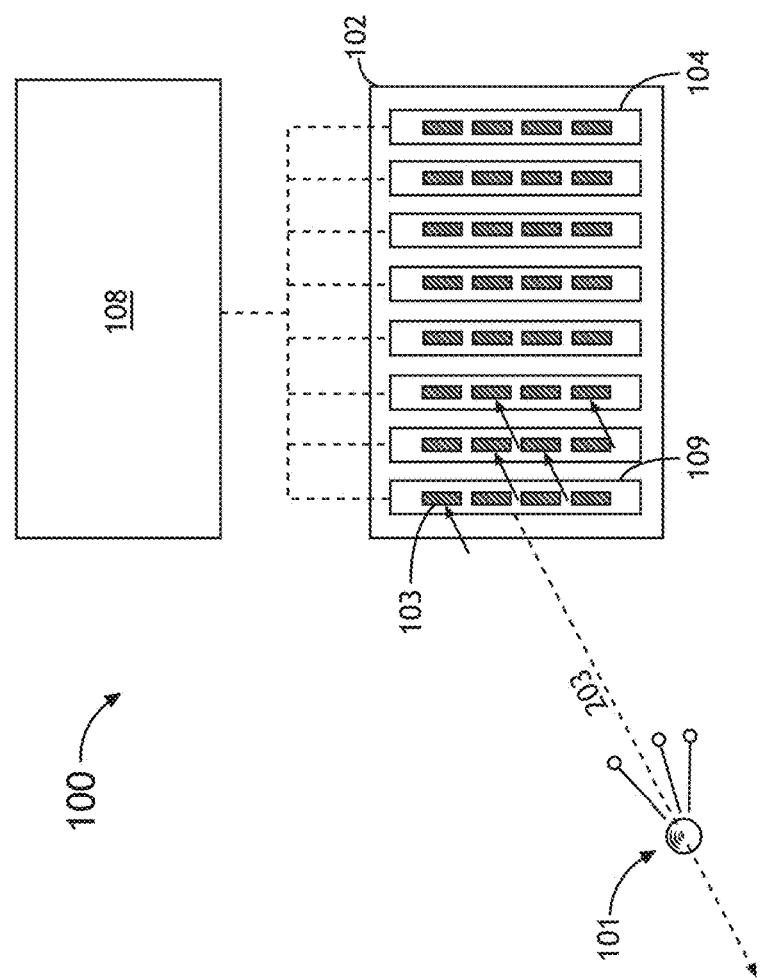
FIG. 2B illustrates one or more detection devices of a detection system detecting neutrons emanating from a neutron source and determining the direction to the corresponding neutron source, in accordance with one or more embodiments of the present disclosure.

FIG. 2A illustrates a method for determining the direction to a neutron source, in accordance with one or more embodiments of the present disclosure. In a first step 202, one or more neutrons emanating from a neutron source are detected. For example, as shown in FIG. 2B, neutrons 103 emanating from a given neutron source 101 may be detected with one or more of the detection devices 105 of the neutron detector/spectrometer 102. In a second step 204, based on the measured neutron detection events, the direction 203 to the one or more neutron sources 101 may be determined. In this regard, the direction 203 to the one or more neutron sources 101 is measured relative to fixed reference point of the neutron detector/spectrometer 102, as shown in FIG. 2B. For example, upon measurement of one or more neutrons from the neutron source 101, the detection devices 105 may transmit one or more response signals to the analyzer 108 (e.g., processing element 110 of analyzer 108). In turn, the analyzer 108 may determine the direction 203 to the one or more neutron sources 101 relative to a fixed reference point of the detector/spectrometer 102 via one or more analysis procedures.

In one embodiment, the direction to a neutron source 101 may be determined via a spatial analysis procedure. It is noted that for the purposes of the present disclosure a "direction to a neutron source" may be used interchangeably with "a direction of emanation of neutrons from one or more neutron sources."

In one embodiment, a spatial analysis procedure used to determine the direction to a neutron source 101 includes a vectorization procedure. It is noted herein that the vectorization procedure of the present disclosure serves to resolve the direction to a neutron source 101 from the detector 102. It is noted that a directional neutron source 101 will induce an asymmetrical thermal neutron flux within the moderating volume 109 of the spectrometer/detector 102, with devices 105 in regions of the spectrometer 102 nearest to the source being preferentially stimulated, regardless of neutron energy. For example, if a source of any energy is placed in front of the spectrometer/detector 102, the system 100 measures a higher thermal flux (and thus neutron counts) on the front half of the spectrometer/detector 102 than on the back half of the spectrometer/detector 102.

The vectorization procedure of the present disclosure takes advantage of this behavior by the assigning each detection device 105 a unit vector, which describes its relative spatial coordinates within the spectrometer/detector 102, expanding if necessary, and then normalizing the vectors. These unit vectors may then be weighted by the counts on each detection device 105. These count-weighted positional vectors are then summed, resulting in vectors which point in the direction of the favored asymmetry in the device, and whose magnitude is a measure of such asymmetry.

Figure 2C:
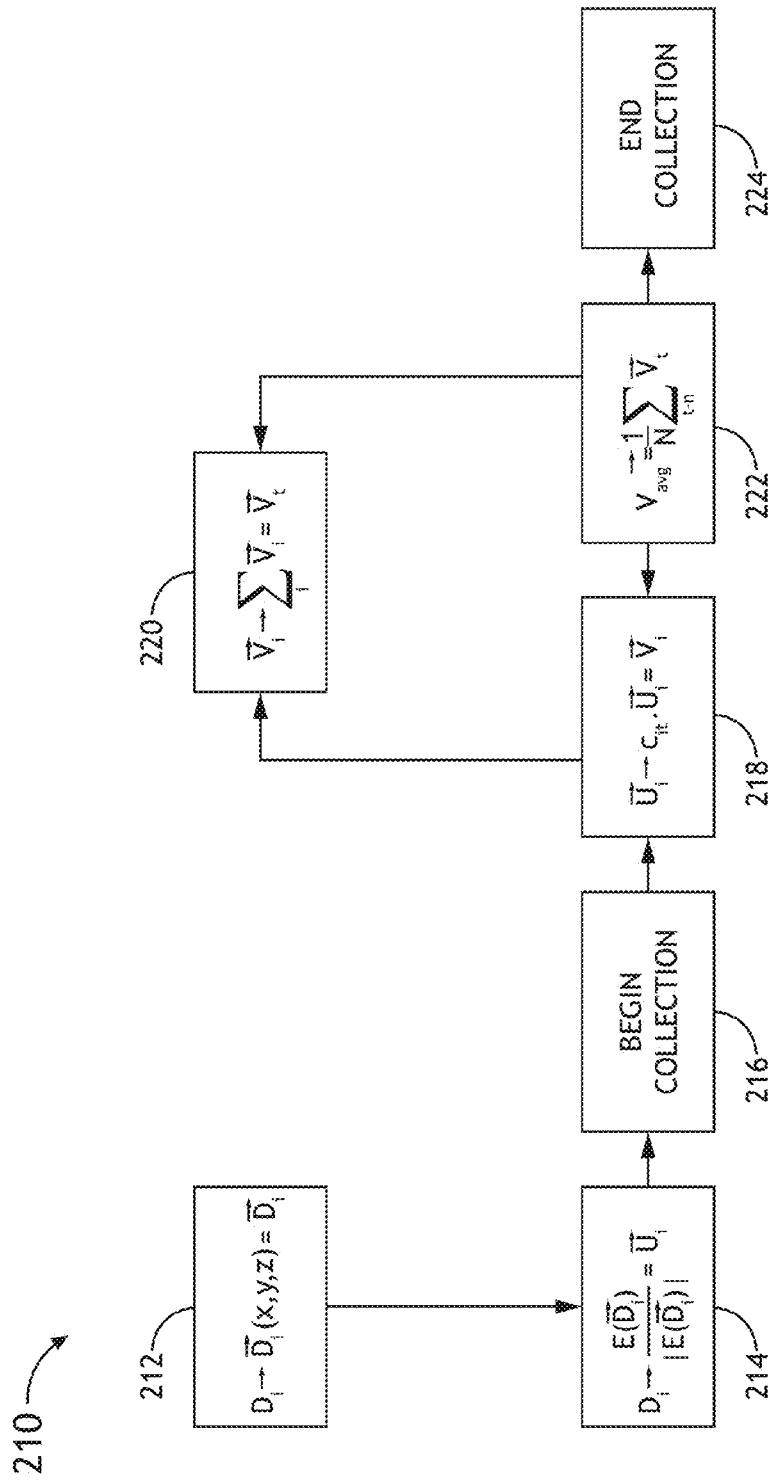
FIG. 2C illustrates a process flow diagram depicting a vectorization procedure, in accordance with one or more embodiments of the present disclosure.
Figure 2E:
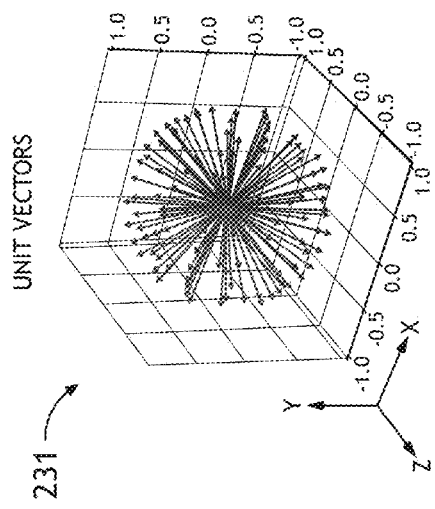
FIG. 2E illustrates a conceptual view of a set of unit vectors, in accordance with one or more embodiments of the present disclosure.
Figure 2G:
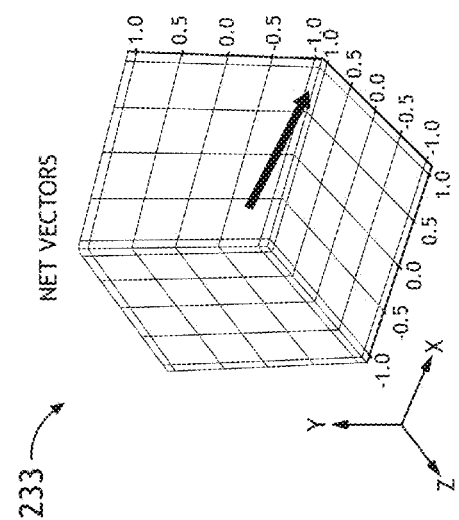
FIG. 2G illustrates a conceptual view of a set of net vectors, in accordance with one or more embodiments of the present disclosure.
Figure 2D:
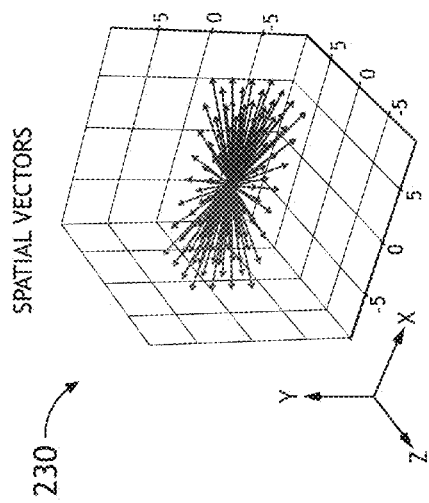
FIG. 2D illustrates a conceptual view of a set of spatial vectors, in accordance with one or more embodiments of the present disclosure.
Figure 2F:
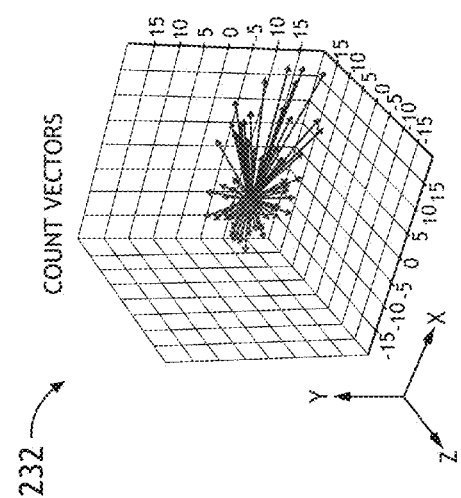
FIG. 2F illustrates a conceptual graphical depiction of count vectors, in accordance with one or more embodiments of the present disclosure.

FIG. 2C illustrates a process flow diagram 210 depicting the vectorization procedure 210, in accordance with one or more embodiments of the present disclosure. In a first step 212, the analyzer 108 defines each detection device 105 ($D_i$) by its spatial position vector relative to the center of the spectrometer/detector 102 ($\vec{D}_i$). For example; the set of spatial vectors of step 212 are depicted conceptually in graph 230 of FIG. 2D.

In a second step 214, the analyzer 108 expands each position vector ($\vec{D}_i$) for purposes of establishing symmetry (or by other optimization factors) and normalizes the position vectors to generate a set of detector unit vectors ($\vec{U}_i$). For example, the set of detector unit vectors of step 214 are depicted conceptually in graph 231 of FIG. 2E.

In a third step 216, the system 100 begins collecting neutron counts from the neutron source 101 (or generally from the environment).

In a fourth step 218, the analyzer 108 may multiply each detector unit vector ($\vec{U}_i$) by counts collected by the given device 105 in a given time bin to form a set of count vectors. For example, the set of count vectors of step 218 are depicted conceptually in graph 232 of FIG. 2F.

In a fifth step 220, the analyzer 108 may sum over all count vectors in a selected time bin ($\vec{V}_i$) to produce a net vector ($\vec{V}_t$). It is noted that the direction of the net vector corresponds to the favored count direction and has a magnitude proportional to the count asymmetry within the spectrometer/detector 102. For example, the net vector of step 220 is depicted conceptually in graph 233 of FIG. 2G.

In a sixth step 222, the analyzer 108 may average the net vectors ($\vec{V}_t$) over a selected number of collection periods (n) to generate a window-averaged net count vector ($\vec{V}_{avg}$).

In a seventh step 224, the collecting of neutron counts terminates. For example, once the user (or programmed analyzer 108) determines sufficient neutron count data has been collected to adequately determine the direction to the neutron source 101, the analyzer 108 may terminate neutron count collection.

In another embodiment, upon determining a direction to the neutron source 101, the analyzer 108 may display a visual indicator (e.g., arrow) indicative of the direction of the neutron source 101 from a reference point of the detector 102 (e.g., front face of the detector).

Figure 2H:
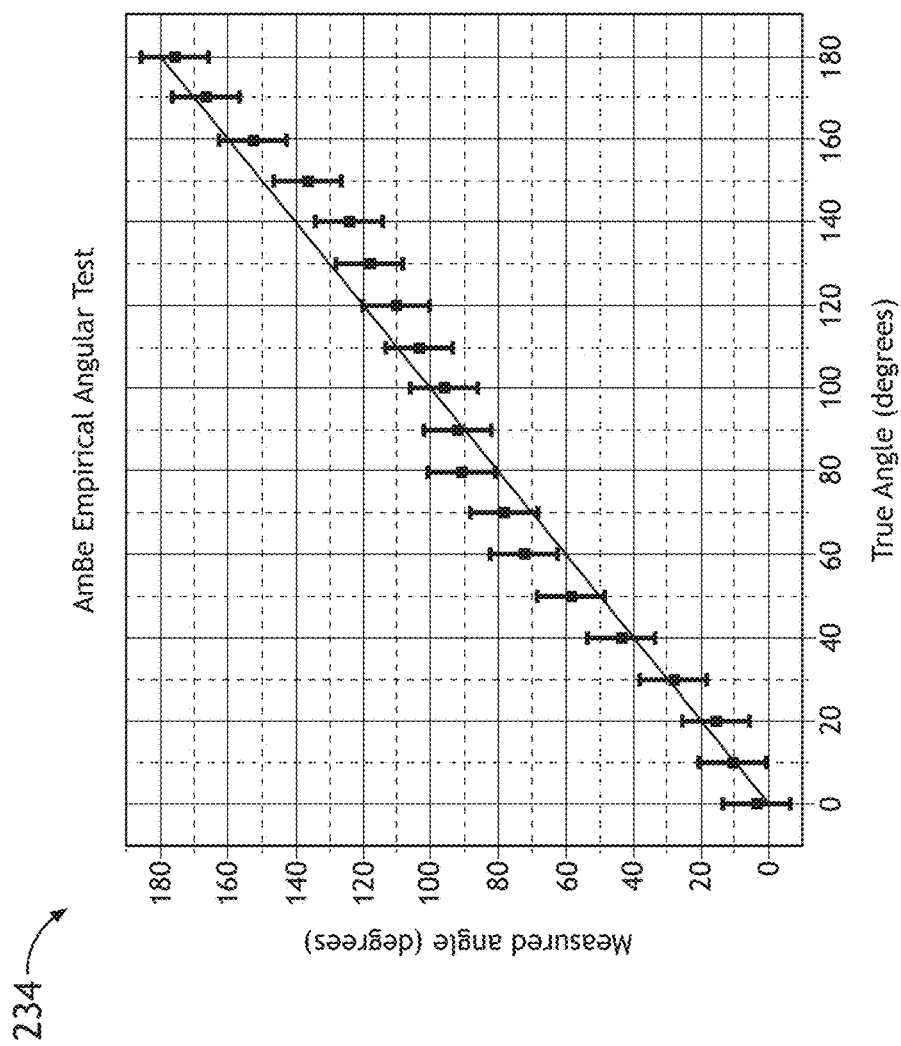
FIG. 2H illustrates a graph of measurement angle values found using a vectorization procedure, in accordance with one or more embodiments of the present disclosure.
Figure 21:
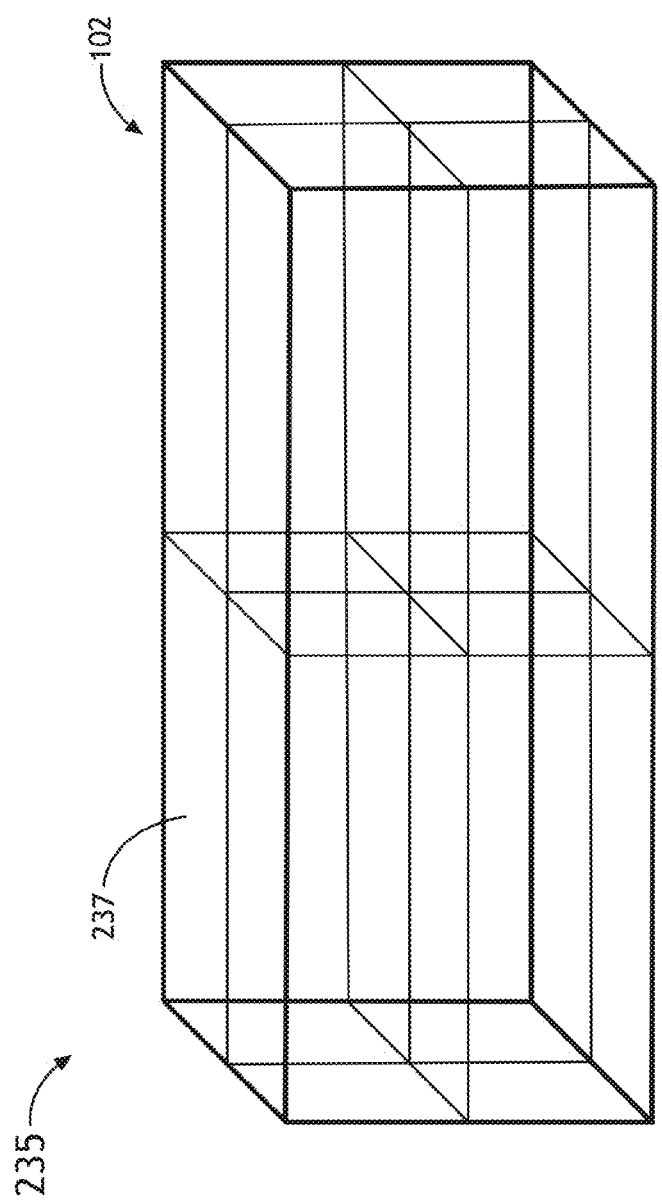

FIG. 2H illustrates a graph 234 of measurement angle values found using the vectorization procedure 210 plotted against the actual, or "true," angle of the neutron source from the detector 102. It is noted that the data depicted in graph 234 was acquired in an effort to validate the vectorization procedure 210 described herein. The data of graph 234 was acquired utilizing a neutron detector/spectrometer configuration similar to that depicted in FIGS. 1A, 1B and 1E. In these experiments, the detector/spectrometer 102 was placed 2 m from an AmBe neutron source at multiple different fixed source-to-spectrometer angular orientations. These orientations correspond to the "True Angle" values shown in graph 234. Further, the vectorization procedure 210 described previously herein was carried out using the analyzer 108 to acquire a "Measured Angle" for each angular orientation. The high level of agreement between the True Angle and Measured Angle values suggests the vectorization procedure 210 of the present disclosure serves as a high quality approach for determining source position with the detector/spectrometer 102 of the present disclosure.

Figure 2J:
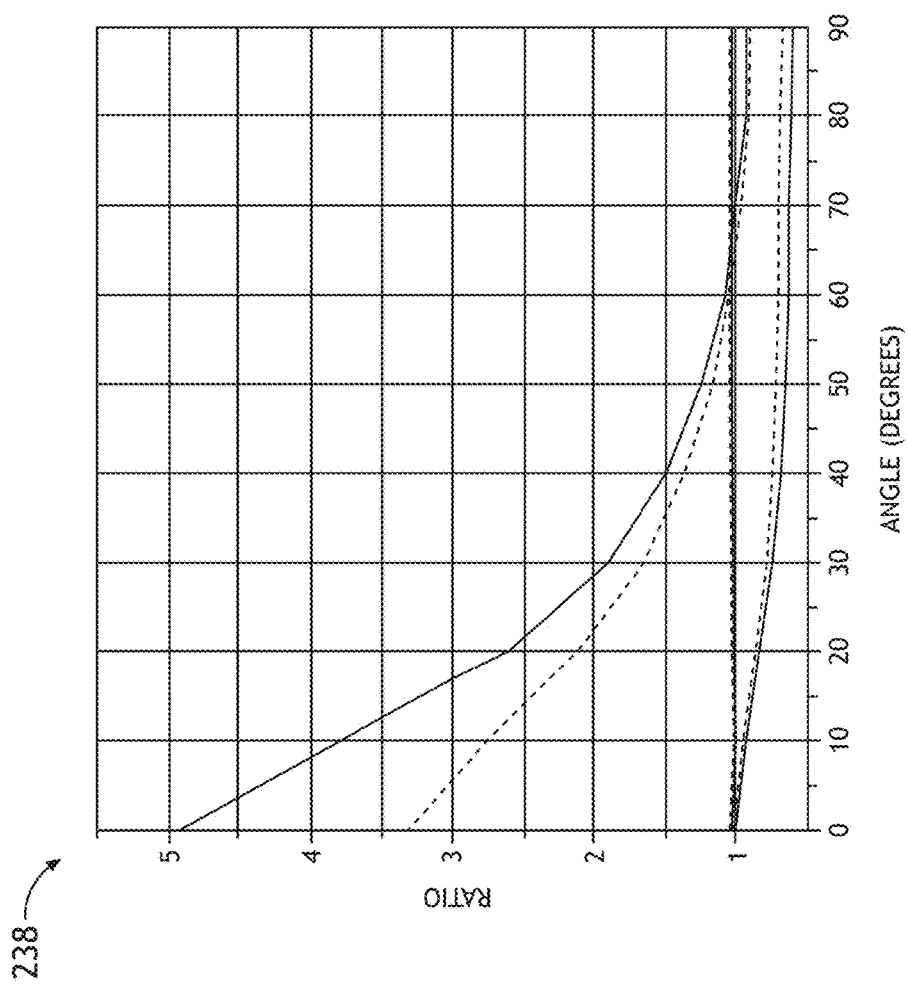
FIG. 2J illustrates X, Y, and Z ratios versus angle of incidence, in accordance with one or more embodiments of the present disclosure.

In another embodiment, a spatial analysis procedure used to determine the direction to a neutron source 101 includes a detection volume ratio procedure. For example, the direction to a neutron source 101 may be determined via a detection volume ratio procedure (e.g., octant comparison procedure), as shown in FIGS. 2I-2J. For example, as shown in FIG. 2I, a detection volume 235 of detector 102 may be broken up into octants 237. In one embodiment, the analyzer 108 may sum the total neutron detection counts in each octant. In turn, the analyzer 108 may calculate the count ratio between the various octants 237 of the detection volume 235 in order to determine the direction towards the one or more neutron sources 101. FIG. 2J illustrates the X, Y, and Z ratios versus angle of incidence.

Figure 2K:
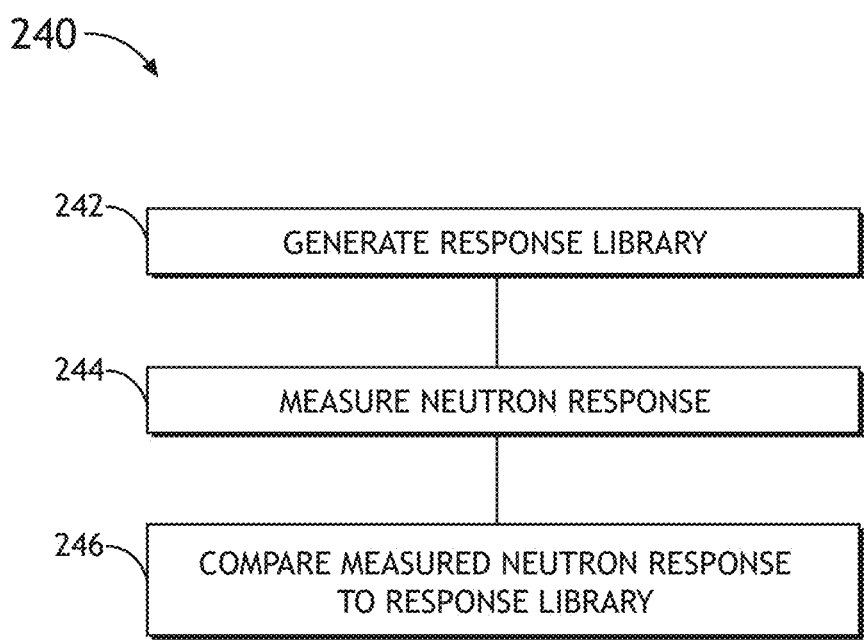
FIG. 2K illustrates a process flow diagram depicting a method for carrying out a cross-correlation procedure, in accordance with one or more embodiments of the present disclosure.
Figure 2L:
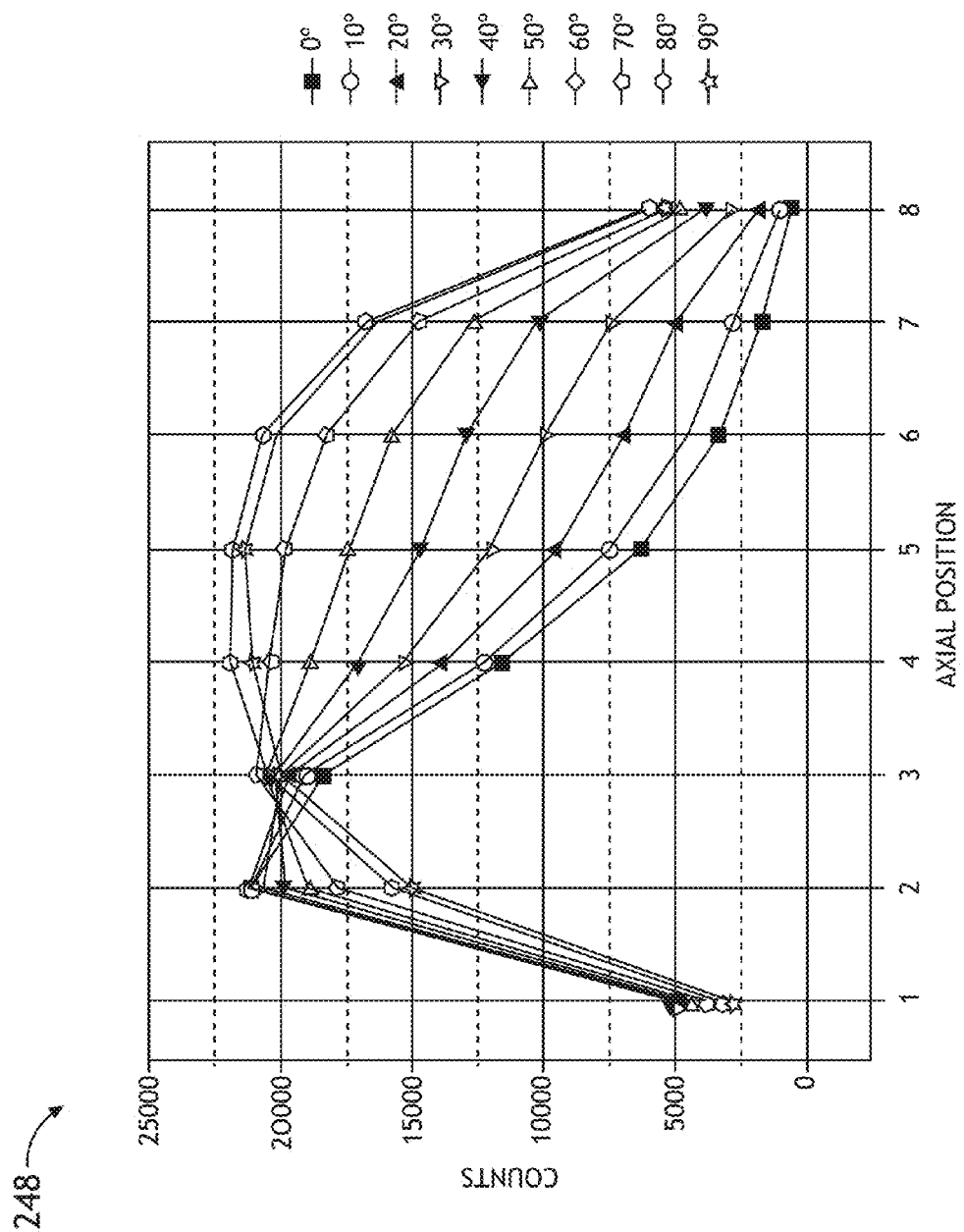
FIG. 2L illustrates a graph of counts as a function of axial position for a number of neutron incident angles, in accordance with one or more embodiments of the present disclosure.
Figure 2M:
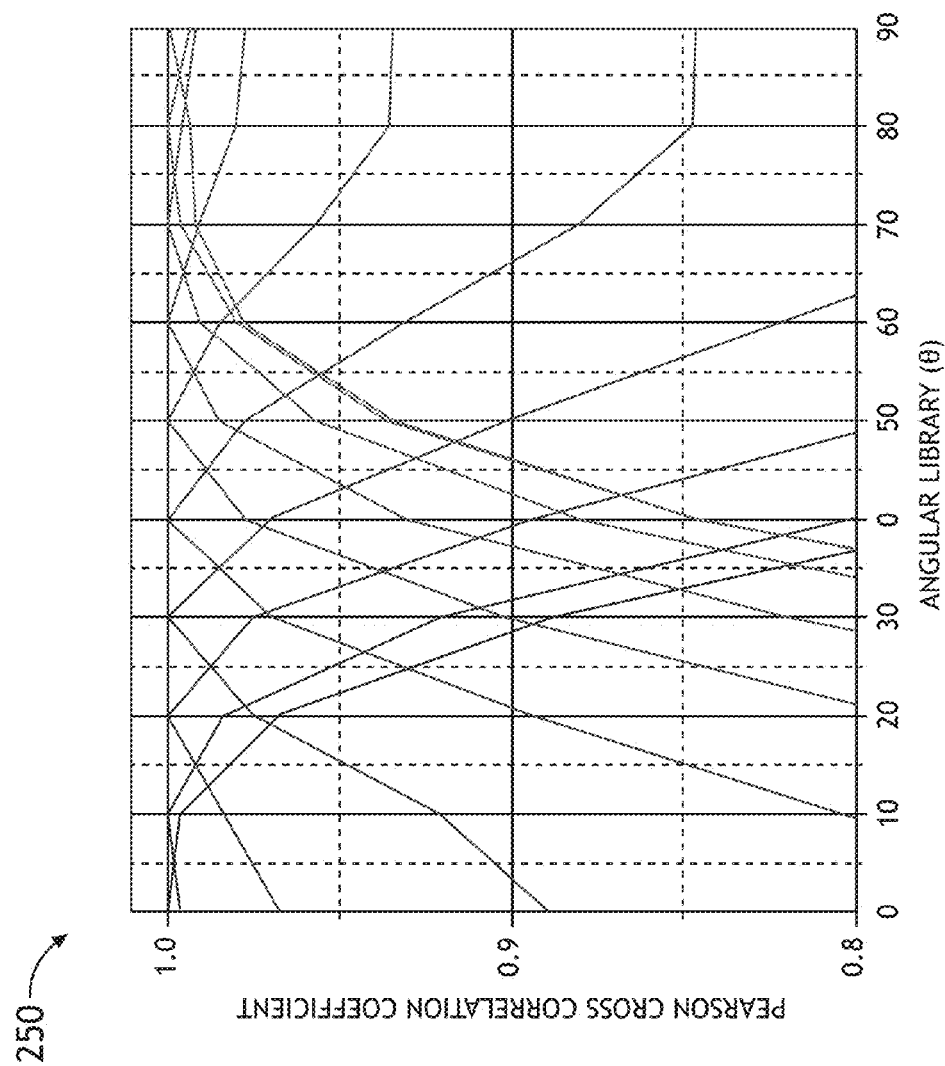
FIG. 2M illustrates the Pearson cross-correlation coefficient as a function of angular library for a number of incident angles, in accordance with one or more embodiments of the present disclosure.

In another embodiment, one or more characteristics of a neutron source 101 may be determined via a template-matching procedure. For example, a direction to a neutron source 101 may be determined via a template-matching procedure. For instance, the template-matching procedure may include, but is not limited to, a cross-correlation procedure, as depicted in FIG. 2K-2M. FIG. 2K illustrates a method 240 for carrying out a cross-correlation method. In step 242, a response library is generated. For example, a response library may be generated using a number of known sources. In step 244, one or more responses are measured for an unknown source. In step 246, the response from the measured unknown neutron source is compared to the various responses contained in the response library. FIG. 2L illustrates a graph of counts as a function of axial position for a number of neutron incident angles. FIG. 2M illustrates the Pearson cross-correlation coefficient as a function of angular library for a number of incident angles.

In another instance, the template-matching procedure may include, but is not limited to, a goodness-of-fit procedure. For example, the template-matching procedure may include, but is not limited to, a chi-squared goodness-of-fit test. A goodness-of-fit approach is generally described by Nikulin, M. S. in *Proceedings of the International Vilnius Conference on Probability Theory and Mathematical Statistics*, v.2, pp. 119-122 (1973), which is incorporated herein by reference in the entirety.

As noted throughout the present disclosure, the template-matching procedures of the present disclosure are not limited to determining neutron source direction/location and may be used determine one or more of: a direction of emanation of neutrons from the one or more neutron sources, a neutron dose associated with the one or more neutron sources or the type of the one or more neutron sources.

FIG. 2N illustrates system 100 equipped with an additional neutron detector/spectrometer 212 for determining a location of one or more neutron sources, in accordance with one or more embodiments of the present disclosure. In one embodiment, the additional detector 212 is positioned at an independent location from the neutron detector 102, as shown in FIG. 2N. In another embodiment, the additional neutron detector 212 is configured to determine the direction 205 from the additional neutron detector 212 to the one or more neutron sources 101. Again, the direction 205 to the one or more neutron sources 101 may be measured relative to a fixed reference point of the additional neutron detector 212. In another embodiment, the location 207 of the neutron source 101 is determined by identifying the position of intersection of the lines defining direction 203 and direction 207. In this regard, the analyzer 108 may identify the real-space intersection point of the lines defining direction 203 and direction 207 and convert the given position to a relative geographical position relative to one of the detectors 102,212 or an absolute geographical position displayed on the user interface 116 or transmitted to a portable communication device (e.g., smartphone, tablet, lap-top and etc.) or a remote server coupled to the analyzer 108 via a network (e.g., intranet or internet) (not shown).

It is further noted that the same detector 102 could identify a source at two or more different detector positions. The analyzer 108 may then log the real position of the detector for each measure and then after a second (or more measurements) can determine the intersection point of the direction vectors from those two points to find the source position.

It is noted herein that the directional and locational analysis described herein is not limited to the specific architecture described in FIGS. 2B and 2N and it is recognized herein that a variety of analogous architectures may be utilized to carry out direction and location determination. Further, while the present disclosure has focused on direction and location determination through the detection of neutrons with detection devices 105 of detector assemblies 104, it is recognized herein that direction and location determination may be carried out through the analogous detection of photons (e.g., gamma rays or x-rays) with one or more detection devices suitable for photon detection. For example, the detection devices 105, as previously noted herein, may be suitable for detecting both neutrons and photons. In this case, direction and location analysis may be carried out via the detection of neutrons, the detection of photons (e.g., gamma rays or x-rays) and/or the hybrid detection of neutrons and photons.

In another embodiment, the application of a machine learning procedure may be used to determine one or more of the following: a direction of emanation of neutrons from the one or more neutron sources, a neutron dose associated with one or more neutrons emanating from the one or more neutron sources, a kinetic energy associated with one or more neutrons emanating from the one or more neutron sources or the type of the one or more neutron sources.

In one embodiment, the machine learning procedure may include the incorporation of Artificial Neural Networks (ANNs). ANNs represent one class of problem solving tools in machine learning. In another embodiment, an ANN may be used to optimize (or at least improve) the accuracy of the vectorization procedure 210 described previously herein. Such an approach may implement a backpropagation method. The backpropagation method is described generally in R. Rojas, "The backpropagation algorithm", Springer Berlin Heidelberg, *Neural Networks* (1996) 149-182, which is incorporated herein by reference in the entirety.

FIG. 2O illustrates a conceptual view 260 of the operation of an ANN, in accordance with one or more embodiments of the present disclosure. For the purposes of clarity as single neuron 264 of the ANN is depicted in FIG. 2O, although it is recognized that a given ANN may include any number of neurons. One or more neurons of an ANN may receipt data from one or more inputs 262a-262c and use that information to create an output 266. In this regard, the neurons 264 of an ANN may create a mapping between the input data space (i.e., the measurement results by the detectors 105) and from those results provide an output (e.g., direction, dose, energy, source type, etc.). For instance, the ANN may be trained by providing known output results for a number of inputs. Then, the ANN may generate a model that serves to general the input/output relationship so that the ANN may predict output results not included in the training procedure of the ANN.

In another embodiment, the machine learning procedure may include the execution of a genetic algorithm. In one embodiment, a genetic algorithm is used to produce a set of ANNs. Then, the genetic algorithm may identify the ANN that best correlates the input and output of the detector system 100.

Figure 3A:
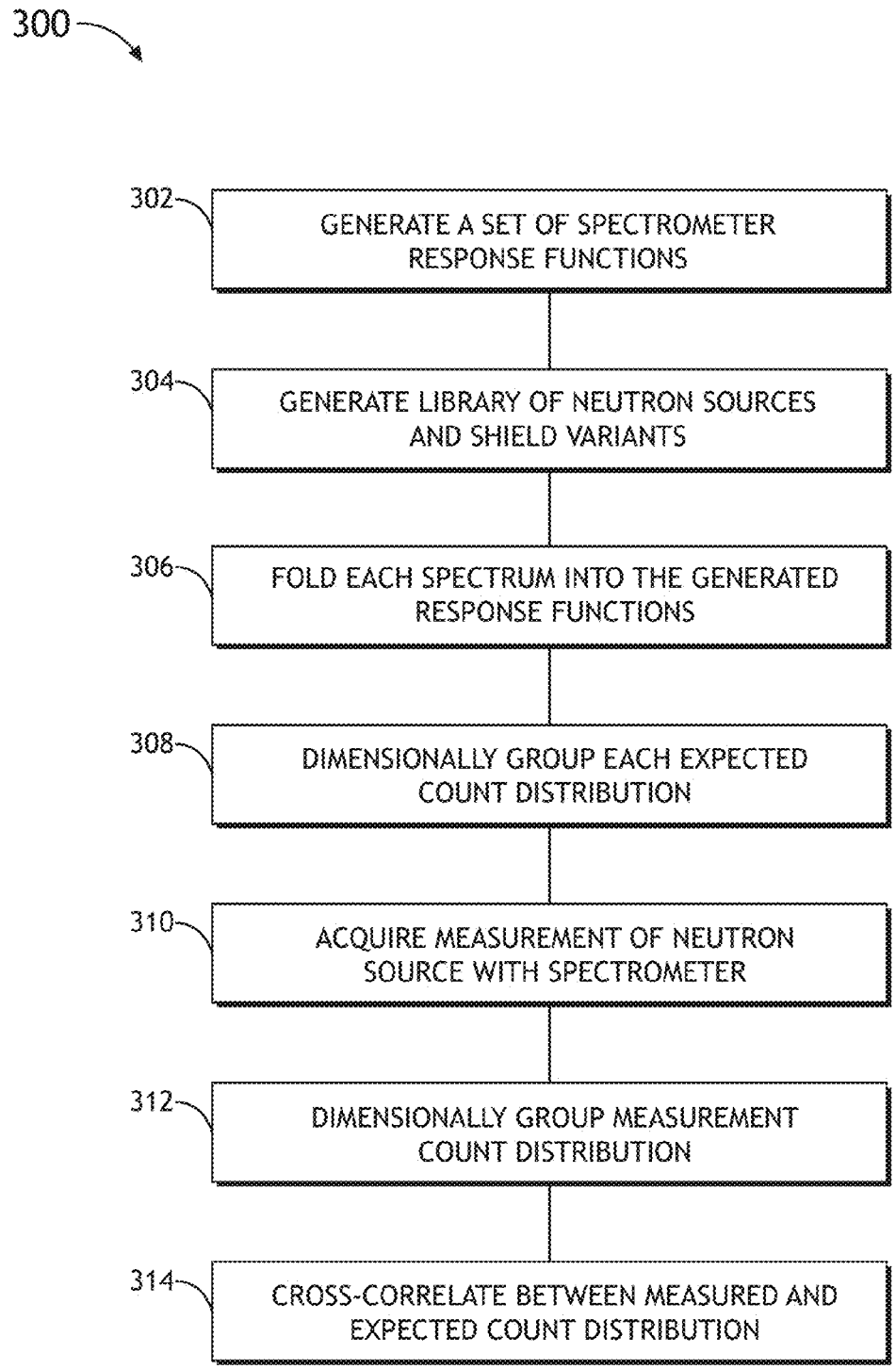
FIG. 3A illustrates a process flow diagram depicting a method for determining one or more neutron source characteristics via a multi-dimensional cross-correlation procedure, in accordance with one or more embodiments of the present disclosure.

FIG. 3A illustrates a process flow diagram 300 determining one or more neutron source characteristics via a multi-dimensional cross-correlation procedure, in accordance with one or more embodiments of the present disclosure. It is noted herein that method 300 may be, but is not required to be, carried out with any of the system-level embodiments of the present disclosure, such as, but not limited to, system 100. It is noted herein that the multi-dimensional cross-correlation procedure of the present embodiment may be extended to determine neutron source direction and localization, neutron source identification, neutron source proximity and/or kinetic energy of neutrons emanating from the neutron source.

In a first step 302, the analyzer 108 (or a remote computer system) generates a set of spectrometer response functions. For example, the analyzer 108 may perform a number of MCNP simulations to simulate a set of response functions for detector 102. By way of another example, a remote computer system may generate a set of spectrometer response functions, which are then loaded into the memory 112 of analyzer 108 of system 100. The generated responses functions may be represented by:

$$R((x_i, y_j, z_k), E)$$

In a second step 304, the system 100 may generate a library of responses associated with various neutron sources and shield variants. The library of responses associated with the various neutron sources and shield variants may be represented by:

$$\Phi^{S1}(E), \Phi^{S2}(E), \ldots, \Phi^{Sm}(E)$$

In a third step 306, the analyzer 108 folds each spectrum associated with the responses of step 304 into the generated responses of step 302 to form an expected count distribution for each source. The expected count distributions for each source (i.e., source 1 (S1) through source m (Sm)) may be represented by:

$$N^{S1}(x_i, y_j, z_k) = \sum_E R((x_i, y_j, z_k), E) \Phi^{S1}(E)$$

$$\vdots$$

$$N^{Sm}(x_i, y_j, z_k) = \sum_E R((x_i, y_j, z_k), E) \Phi^{Sm}(E)$$

Figure 3B:
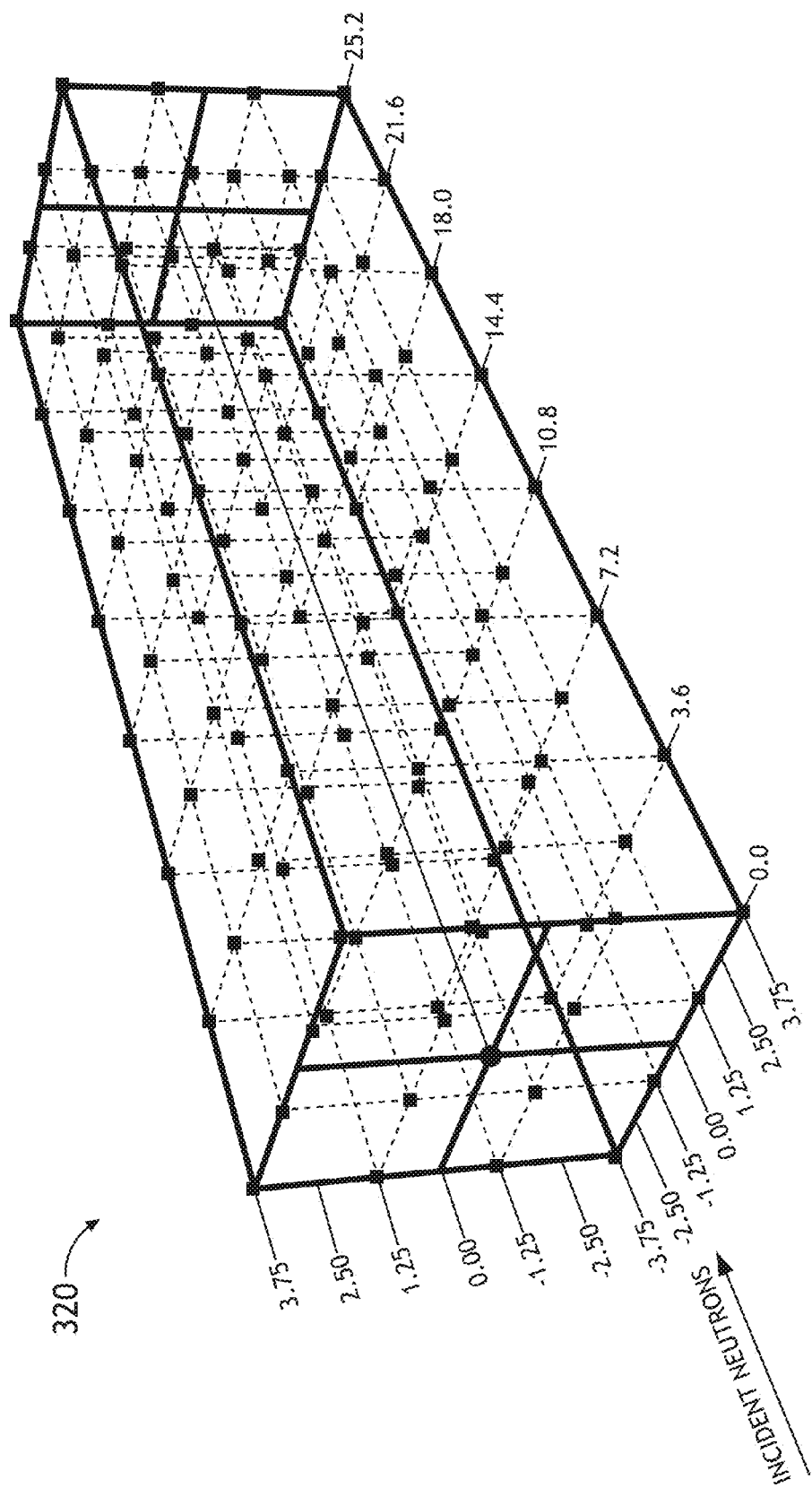
FIG. 3B illustrates a conceptual view of the detection devices and the grouping of expected counts in a 1D grouping, in accordance with one or more embodiments of FIG. 3C illustrates a conceptual view of the detection devices and the grouping of expected counts in a cylindrical coordinate grouping scenario, in accordance with one or more embodiments of the present disclosure.
Figure 3C:
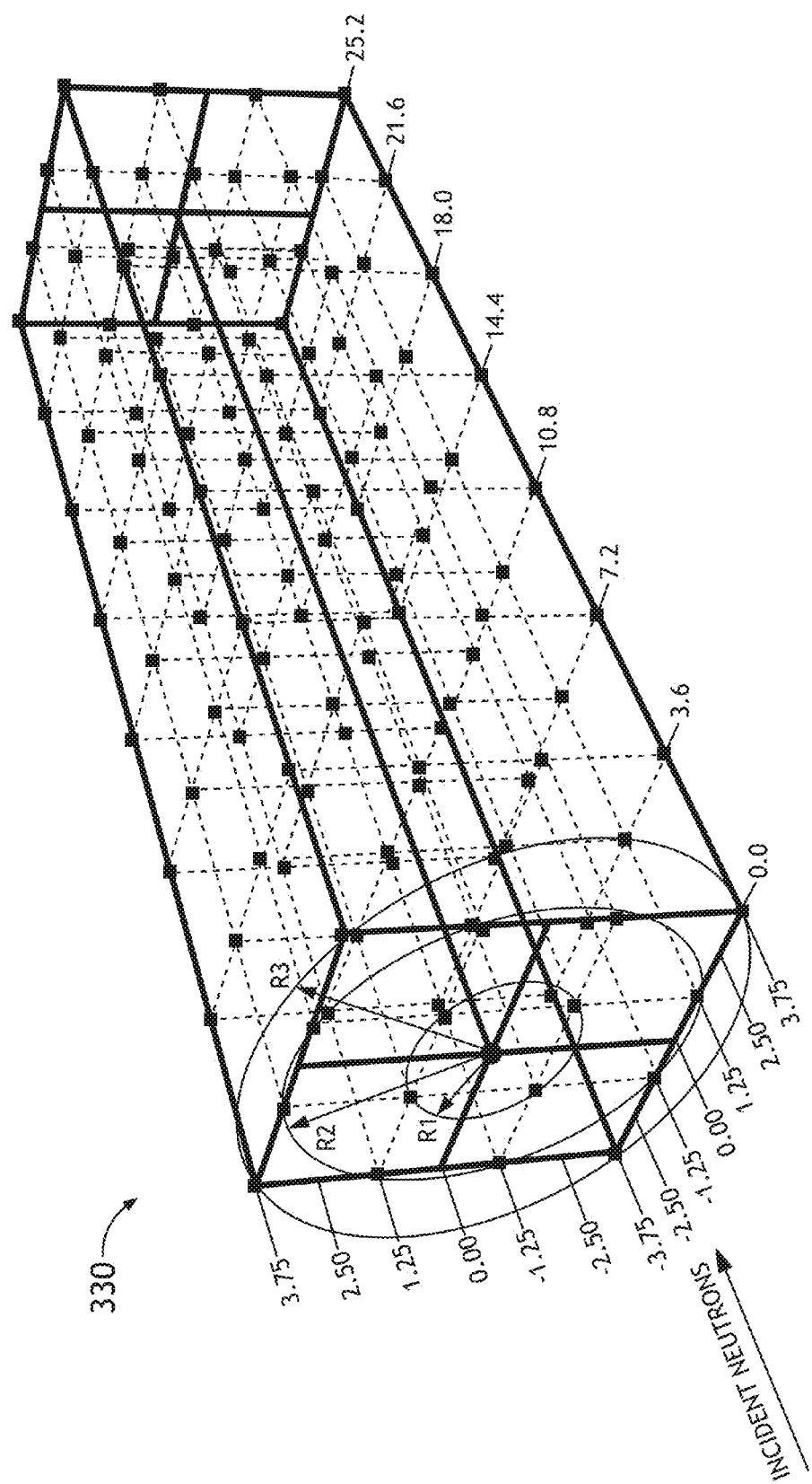
FIG. 3D illustrates the output of a 2-D cross-correlational analysis with neutron intensity counts plotted along X and radial positions, in accordance with one or more embodiments of the present disclosure.

In a fourth step 308, the analyzer 108 dimensionally groups each expected count distribution. h this regard, the expected count distributions may be grouped into 1-D, 2-D, 3-D or any dimensional groupings. FIG. 3B illustrates a conceptual view 320 of the detection devices 105 and the grouping of expected counts in a 1D grouping, while FIG. 3C illustrates a conceptual view 330 in a cylindrical coordinate grouping scenario. The grouping of step 308 may be represented by $$1D: N^{S1}(x_i) = \sum_{k=1}^{n_z} \sum_{j=1}^{n_y} N^{S1}(x_i, y_j, z_k),$$

$$2D: N^{S1}(r_p, x_i) = \sum_{q=1}^{n_\theta} N^{S1}(r_p, \theta_q, x_i),$$

$$3D: N^{Sl}(x_i, y_j, z_k) \text{ [no grouping], for } l = 1, 2, \ldots, m$$

In a fifth step 310, the system 100 acquires a measurement of a neutron source 101 with spectrometer/detector 102.

In a sixth step 312, the analyzer 108 dimensionally groups the measurement count distributions. It is noted that this step may be carried out in a manner similar to step 308.

Figure 3D:
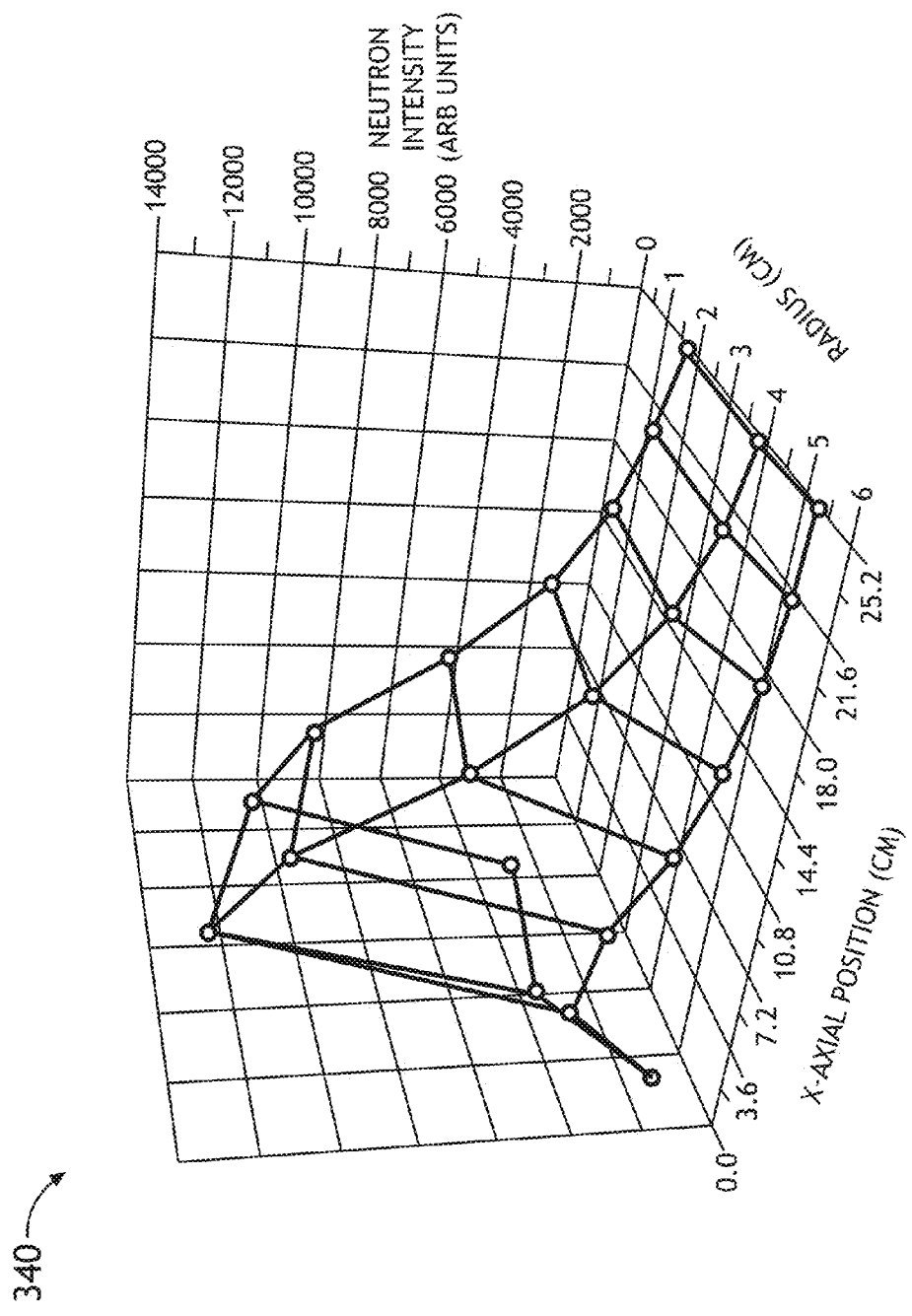

In a seventh step 314, the analyzer 108 performs a cross-correlation procedure between the measured count distributions of step 312 and the expected count distributions of step 306. Further, a coefficient of determination may be calculated between the measured count distribution and each of the expected count distributions. For example, the Pearson product-moment cross-correlation coefficient may be calculated between the measured count distribution and each of the expected count distributions. The corresponding coefficients of determination may be represented by.

$$1D: r^2_{M,S_l}(x) = \left[ \frac{1}{n_x} \cdot \sum_{i=1}^{n_x} \frac{N^M(x_i) - \overline{N^M(x)}}{\sigma_{N^M(x)}} \cdot \frac{N^{S_l}(x_i) - \overline{N^{S_l}(x)}}{\sigma_{N^{S_l}(x)}} \right]^2,$$

$$2D: r^2_{M,S_l}(r, x) =$$
$$\left[ \frac{1}{n_r n_x} \cdot \sum_{i=1}^{n_x} \sum_{p=1}^{n_r} \frac{N^M(r_p, x_i) - \overline{N^M(r, x)}}{\sigma_{N^M(r,x)}} \cdot \frac{N^{S_l}(r_p, x_i) - \overline{N^{S_l}(r, x)}}{\sigma_{N^{S_l}(r,x)}} \right]^2,$$

$$3D: r^2_{M,S_l}(x_i, y_j, z_k) =$$
$$\left[ \frac{1}{n_x n_y n_z} \cdot \sum_{k=1}^{n_z} \sum_{j=1}^{n_y} \sum_{i=1}^{n_x} \frac{N^M(x_i, y_j, z_k) - \overline{N^M(x,y,z)}}{\sigma_{N^M(x,y,z)}} \cdot \frac{N^{S_l}(x_i, y_j, z_k) - \overline{N^{S_l}(x,y,z)}}{\sigma_{N^{S_l}(x,y,z)}} \right]^2$$

for $l = 1, 2, \ldots, m$; where $\overline{N(\cdot)}$ = average of $N(\cdot)$ and $\sigma_{N(\cdot)}$ = standard deviation of $N(\cdot)$ FIG. 3D illustrates the output 340 of a 2-D cross-correlational analysis with neutron intensity counts plotted along X and radial positions.

Figure 4A:
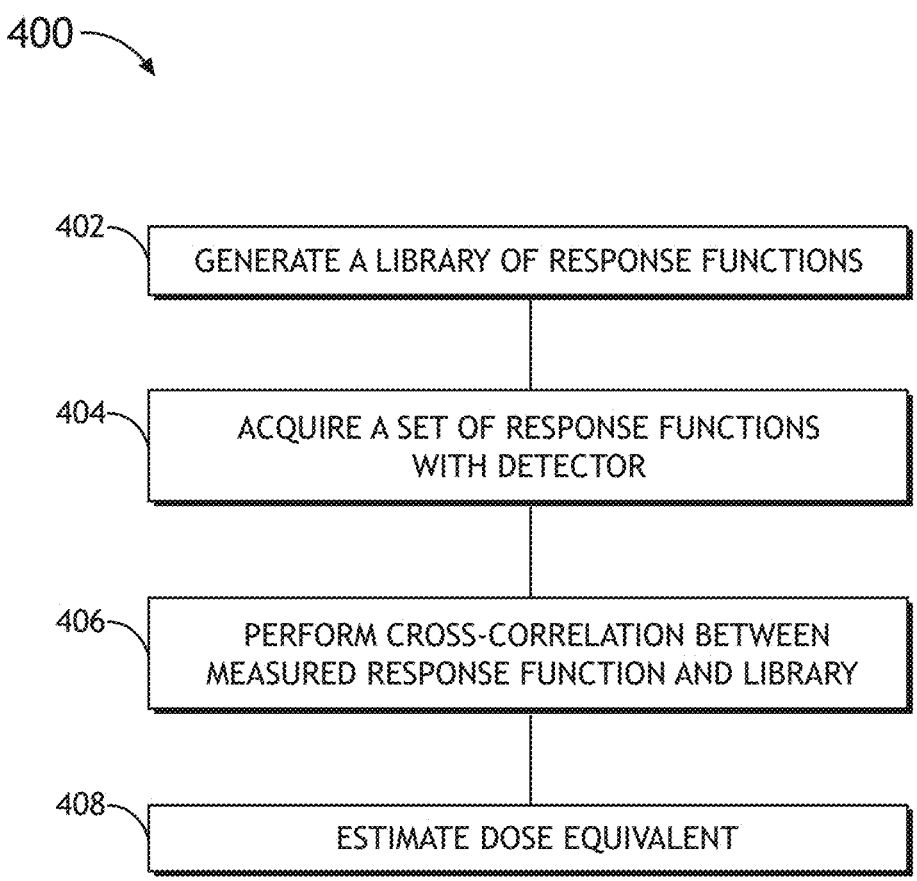
FIG. 4A illustrates a process flow diagram depicting a method for estimating neutron dose based on a cross-correlation procedure, in accordance with one or more embodiments of the present disclosure.

FIG. 4A illustrates a process flow diagram 400 depicting a method for estimating neutron dose based on a cross-correlation procedure, in accordance with one embodiment of the present disclosure. It is noted herein that method 400 may be, but is not required to be, carried out with any of the system-level embodiments of the present disclosure, such as, but not limited to, system 100.

In a first step 402, a library of response functions for the various detection devices 105 of a detector 102 are formed. For example, a library of response functions may conceptually be described as $X=x_1, x_2, \ldots, x_n$. Table 1 below is illustrative of a library of response functions that may be stored in the memory of analyzer 108.

TABLE 1

Example Neutron Source/Dose Library for Rem Application

| Library Entry | Source Type | RESPONSE LIBRARY - CROSS CORRELATION VALUES | | | | | | | | RefDeT | Dose |
| --- | --- | --- | --- | --- | --- | --- | --- | --- | --- | --- | --- |
| | | Det1 | Det2 | Det3 | Det4 | Det5 | Det6 | Det7 | Det8 | | |
| 1 | Cf-252 (PTB) | 1.343876 | 1.578737 | 0.429342 | −0.25382 | −0.59475 | −0.75886 | −0.84441 | −0.90011 | 2 | 109.6261 |
| 2 | AmBe (PTB) | 1.404794 | 1.535048 | 0.384746 | −0.23663 | −0.5588 | −0.73635 | −0.84839 | −0.94442 | 2 | 149.5408 |

TABLE 1-continued

Example Neutron Source/Dose Library for Rem Application

| Library Entry | Source Type | RESPONSE LIBRARY - CROSS CORRELATION VALUES | | | | | | | | RefDeT | Dose |
|---|---|---|---|---|---|---|---|---|---|---|---|
| | | Det1 | Det2 | Det3 | Det4 | Det5 | Det6 | Det7 | Det8 | | |
| 3 | D2O Cf-252 (PTB) | 1.560856 | 1.589148 | 0.023256 | −0.50198 | −0.63259 | −0.66808 | −0.68147 | −0.68913 | 2 | 21.23168 |
| 4 | Fe mod Cf-252 (TKO) | −0.31483 | 1.782693 | 1.207828 | 0.205156 | −0.41615 | −0.70883 | −0.84213 | −0.91473 | 2 | 168.3532 |
| 5 | C mod Cf-252 (TKO) | −0.13707 | 1.967227 | 0.99478 | 0.024912 | −0.47453 | −0.69861 | −0.80589 | −8.87083 | 2 | 122.7994 |
| 6 | PE mod Cf-252 D = 29.2 cm (JINR) | 2.42906 | 0.099216 | −0.29041 | −0.39678 | −0.44022 | −0.45887 | −0.46796 | −0.47402 | 1 | 11.50454 |
| 7 | PE mod Cf-252 D = 12.7 cm (JINR) | 2.341342 | 0.400279 | −0.18581 | −0.40477 | −0.49631 | −0.53491 | −0.55364 | −0.56617 | 1 | 22.99412 |
| 8 | PuBe (LANL) | 0.697246 | 1.51383 | 0.901816 | 0.253316 | −0.32199 | −0.73361 | −1.02604 | −1.28456 | 2 | 303.7002 |
| 9 | H2O PuBe (LANL) | 2.234504 | 0.568738 | −0.17462 | −0.3952 | −0.50322 | −0.56832 | −0.61204 | −0.64984 | 1 | 47.14916 |
| 10 | D2O PuBe (LANL) | 2.240112 | 0.700085 | −0.29183 | −0.47838 | −0.52416 | −0.5409 | −0.54953 | −0.5554 | 1 | 10.2954 |
| 11 | PE + Fe mod CF-252 (NRI) | 2.412205 | 0.184507 | −0.30217 | −0.40735 | −0.45008 | −0.47007 | −0.48023 | −0.48661 | 1 | 11.93445 |
| 12 | Fe mod CF-252 (NRI) | −0.32067 | 1.78174 | 1.206608 | 0.209844 | −0.40922 | −0.70394 | −0.94244 | −0.92192 | 2 | 171.9183 |
| 13 | BWR 2 (Caorso) | 0.257096 | 2.127557 | 0.641265 | −0.25924 | −0.58961 | −0.69599 | −0.73227 | −0.74881 | 2 | 52.22014 |
| 14 | PWR 2 (Wolf Creek) | 1.767952 | 1.422345 | −0.18 | −0.5313 | −0.60638 | −0.62179 | −0.625 | −0.62533 | 1 | 8.454655 |
| 15 | PWR 5 (Wolf Creek) | 1.566242 | 1.618661 | −0.09403 | −0.54263 | −0.62682 | −0.6393 | −0.64095 | −0.64118 | 2 | 4.251327 |
| 16 | Med Accel 1 (Microtron) | 0.210084 | 1.982579 | 0.870293 | −0.09284 | −0.55475 | −0.74148 | −0.81789 | −0.856 | 2 | 97.68898 |
| 17 | 35 MeV Cyclotron 1 (TKO) | 1.412837 | 1.625065 | 0.266263 | −0.38654 | −0.63254 | −0.72673 | −0.76763 | −0.79072 | 2 | 58.81061 |

In this regard, a neutron source/dose library may be provided with the system 100 for use in estimating the dose-equivalent based on the similarity between measured and reference responses. Note that the first eight values provided in the library are not counts, but rather represent translated values, which are more suitable for use in cross-correlation calculations in order to reduce processing requirements. Values nine and ten are reserved for dose determination following positive source identification.

in a second step 404, a measurement of a neutron source 101 is performed and a set of response functions are acquired with the detection devices 105 of a detector 102. Conceptually, the acquired response functions may be represented as $Y = y_1, y_2, \ldots, y_n$.

For example, a 252-Cf source, which imposes a flux, $\varphi = 100$ neutrons cm$^{-2}$ sec$^{-1}$, incident on the face of the spectrometer, at a sample time of 15 seconds, may result in the yield the count profile in Table 2.

TABLE 2

Spectrometer Response (Count Profile) to a 252-Cf source

| | Det1 | Det2 | Det3 | Det4 | Det5 | Det6 | Det7 | Det8 |
|---|---|---|---|---|---|---|---|---|
| Counts | 3245 | 3507 | 1863 | 934 | 463 | 225 | 100 | 25 |

Note that this combination of source and fluence/flux corresponds to a dose-equivalent of $3.86 \times 10^5$ pSv, or dose-equivalent rate of $9.65 \times 10^4$ pSv/min.

Given the count profile in Table 2 as sampled by the spectrometer, it is desirable to determine the corresponding dose-equivalent. This can be done by comparing the sampled count profile to the M reference profiles stored in the neutron source/dose library using a normalized cross-correlation analysis.

In step 406, a cross-correlation analysis between the measured response functions and the library response functions is performed. In one embodiment, given a library function vector and a measured function vector, a mean ($\bar{x}$, $\bar{y}$) and standard deviation ($\sigma_x$, $\sigma_y$) for both the library function vector X and the measured function vector Y may be calculated. Further, the norm of each vector may be calculated by subtracting the mean from each term and dividing by the standard deviation. In another embodiment, cross-correlation may be determined via the summation of the norm term products for all X and Y through the following relationship:

$$R_{cc} = \frac{1}{n-1} \sum_{i=1}^{n} \frac{(x_i - \bar{x})(y_i - \bar{y})}{\sigma_x \sigma_y}$$

Specifically, in terms of detector number and reference profile, the cross-correlation score may be expressed as:

$$\text{Score}_j = \frac{1}{N-1} \sum_{i=1}^{N} \left( \frac{\det_i - \overline{\det}}{\sigma_{det}} \right) \left( \frac{ref_{i,j} - \overline{\det}_j}{\sigma_{det,j}} \right);$$

$j$ = source 1 to source M where i refers to the detector number (det1-det8) and j refers to the reference profile (Cf-252, AmBe, etc.). The above calculation may be performed for each of the M reference profiles to generate a series of scores between −1 and 1. The reference profile that receives the highest score is deemed the closest match to the sampled count profile and will be used to estimate the dose-equivalent with values nine and ten. Note that the right most expression in parenthesis of the above cross-correlation calculation may be performed offline and is reflected in the values 1-8 in the neutron source/dose library in Table 1.

The count profile in Table 2 is used to calculate a vector from the left most expression in parenthesis of the above cross-correlation calculation. Results are shown in Table 3 below.

TABLE 3

| | Vector of Count Profile Minus Mean Over Standard Deviation | | | | | | | |
|---|---|---|---|---|---|---|---|---|
| | Det1 | Det2 | Det3 | Det4 | Det5 | Det6 | Det7 | Det8 |
| Counts | 1.340643 | 1.588663 | 0.413017 | −0.24767 | −0.59238 | −0.76263 | −0.8453 | −0.89435 |

In another embodiment, the score for each source can be individually calculated by taking the inner product of the Table 3 vector and values 1-8 in the neutron source/dose reference library. The resulting cross-correlation scores are shown in Table 4 below.

TABLE 4

Normalized Cross-Correlation Scores for Count Profile

| Library Entry | Source Type | CC Score |
|---|---|---|
| 1 | Cf-252 (PTB) | 0.999967 |
| 2 | AmBe (PTB) | 0.999125 |
| 3 | D2O Cf-252 (PTB) | 0.975386 |
| 4 | Fe mod Cf-252 (TKO) | 0.739264 |
| 5 | C mod Cf-252 (TKO) | 0.802873 |
| 6 | PE mod Cf-252 D = 29.2 cm (JINR) | 0.688955 |
| 7 | PE mod Cf-252 D = 12.7 cm (JINR) | 0.782087 |
| 8 | PuBe (LANL) | 0.916546 |
| 9 | H2O PuBe (LANL) | 0.844841 |
| 10 | D2O PuBe (LANL) | 0.828226 |
| 11 | PE + Fe mod CF-252 (NRI) | 0.70987 |
| 12 | Fe mod CF-252 (NRI) | 0.737565 |
| 13 | BWR 2 (Caorso) | 0.88892 |
| 14 | PWR 2 (Wolf Creek) | 0.944068 |
| 15 | PWR 5 (Wolf Creek) | 0.96299 |
| 16 | Med Accel 1 (Microtron) | 0.880679 |
| 17 | 35 MeV Cyclotron 1 (TKO) | 0.995212 |

By way of example, upon examination of the Normalized Cross-Correlation Scores in Table 4, the Cf-252 (PTB) reference source exhibits the highest value of 0.999967, implying that it is the closest match to the sampled count profile. h turn, values 9 and 10 from the Cf-252 (PTB) library row may be used to estimate the dose-equivalent. Based on Table 1, value 9 corresponds to "2" and value 10 corresponds to "109.6261". As such, the analyzer 108 may multiply the total number of counts as recorded by detector 2 (per value 9) by 109.6261 (per value 10) to reach the dose-equivalent in pSv. Based on Table 2, detector 2 has recorded 3507 courts during the 15 second sample time. Therefore, the estimated dose equivalent over 15 seconds is given by.

$$\text{Dose Equivalent} = 3507 \times 109.6261 = 3.8446 \times 10^5 \text{ pSv}$$

The above value, when expressed in units of mrem, corresponds to the following:

$$\text{Dose Equivalent} = 3.8446 \times 10^5 \text{ pSv} \times \frac{10^{-7}}{1 \text{ pSv}} = 3.8446 \times 10^{-2} \text{ mrem}$$

It is noted herein that one or more of the various machine learning techniques described previously herein may be applied to the present embodiment in order to improve the performance of system 100 during a dose equivalent determination process. In addition, one or more multi-dimensional cross-correlation methods described previously herein may be applied to the present embodiment in order to improve the performance of system 100 during a dose equivalent determination process.

Figure 4B:
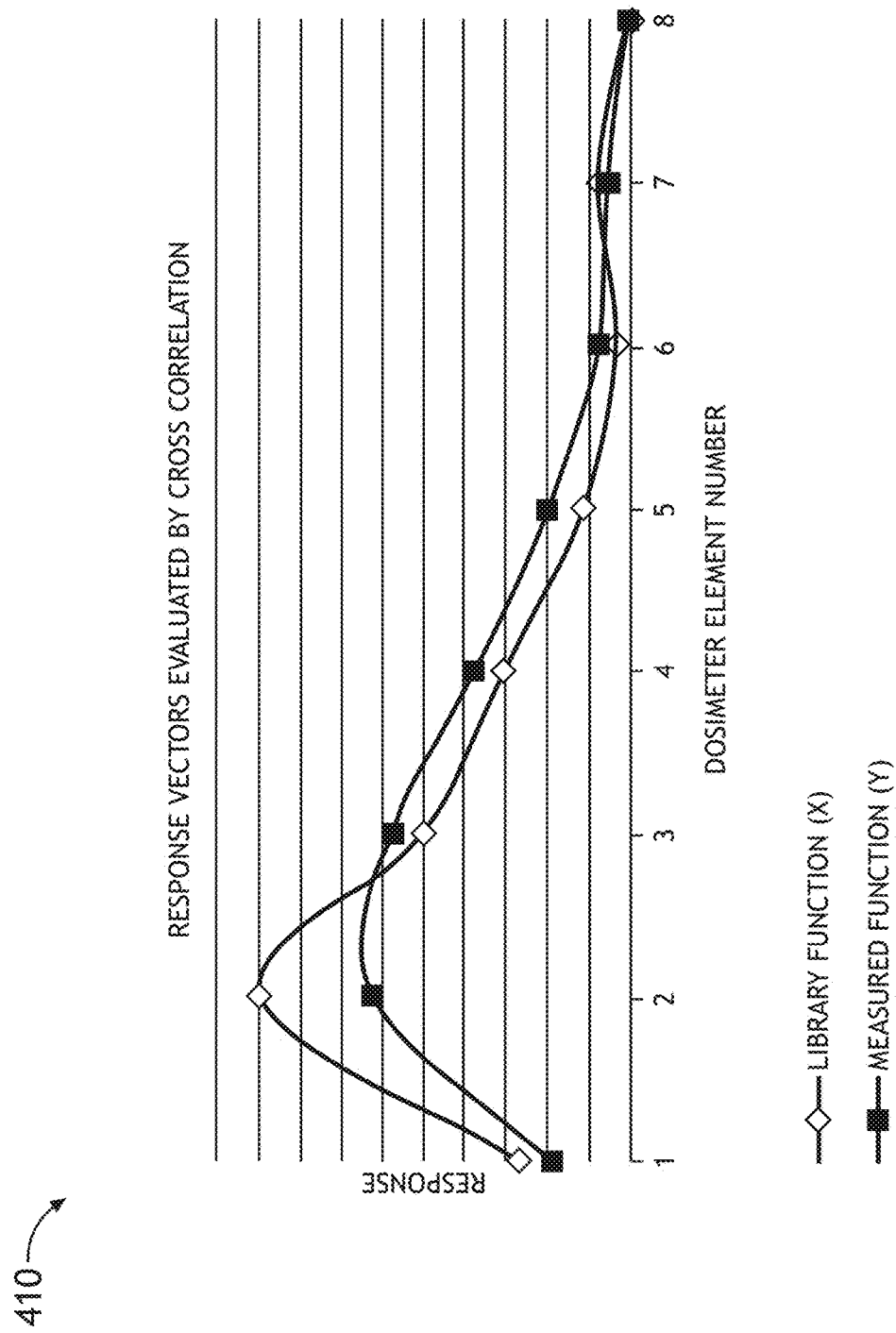
FIG. 4B illustrates a graph of library response vectors and measured response vectors as a function of dosimeter element number, in accordance with one or more embodiments of the present disclosure.

FIG. 4B illustrates a graph 410 of library response vectors and measured response vectors as a function of dosimeter element number.

Figure 5A:
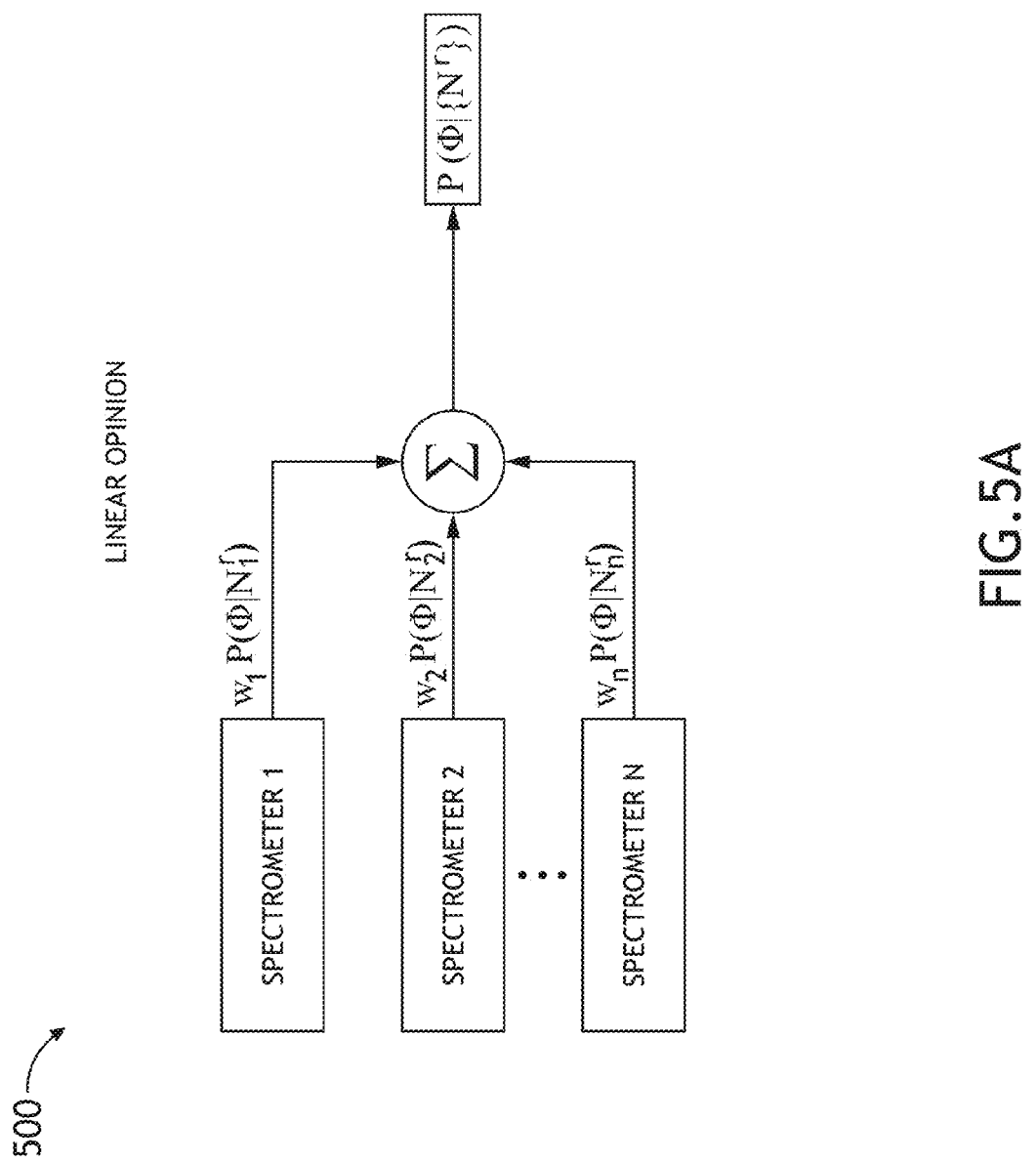
FIG. 5A illustrates a conceptual view of a linear opinion pool procedure, in accordance with one or more embodiments of the present disclosure.
Figure 5B:
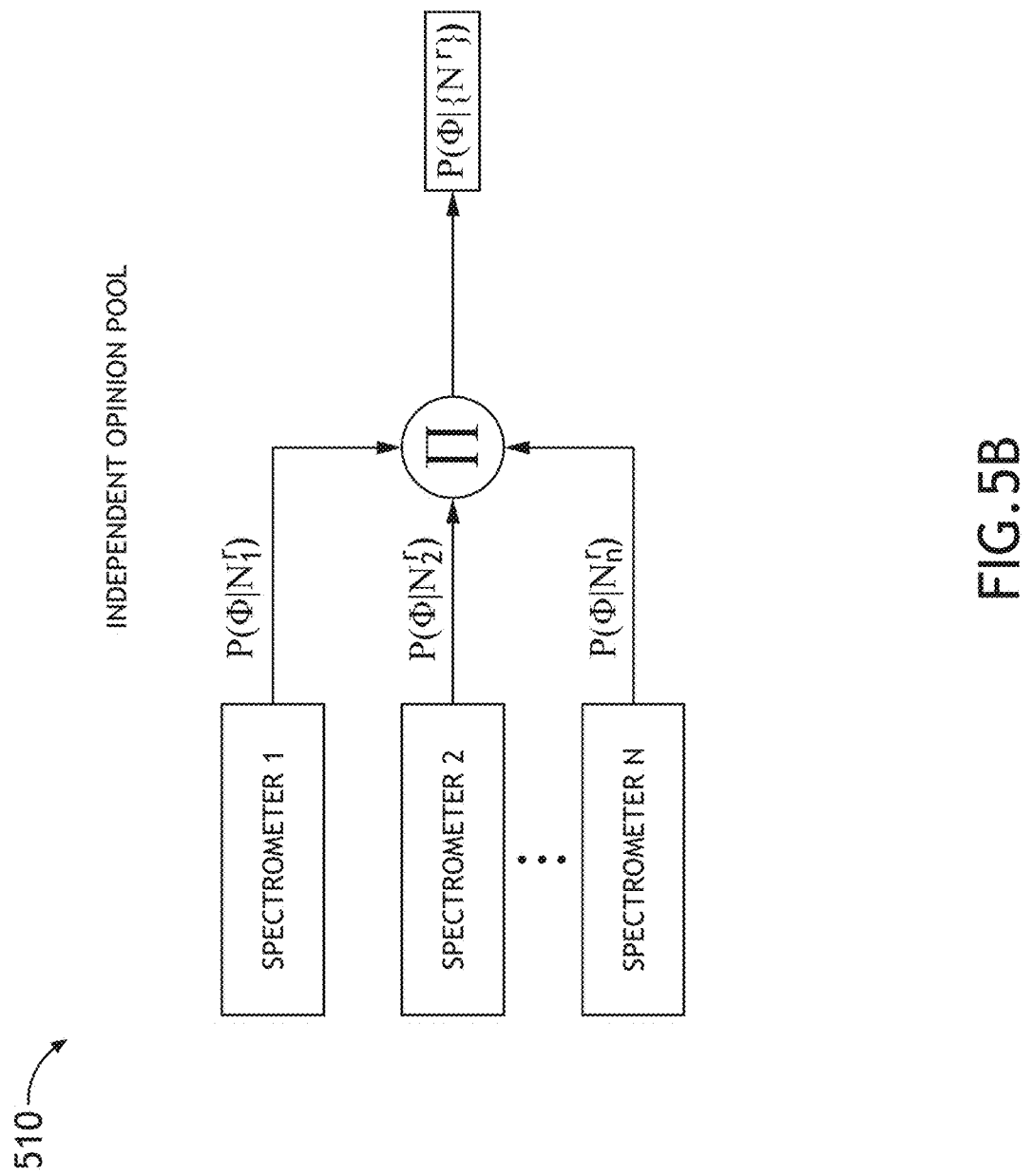
FIG. 5B illustrates a conceptual view of an independent opinion pool procedure, in accordance with one or more embodiments of the present disclosure.
Figure 5C:
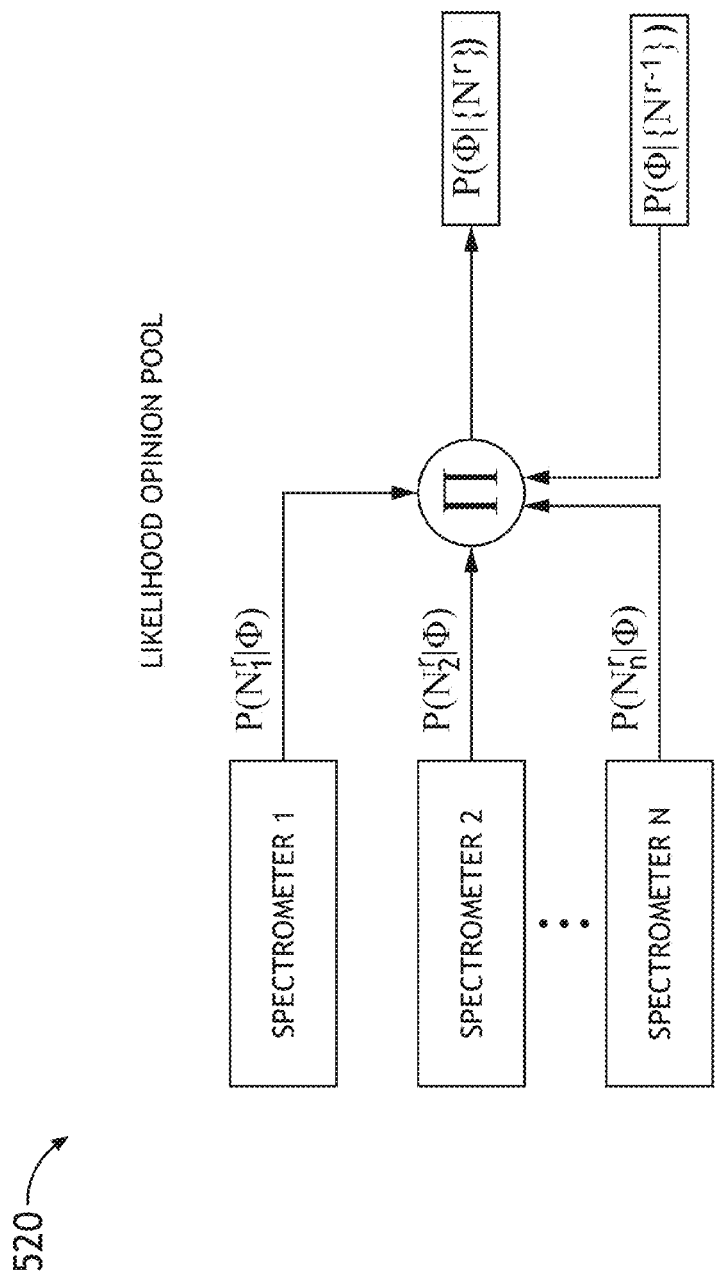
FIG. 5C illustrates a conceptual view of a likelihood opinion pool procedure, in accordance with one or more embodiments of the present disclosure.

FIGS. 5A-5C illustrates a series of process flow diagrams depicting methods 500, 510, 520 for fusing photon-energy-sensitive measurements, in accordance with one or more embodiments of the present disclosure. In one embodiment, the set of spectrometers 1 . . . N correspond to a set of gamma ray scintillators 1 . . . N. In this embodiment, each of the gamma ray scintillators may measure a different pulse height spectrum, which can be viewed in terms of probability distributions for the measured data, $N_1, \ldots, N_n$, from each scintillator. The probability distributions may be denoted $P(N_1), \ldots, P(N_n)$. In the first two data fusion methods 500, 510, utilizing each scintillator's unique response matrix (as well as any available "a priori" information), the pulse height spectra may be separately deconvolved, using any deconvolution algorithm known in the art. The deconvolution process of each spectrometer results in a local posterior probability distribution of the fluence vector, $\phi$, given the measurement data (pulse-height spectrum), N, from the spectrometer. The local posterior conditional probability distributions may be denoted $P(\phi|N_1), \ldots, P(\phi|N_n)$ in the diagrams for the first two methods, corresponding to scintillator 1, . . . , scintillator n.

FIG. 5A illustrates a linear opinion pool procedure 500, in accordance with one embodiment of the present disclosure. hi process 500, the local posterior conditional probability distributions for $\phi$ for each given N are then combined (or "fused") using the weighted sum: $P(\phi|N_1, \ldots, N_n) = w_1 * P(\phi|N_1) + \ldots + w_n * P(\phi|N_n)$, where $w_1 + w_2 \ldots + w_n = 1$, and $w_1 \text{-} w_n$ are chosen to subjectively represent the relative reliability of each scintillator measurement. The resulting $P(\phi|N_1, \ldots, N_n)$ represents the global posterior conditional probability distribution of the fluence vector, $\phi$, given all of the measured pulse height spectrum data, $N_1, \ldots, N_n$.

FIG. 5B illustrates an independent opinion pool procedure 510, in accordance with one embodiment of the present disclosure. In process 510, the independent opinion pool, is similar to that of the linear opinion pool process 500 except that the combination ("fusion") procedure involves a normalized product instead of a weighted sum. In this embodiment, the global posterior conditional probability distribution is given by $P(\phi|N_1, \ldots, N_n) = \alpha * [P((\phi|N_1) * \ldots * P(\phi|N_n)]$, where $\alpha$ is a normalization constant.

FIG. 5C illustrates a likelihood opinion pool procedure 520, in accordance with one embodiment of the present disclosure. In process 520, a priori information may be combined with the likelihood functions for each pulse height spectrum given a guess of the fluence vector, $P(\phi|N_i)$, (instead of local posterior conditional probability distributions) to iteratively obtain a global posterior conditional probability distribution $P((\phi|N_1, \ldots, N_n)$, which is given by:

$$P(\Phi|\{N^r\}) = \alpha \prod_j P(\Phi|N_j^r)$$

It is noted herein that utilizing the process(es) described above it is straightforward to combine the output of two or more neutron detector devices, such as those associated with system 100. Further, the processes 500, 510, 520 may be executed on analyzer 108 (or another remotely situated controller) via the one or more processing elements 110. In other embodiments, the above processes 500, 510, 520 may be adapted to allow for the combination of the output of one or more neutron detectors with the output of one or more photon detectors (e.g., gamma ray scintillators), such as those associated with system 120 of FIG. 1B. It is noted that orthogonality and/or complementarity aspect of this approach is based on the fact that the noise, artifacts and intensity vs. X plots obtained from neutron data are very different from the gamma-ray transduction process, so the overlap of those signatures is more powerful than in the gamma or neutron response function fusion alone.

Figure 6A:
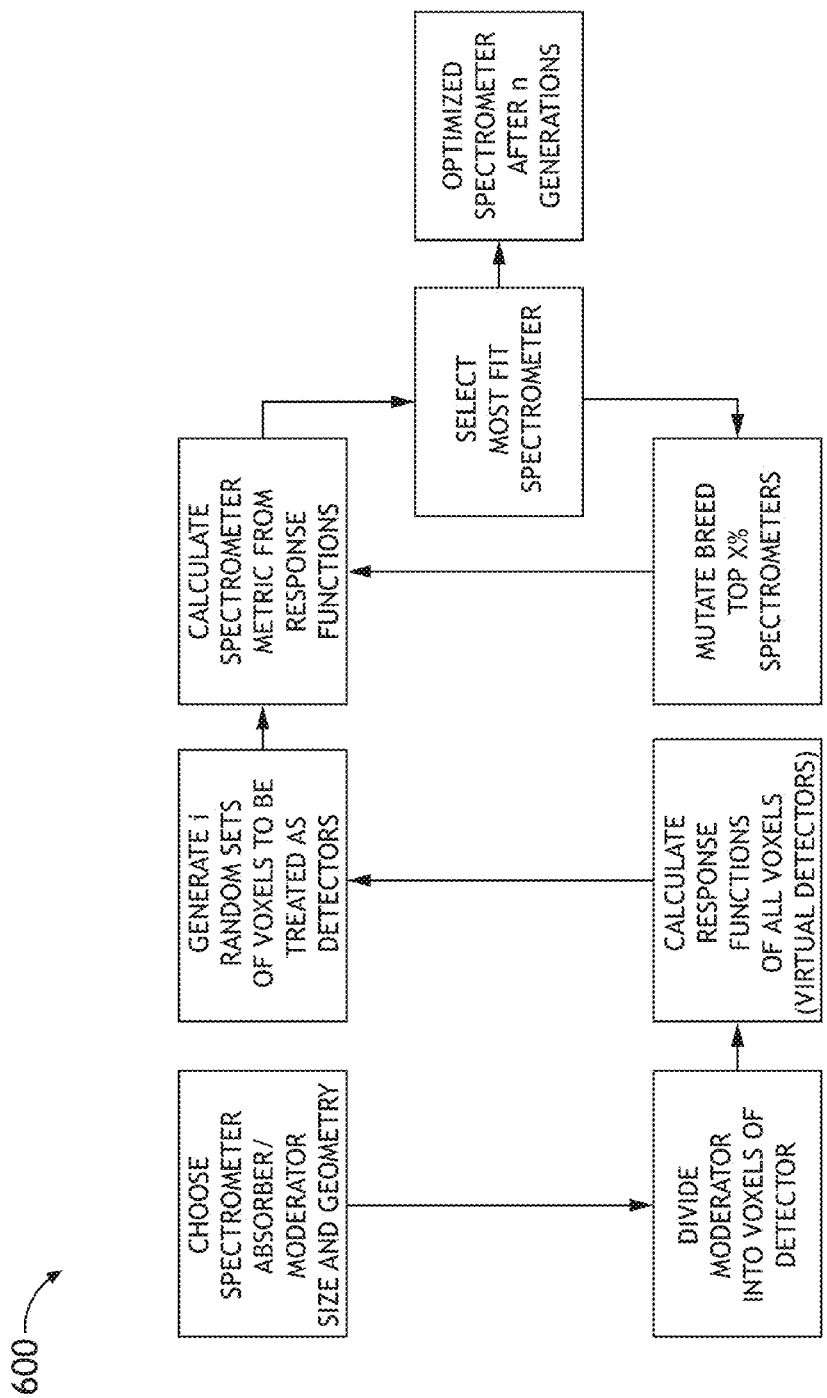
FIG. 6A illustrates a process flow diagram depicting a method for optimizing detector position of the spectrometer, in accordance with one or more embodiments of the present disclosure.

FIG. 6A illustrates a method 600 for optimizing detector position of the spectrometer 102, in accordance with one or more embodiments of the present invention. It is noted that steps 601-608 of method 600 may be carried out on any computer system (e.g., including one or more processing elements), such as, but no limited to, analyzer 108 or a dedicated remote computer system.

In step 601, a detector geometry is selected. For example, a user may, via one or more controllers (not shown), choose the size and geometry (e.g., relative arrangement and sizing) of the spectrometer, absorber and/or moderator of a given spectrometer configuration.

In step 602, the moderator of the spectrometer configuration is divided into a set of voxels. For example, the moderator may be divided into a set of voxels having detector-equivalent area and/or thickness. For the purposes of the present disclosure, the voxels of method 600 may be thought of as "virtual detectors", as no detection material is actually simulated in that region. Nevertheless, a detector response may be calculated for the voxel based on the flux through the voxel, as if a detector had actually been placed in that location.

In step 603, response functions are calculated for all voxels. For example, one or more controllers may perform a MCNP process to calculate the response functions for the entire moderating volume in each voxel. Such an approach allows the one or more controllers to analyze the neutron flux through the entire available space for detector placement with a single MCNP study.

In step 604, a selected number of random sets of voxels are generated as virtual detectors. For example, the one or more controllers may generate i number of random sets of voxels to be treated as virtual detectors.

It is assumed that the placement of a detector has a negligible effect on the response functions of other detectors in the spectrometer. For example, if a single detector is added in the front of the spectrometer, there is a negligible effect on a detector that is nearby. Given this assumption is true, the moderator-detector-absorber optimization problem may be reduced to just a moderator-absorber optimization problem by using a genetic algorithm to handle the detector placement optimization for a given moderator-absorber configuration. One can use intuition and experience for generating a moderator-absorber configuration for the spectrometer, and then to divide the moderator into detector-equivalent regions (i.e. voxels). These regions are referred to as voxels and virtual detectors, as no detection material is actually simulated, but one can calculate a detector response from the flux through the voxel, as if a detector had actually been placed at that location. A single MCNP study is then performed to calculate the response functions for the entire moderating volume in each voxel. This allows one to analyze the neutron flux through the entire available space for detector placement with a single MCNP study. A genetic algorithm is then designed to evolve sets of virtual detectors to include in the calculation of the optimization metric. This optimization metric may include a cross correlation score with known spectra, condition number of the resulting response matrix, resolving power for selected energies, intrinsic efficiency, or any other metric that will improve the effectiveness of the spectrometer design. The output of the genetic algorithm is thus a set of detector positions that will maximize the metric, providing optimized detector positions for the given moderator-absorber configuration. This dramatically reduces the parameter space for spectrometer optimization.

Figure 6B:
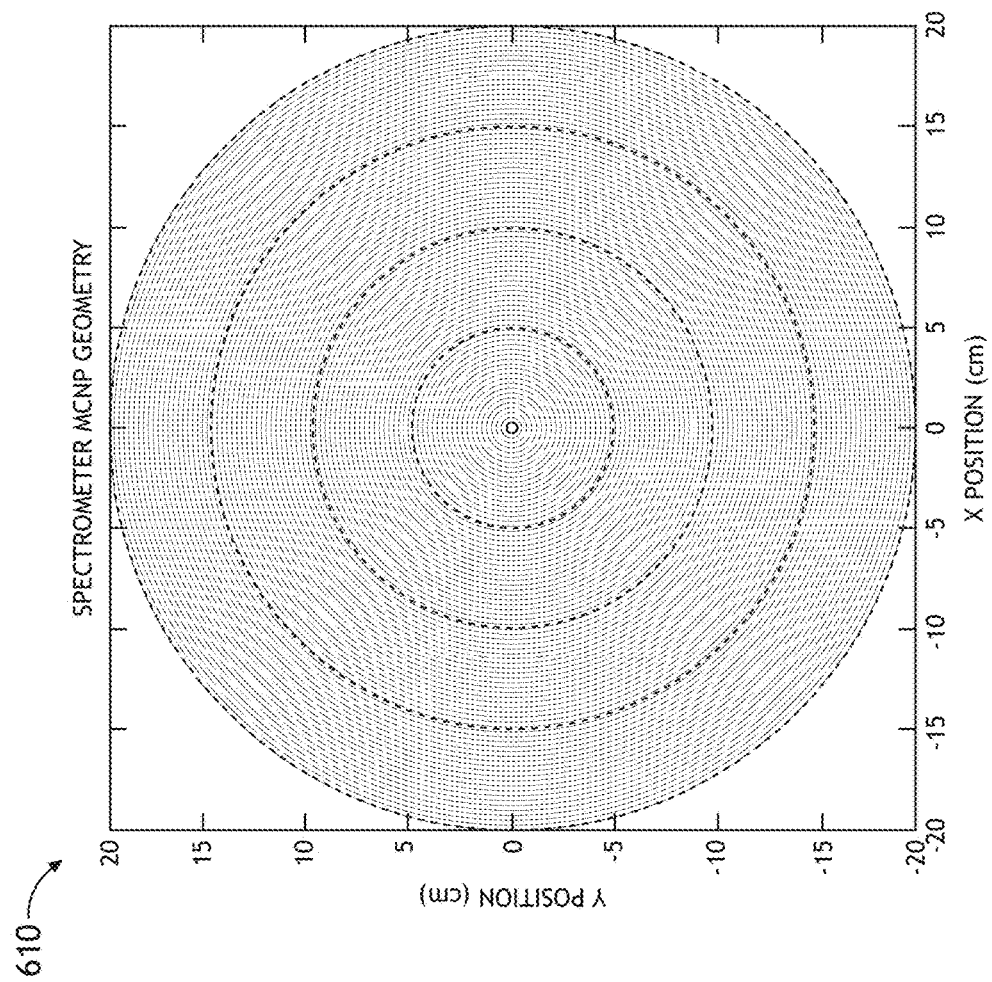
FIG. 6B illustrates a spherical modeling volume, in accordance with one or more embodiments of the present disclosure.

FIG. 6B illustrates a spherical modeling volume 610. Each dashed line corresponds to a cadmium absorber shell. Each solid black line corresponds to a virtual detector shell. This is the "seed" of the genetic algorithm. It may only choose from those virtual detector shells (black lines) which correspond to a response function. This example is for a 20 cm spherical moderator with cadmium shells of 0.5 mm thickness at every 5 cm mark within the sphere. The sphere was divided into 400 shells, also 0.5 mm thick, to represent potential positions for detector placement. Although the area of each shell is not equivalent to a 1 cm2 MSND, the response functions are normalized to the surface area of each shell to account for area.

Figure 6C:
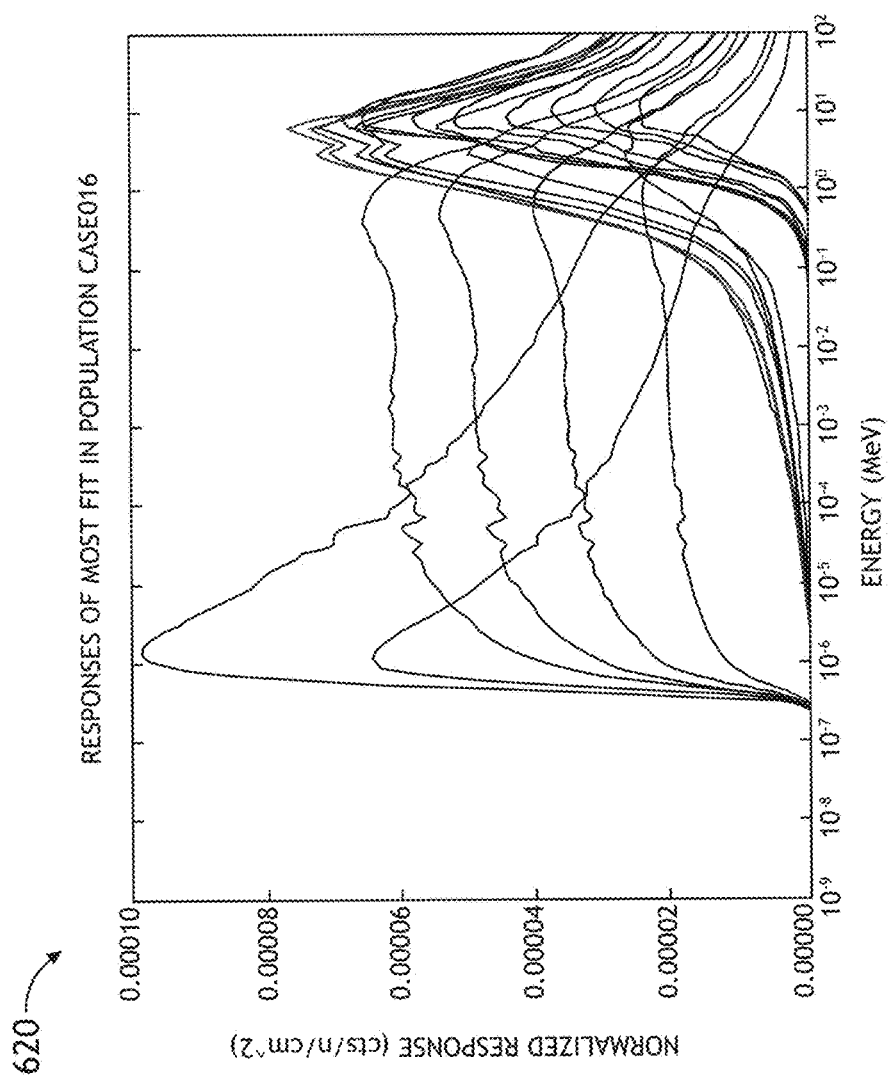
FIG. 6C illustrates a graph of response functions that correspond to the most fit detector selections chosen by a genetic algorithm, in accordance with one or more embodiments of the present disclosure.

FIG. 6C illustrates a graph 620 of response functions that correspond to the most fit detector selections chosen by the genetic algorithm (see below). This is the actual final spectrometer response matrix generated by the genetic algorithm.

Figure 6D:
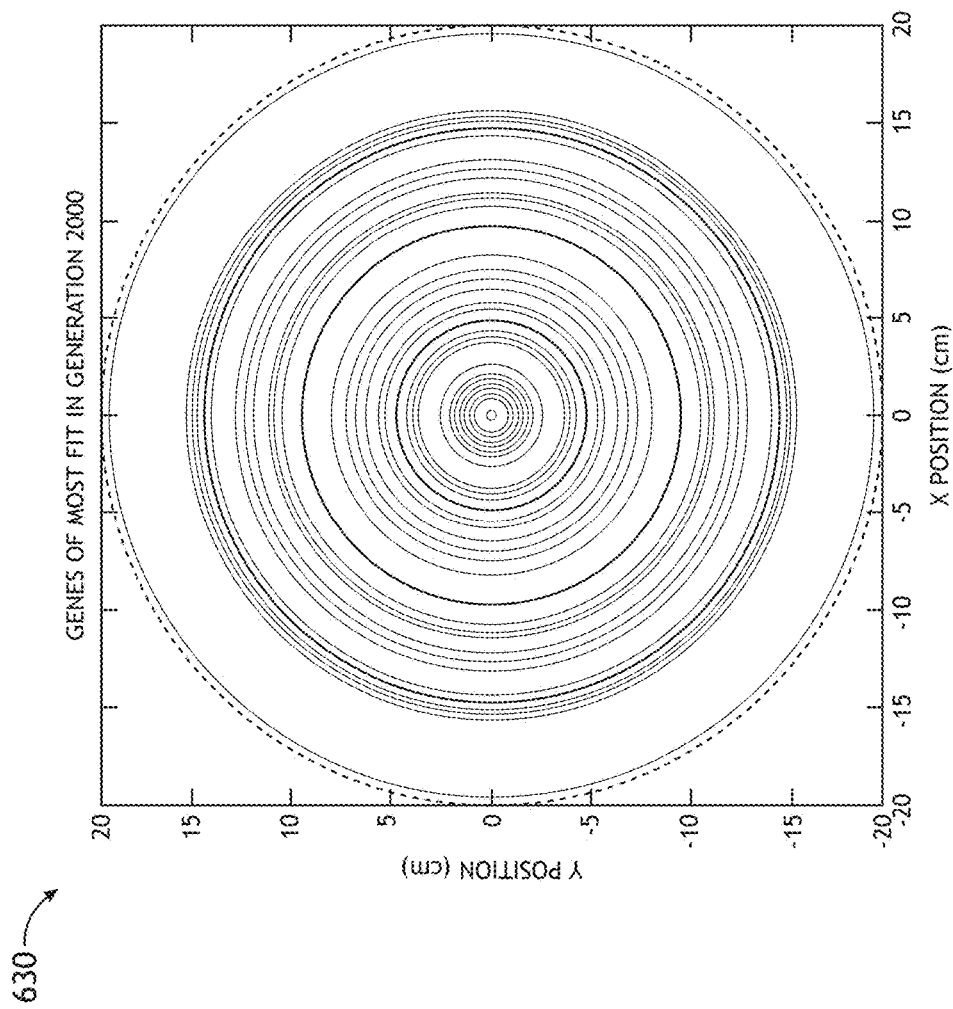
FIG. 6D illustrates an output of a genetic algorithm, in accordance with one or more embodiments of the present disclosure.

FIG. 6D illustrates an output of the genetic algorithm. When the genetic algorithm finishes, there are X number of detector positions selected as the most optimal configuration of detector placement within the moderating absorber shells. This diagram represents this "most fit" configuration.

FIGS. 7A-7E illustrate the use of a shadow shield, in accordance with one or more embodiments of the present disclosure. The presence of background and/or room-scattered neutrons can contribute negatively to a spectrometer's ability to correctly identify and locate a source of interest. Neutrons that enter into the spectrometer through undesired faces (i.e. other than the front face of the system) that are counted are indistinguishable from those that enter through the front face of the detector with high energy. The result of this phenomenon is an incorrectly shifted energy spectrum. A simple, though problematic, solution is to shield the detector system on all sides that are not the front face using moderator-absorber combination. These materials may include borated polyethylene and/or moderator-cadmium alternating pairs. Shielding materials of this type are heavy, which is an undesirable characteristic for a portable device. Furthermore, though energy-spectrum information is preserved, directionality is lost and the device becomes blind to sources that are not directly in front of the detector. A second potential solution is the addition of a witness detector that is constructed exactly as the individual elements of the spectrometer, but whose count rate is considered separately from other spectrometer detector elements. The witness detector would be blind to line-of-sight neutrons and would thus yield background and room scatter neutrons. Described here are these two potential solutions to the issue of background and/or room scattered neutrons.

The use of a 'shadow shield' would yield the line-of-sight neutron contribution by reducing a shielded measurement from the total measurement. The shadow shield would be used to yield information about the background and room-scattered neutrons by eliminating the line-of-sight contribution to the count rate. F the location of the source under investigation is known, a shadow shield placed between the spectrometer/detector and the source allows for accurate measurement of the room scatter and background neutron contribution, shown in FIG. 7A. The line-of-sight contribution can then be determined by subtracting the shadow shield measurement from the total measurement, effectively calibrating background and room-scatter contributions from the spectral data. The shadow shield can be comprised of many materials, but should primarily consist of alternating neutron moderator, neutron absorber layers to thermalize and absorb incident neutrons (see FIG. 7B). An example of a shadow shield is shown in FIG. 7A and an expected response is shown in FIG. 7C.

Figure 7A:
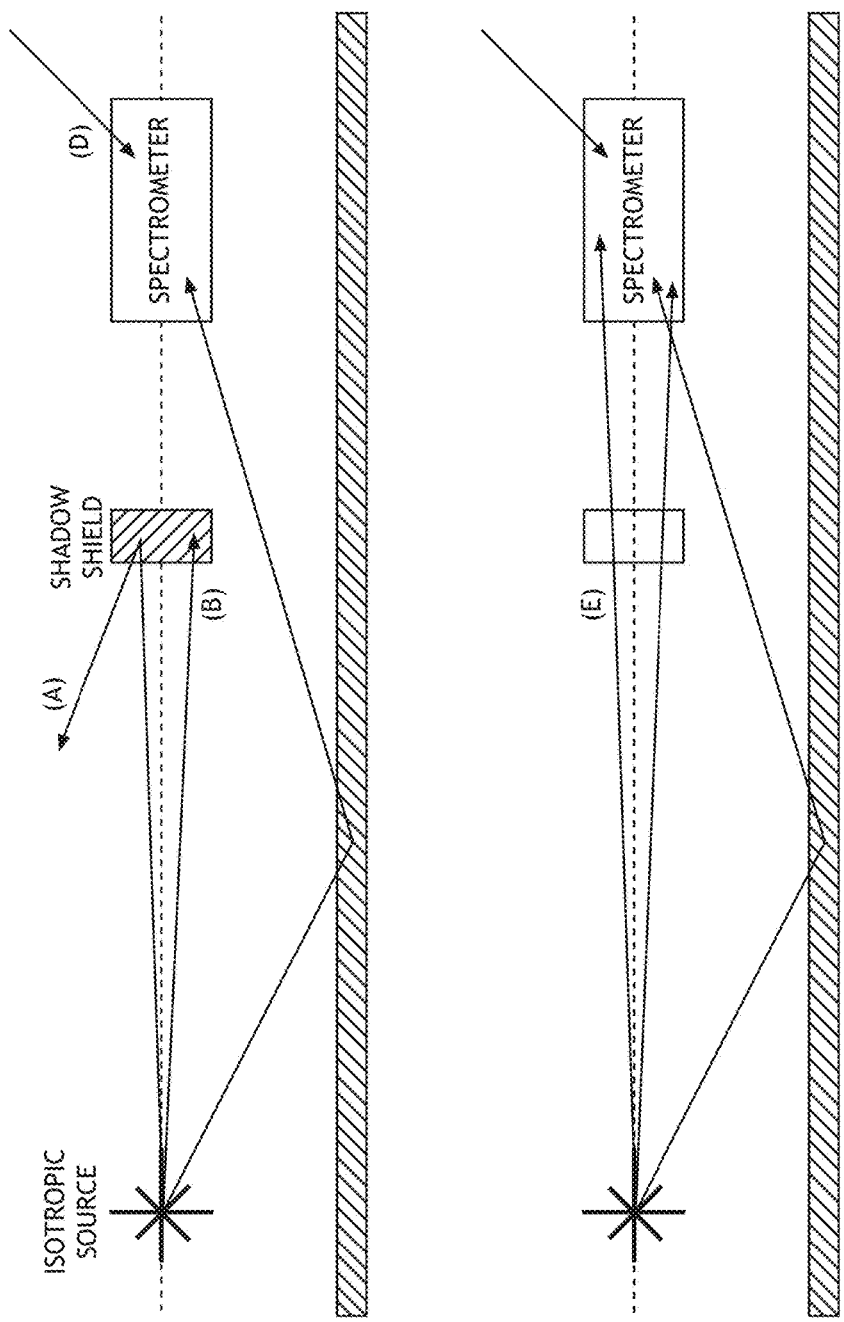
FIG. 7A illustrates a conceptual view of the implementation a shadow shield in a detection system, in accordance with one or more embodiments of the present disclosure.

As shown in FIG. 7A, the deployment of a 'shadow shield' is depicted, where background and room-scattered neutron measurements are reduced from the line-of-sight information. Shown in FIG. 7A: (A) depicts neutrons emitted from the source towards the detector that are scattered away by the shield, (B) neutrons that are absorbed within the shield, (C) neutrons that are scatted from the surrounding environment into the detector, and (D) background neutrons. With the shadow shield removed, line-of-sight neutrons (E) can again be counted.

Figure 7B:
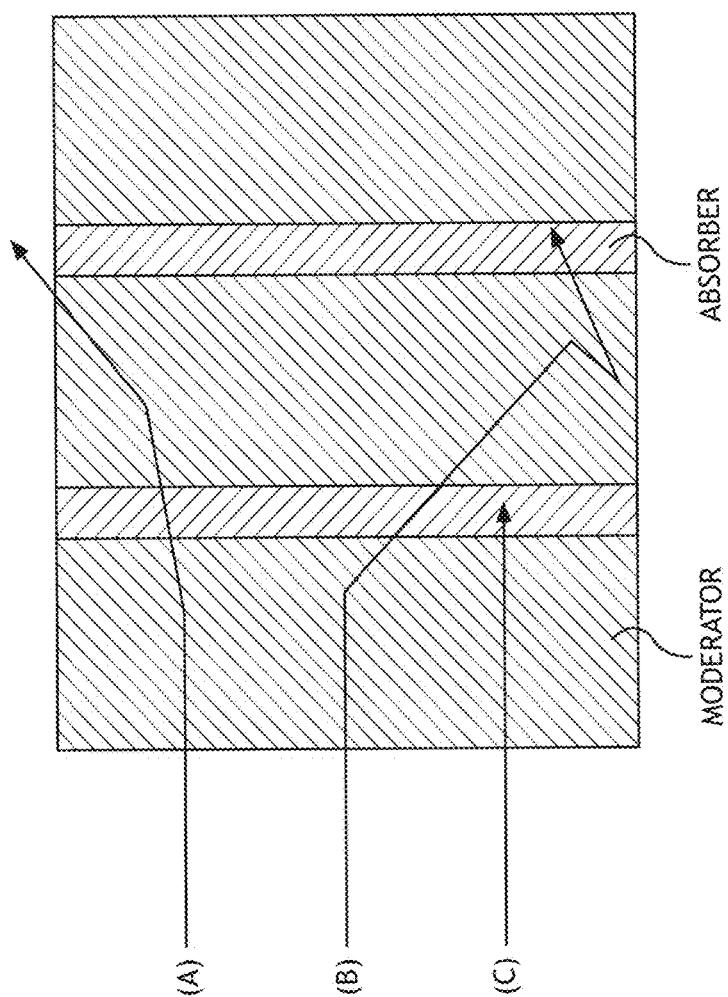
FIG. 7B illustrates a conceptual view of the implementation of alternating layers in a shadow shield in a detection system, in accordance with one or more embodiments of the present disclosure.

Also depicted is a schematic of a possible shadow shield, populated with alternating layers of neutron moderator and neutron absorber. The moderator materials used can include, but are not limited to, high-density polyethylene, water, and wax and the absorber materials can include cadmium, boron-10, and lithium-6. The materials can also include those wherein absorbing material is included within the moderator matrix such as borated or lithiated polyethylene. As shown in FIG. 7B, are the various cases of neutron transport through the shield, where (A) high-energy neutrons are scattered out of the shield, away from the detector, (B) high-energy neutrons are thermalized and absorbed within an absorbing medium, and (C) low-energy neutrons are absorbed without other interaction within the shield.

Figure 7C:
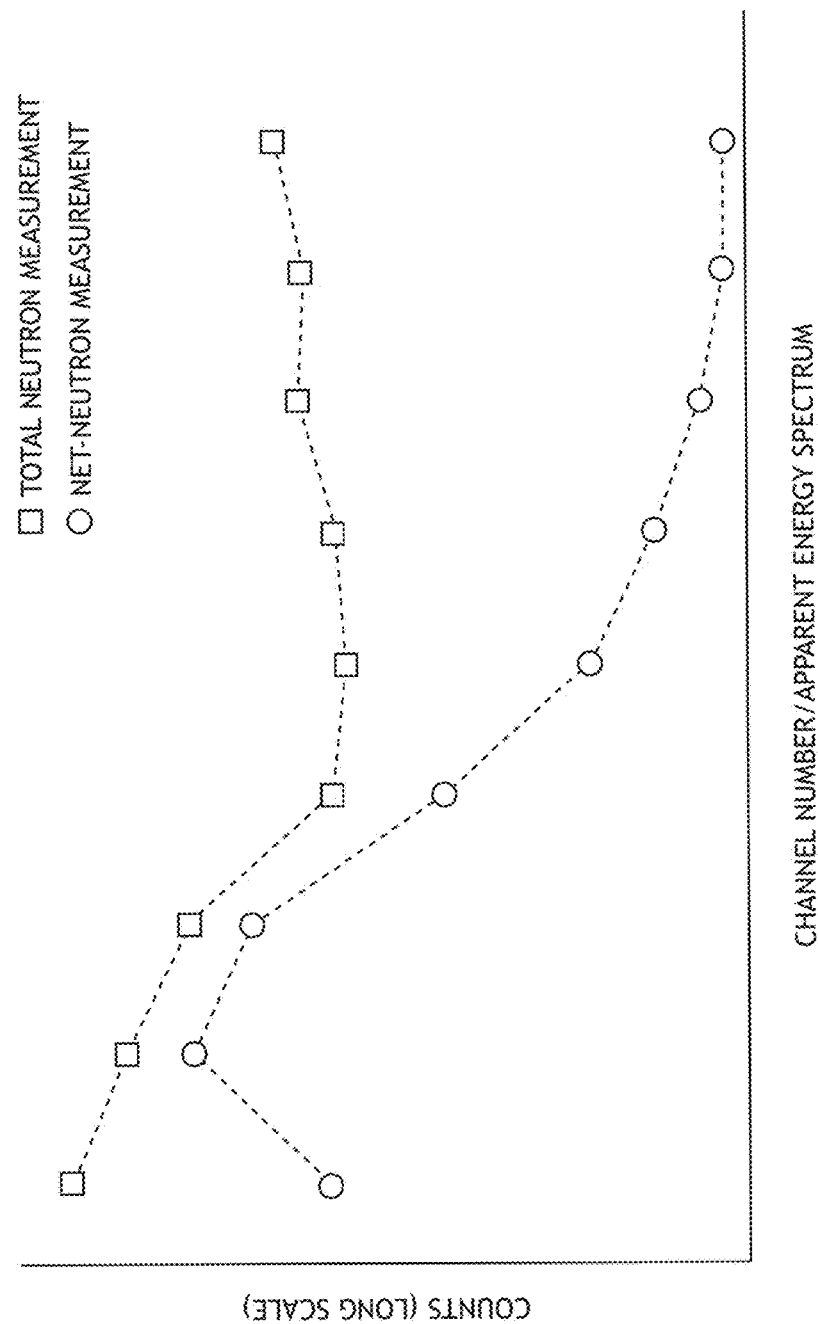
FIG. 7C illustrates a possible output spectrum from two separate measurements of an isotropically-emitting neutron source within a closed, concrete environment, in accordance with one or more embodiments of the present disclosure.

FIG. 7C depicts a possible output spectrum from two separate measurements of an isotropically-emitting neutron source within a closed, concrete environment. The 'total neutron measurement' is the result of a combination of line-of-sight, background, and room-scattered neutrons. The 'net-neutron measurement' is produced by subtracting the count rates of each channel reported with the shadow shield in place from those from the 'total neutron measurement' The resulting spectrum is the neutron energy spectrum emitted by the source.

Figure 7D:
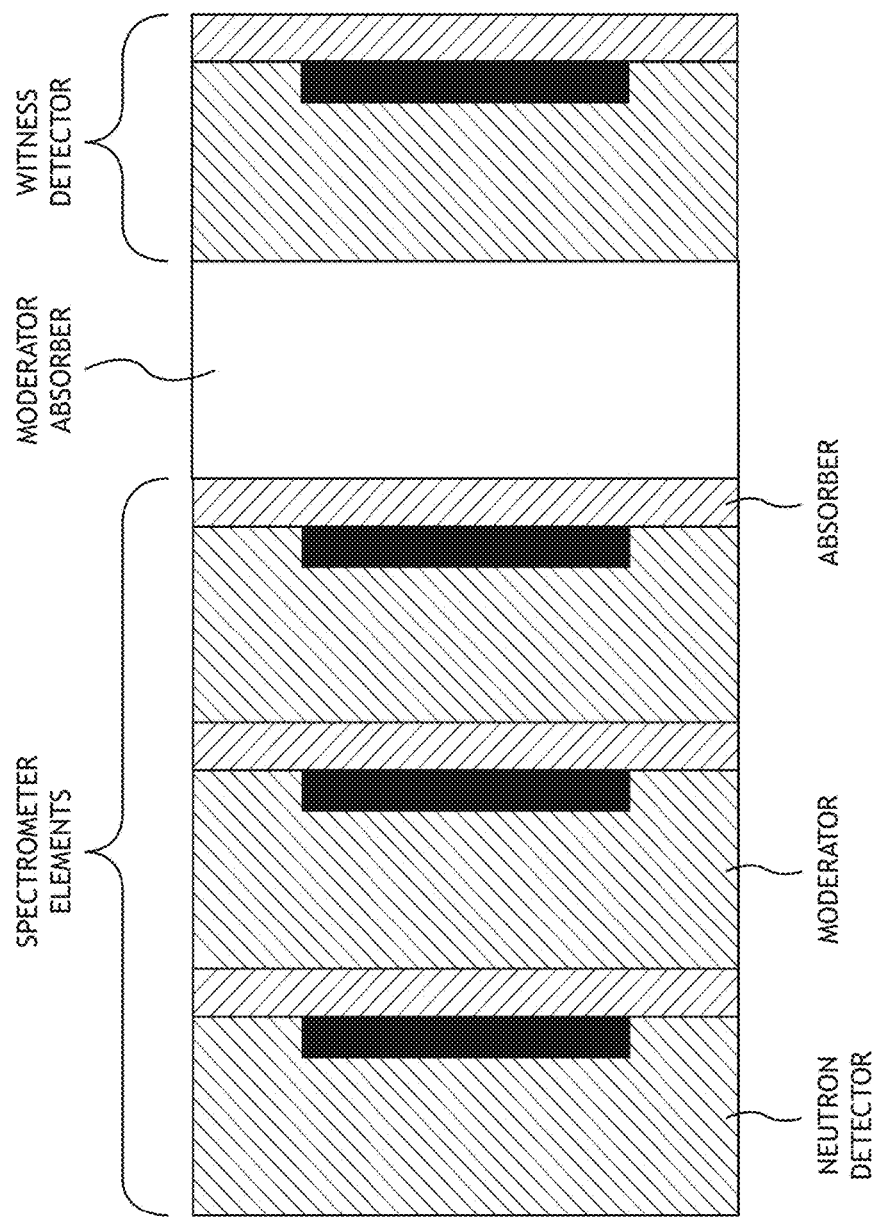
FIG. 7D illustrates a schematic view of a detection system depicting a witness detector placed directly on a main spectrometer assembly, in accordance with one or more embodiments of the present disclosure.
Figure 7E:
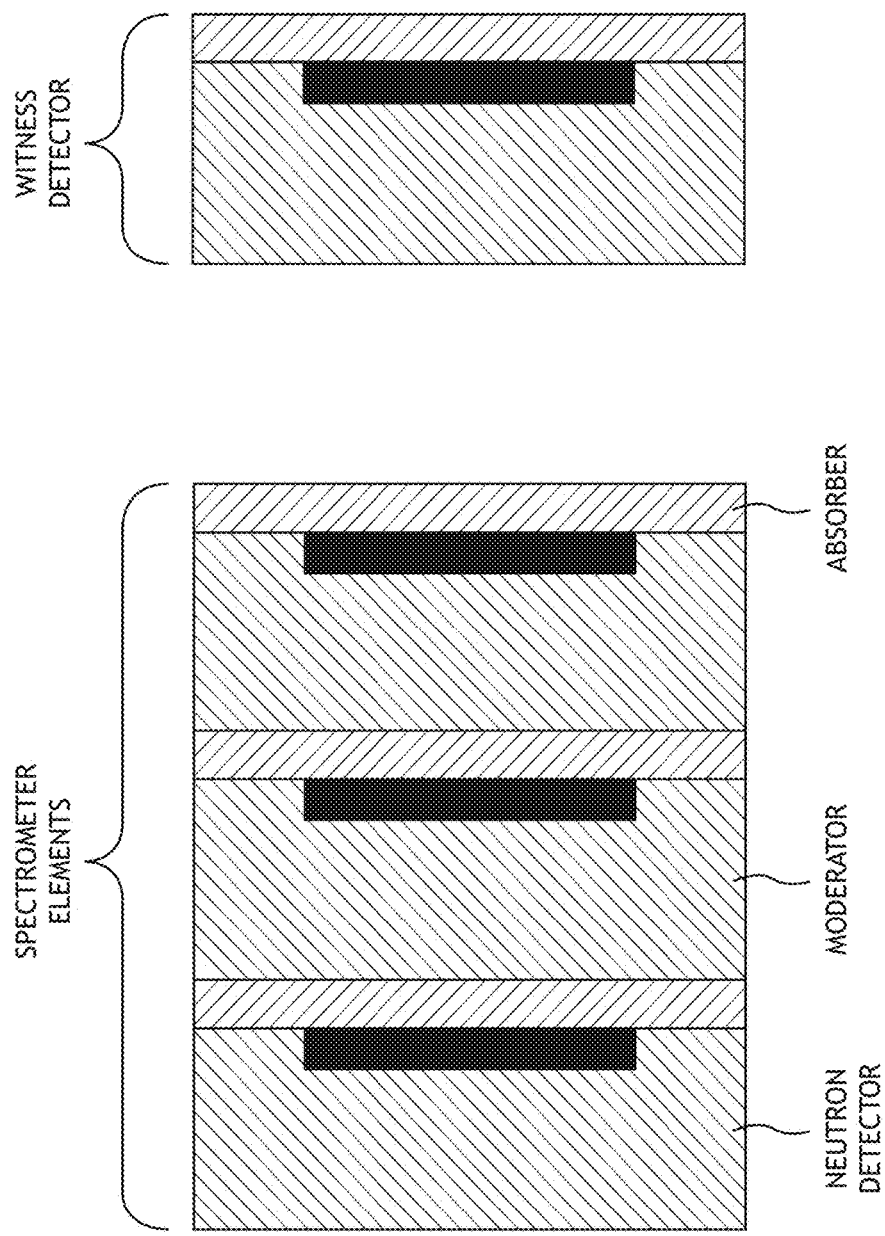
FIG. 7E illustrates a schematic view of a detection system depicting a witness detector placed separately from a main spectrometer assembly, in accordance with one or more embodiments of the present disclosure.
Figure 7F:
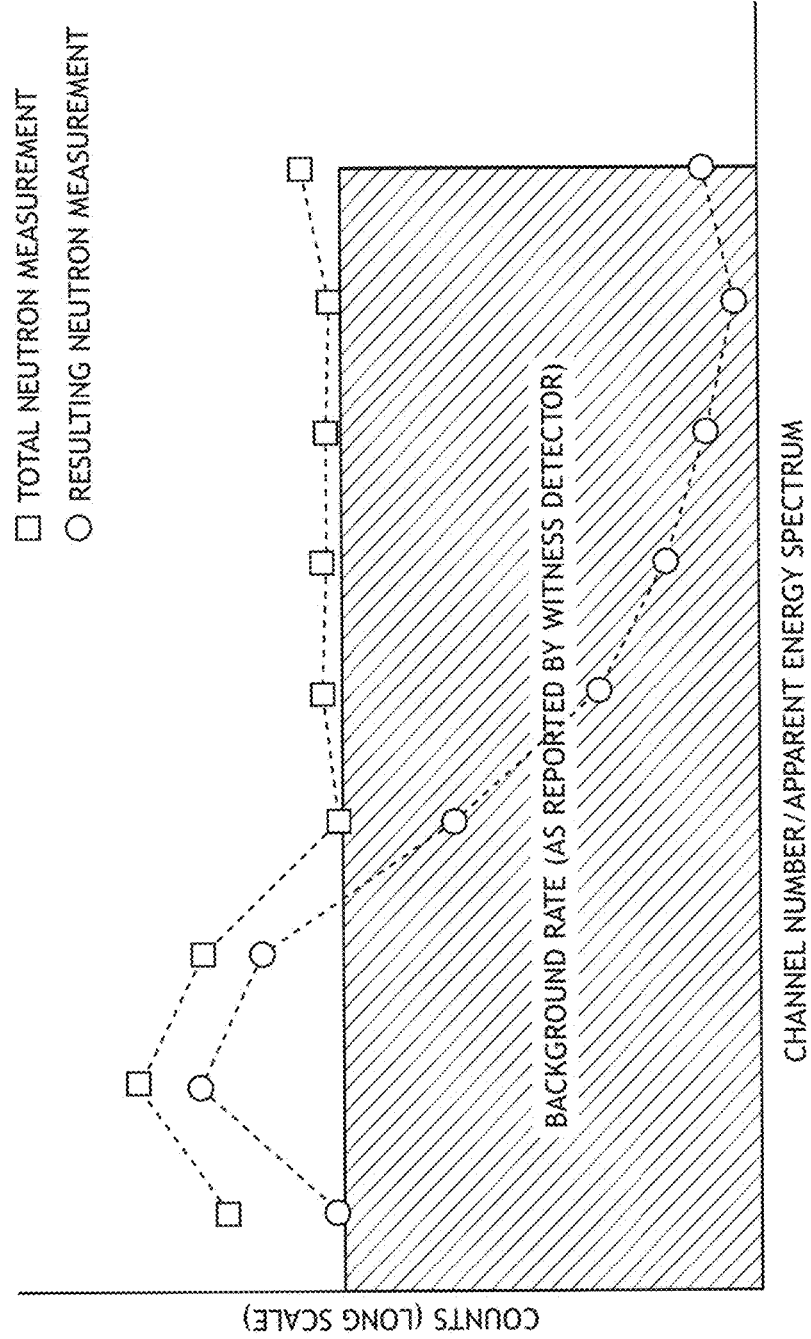
FIG. 7F illustrates a possible output spectrum from a single measurement, corrected in real time based on the reported count rate of a separate detector element in accordance with one or more embodiments of the present disclosure.

Though the deployment of a shadow shield yields good results, the downfalls of the shadow shield method for reducing background are increased measurement time and increased detector weight. In order to produce a well-calibrated spectrum, two measurements are required which effectively doubles the necessary investigation time for a given source. This is assuming that the location of the source is even known to the user at the time of the measurement. Furthermore, the added weight of the shadow shield can be significant and represent a large fraction of the total weight of the system. To mitigate these issues, a 'witness' detector can be added to the system whose sole purpose is to continually measure and subtract background and room-scattered neutron contribution. This witness detector can be included on the detector assembly itself or can be kept separate from the assembly and is constructed exactly as the other elements of the spectrometer, as shown in FIG. 7D-7E. The witness detector will produce a single count rate that is then subtracted from each channel individually, as shown in FIG. 7F. The witness detector, by design, will have the similar sensitivity to the ambient neutron flux as the constituent detectors of the spectrometer (or close enough that a correction factor may be applied) that the correction can be made in real-time, greatly reducing measurement times and detector weight.

FIG. 7D depicts a schematic of a witness detector placed directly on the main spectrometer assembly. The count rate reported by the spectrometer will represent solely the background- and room-scattered neutron contribution with property designed shielding. In order to determine the net count rate from the spectrometer elements, the count rate reported by the witness detector is subtracted from each of their 'total' count rates to produce their 'net' count rate.

FIG. 7E depicts a schematic of a witness detector placed separately from the main spectrometer assembly. The count rate reported by the spectrometer will represent solely the background- and room-scattered neutron contribution with property designed shielding. In order to determine the net count rate from the spectrometer elements, the count rate reported by the witness detector is subtracted from each of their 'total' count rates to produce their 'net' count rate.

FIG. 7F depicts a schematic of a possible output spectrum from a single measurement, which is corrected in real time based on the reported count rate of a separate detector element. The raw count rates (reported as 'Total Neutron Measurement') are the count rates reported by each element within the spectrometer. These count rates include line-of-sight, background, and room-scattered neutrons. The witness detector count rate (shown as 'Background Rate') is removed from line-of-sight and therefore only includes contributions from background and room-scattered neutrons. The witness detector count rate is subtracted from the raw spectrometer count rate, producing the 'Resulting Neutron Spectrum' output.

FIG. 8A illustrates a system 800 for mapping a location of a neutron source 101 to imagery data, in accordance with one or more embodiments of the present disclosure. It is noted that the various method and system embodiments described previously herein should be interpreted to extend to system 800. In this embodiment, system 800 includes one or more cameras 802 communicatively coupled to the analyzer. The one or more cameras 802 are configured to acquire one or more images containing the one or more neutron sources. For example, the one or more cameras 802 may include, but are not limited to, one or more CCD detectors, TDI-CCD detectors or the like. Further, the one or more cameras 802 may obtain imagery data that contains one or more neutron sources 101. h turn, based on the direction/location determination carried out by the analyzer 108, as discussed previously herein, the analyzer 108 may further map the location of the neutron source 101 onto the image obtained by the one or more cameras 802.

Figure 8B:
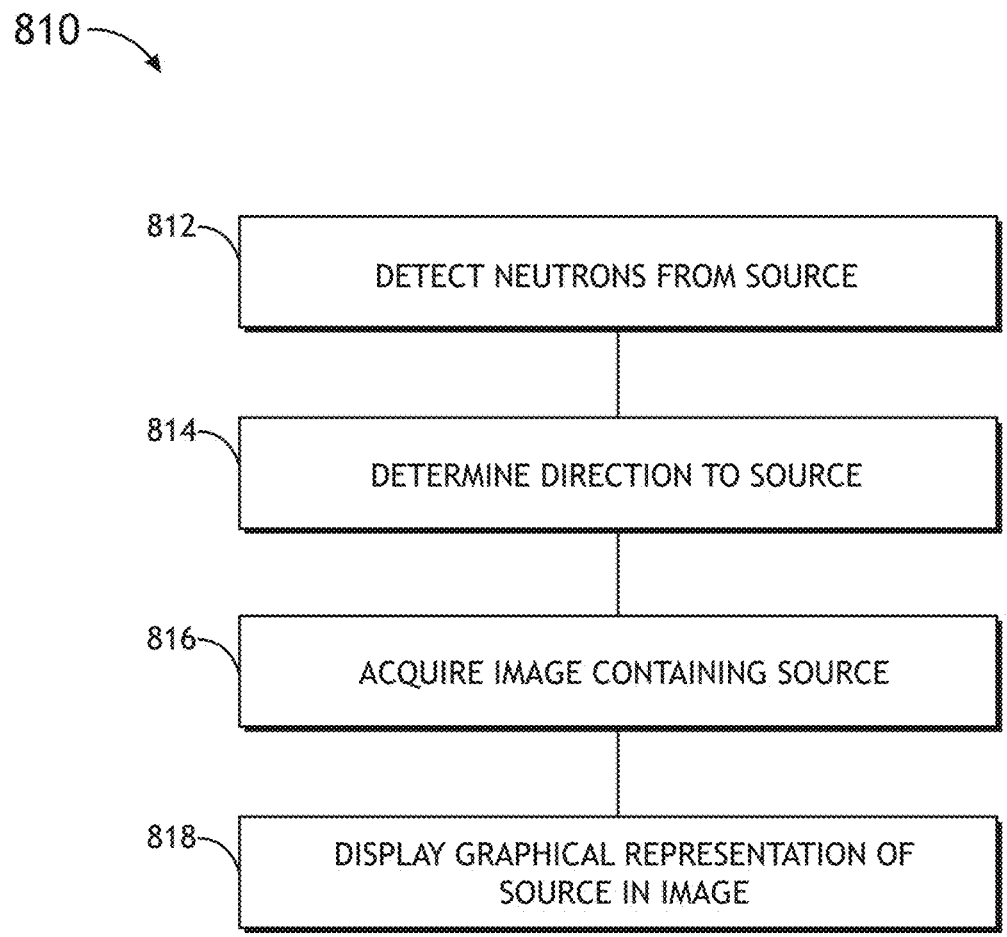
FIG. 8B illustrates a process flow diagram depicting a method for mapping a location of a neutron source to imagery data, in accordance with one or more embodiments of the present disclosure.

FIG. 8B illustrates a method 810 for mapping a location of a neutron source 101 to imagery data, in accordance with one or more embodiments of the present disclosure. In step 812, one or more neutrons emanating from a neutron source 101 are detected with the neutron detector/spectrometer 102.

In step 814, a direction to or the location of the neutron source 101 is determined by the analyzer 108 using any of the methodologies described previously herein. In step 816, one or more images of containing the one or more neutron sources 101 are acquired. In step 818, a graphical representation of the one or more neutron sources is displayed in the image acquired in step 816. In this regard, the one or more neutron sources may be represented on the user interface 116 (or other display) as a neutron "hot spot," which is overlaid the imagery data of a field view that contains the one or more neutron sources.

It is further recognized that the system 800 is not limited to the detection of neutrons and may be extended to any of the neutron/photon detection/spectroscopy embodiments described previously herein. For example, the camera 802 may be implemented in the context of system 120 of FIG. 1B.

Figure 9:
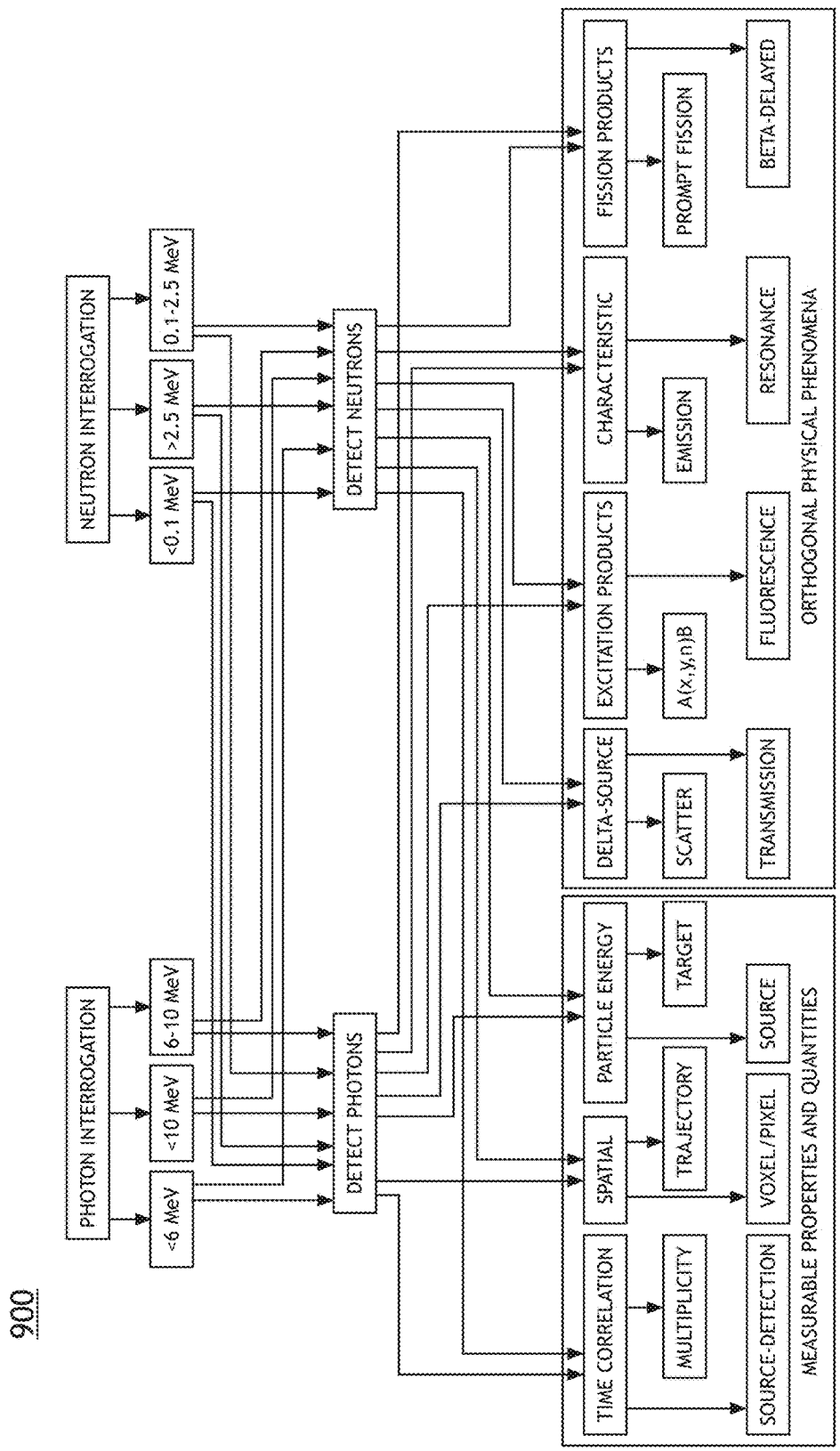
FIG. 9 depicts an active neutron and/or photon source interrogation process, in accordance with one or more embodiments of the present disclosure.

FIG. 9 depicts a block diagram of an active neutron and/or photon source interrogation process, in accordance with one or more embodiments of the present disclosure. The neutron/gamma spectrometer system 100 may also measure unique signatures of isotopes excited by either photons, neutrons, or any other irradiative particle. These signatures can be fission products or a number of other reactions that result in the emission of measureable neutrons or gammas when a target isotope is irradiated. These emissions can be detected by the neutron/gamma spectrometer and resolved in energy, time, and direction to provide a signature unique to the presence of a specific isotope or reaction. The ability of this spectrometer to resolve these emissions in all three available dimensions (energy, time, and direction/spatial) allows this spectrometer to be uniquely suited for use in active interrogation applications. The methods to determine the time, energy, and direction of the incident neutrons are described in other sections. The methods to determine the time and energy of incident gammas are described in other sections. FIG. 9 depicts an overview of pathways for active interrogation. Top to bottom: The process begins with a source of either neutrons or photons and which can be categorized into specific energy ranges due to the nature of interactions of given interrogation particle energies. Then photons or neutrons are detected with the neutron/gamma spectrometer. On the left hand side of FIG. 9, the actual measureable physical properties of the emission particles are shown, as follows: 1) Time correlation: measuring the time of detection relative to either the interrogating source time, or relative to other detection times; 2) Spatial: measuring the trajectory or incident direction of a particle in order to locate the source of the neutrons, or by using multiple spectrometers and/or sources, resolving the emissions with 3D resolution; 3) Particle energy: resolving the energy of the interrogating source or the target isotopes emissions.

In the present disclosure, the methods disclosed may be implemented as sets of instructions or software readable by a device embodied in a tangible media, such as memory. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

Those having skill in the art will recognize that the state-of-the-art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or analyzers including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). h those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. An apparatus for determination of one or more neutron source characteristics comprising:
    a neutron detector including:
        a plurality of neutron detector assemblies, each of the neutron detector assemblies including a plurality of neutron detection devices, wherein the neutron detection devices are configured to detect one or more characteristics of neutrons emanating from one or more neutron sources and impinging on one or more neutron detection devices; and
        a moderating volume, wherein the plurality of neutron detector assemblies are disposed within the moderating volume so as to form a three-dimensional array of neutron detection devices within the moderating volume, wherein the moderating volume is configured to moderate the energy of neutrons impinging on one or more of the neutron detector assemblies; and
    an analyzer communicatively coupled to each of the neutron detection devices of the plurality of neutron detector assemblies, the analyzer configured to:
        receive one or more measured response signals from each of the neutron detection devices, the one or more measured response signals indicative of a detected neutron event; and
        perform one or more analysis procedures to determine one or more characteristics associated with the one or more neutron sources based at least on the received one or more measured response signals.

2. The apparatus of claim 1, wherein the moderating volume comprises:
    a plurality of discrete moderating elements, wherein each of the discrete moderating elements is disposed proximate to at least one neutron detector assembly.

3. The apparatus of claim 2, wherein the plurality of neutron detector assemblies and the plurality of discrete moderating elements disposed along a common axis.

4. The apparatus of claim 1, wherein the control system is configured to:
    determine a direction of emanation of neutrons from the one or more neutron sources based on the received one or more measured response signals associated with one or more neutron detection events.

5. The apparatus of claim 1, wherein the analyzer is configured to:
    determine a neutron dose of one or more neutrons emanating from the one or more neutron sources based on the received one or more measured response signals.

6. The apparatus of claim 1, wherein the analyzer is configured to:
    identify one or more neutron sources based on the received one or more measured response signals.

7. The apparatus of claim 1, wherein the analyzer is configured to:
    determine a local shielding configuration of the one or more neutron sources based on the received one or more measured response signals.

8. The apparatus of claim 1, wherein the analyzer is configured to:
    determine the kinetic energy of one or more neutrons emanating from the one or more neutron sources based on the received one or more measured response signals.

9. The apparatus of claim 1, wherein the analysis procedure performed by the analyzer comprises:
    a template-matching procedure to determine at least one a direction of emanation of neutrons from the one or more neutron sources, a neutron dose associated with the one or more neutron sources or the type of the one or more neutron sources.

10. The apparatus of claim 9, wherein the template-matching procedure comprises:
    at least one of a cross-correlation procedure or a goodness-of-fit procedure.

11. The apparatus of claim 1, wherein the analysis procedure performed by the analyzer comprises:
    a spatial analysis procedure to determine at least one a direction of emanation of neutrons from the one or more neutron sources or the type of the one or more neutron sources.

12. The apparatus of claim 11, wherein the spatial analysis procedure comprises:
    at least one of a vectorization procedure or a detector volume ratio procedure.

13. The apparatus of claim 1, wherein the analysis procedure performed by the analyzer comprises:
    a machine learning procedure to determine at least one a direction of emanation of neutrons from the one or more neutron sources, a neutron dose associated with one or more neutrons emanating from the one or more neutron sources, a kinetic energy associated with one or more neutrons emanating from the one or more neutron sources or the type of the one or more neutron sources.

14. The apparatus of claim 13, wherein the machine learning procedure comprises:
    at least one of an artificial neural network or a genetic algorithm.

15. The apparatus of claim 1, wherein the analyzer is configured to:
    generate a detector response library, wherein the detector response library includes one or more sets of data indicative of a response of the neutron detector to one or more known neutron sources;
    acquire one or more measured neutron response signals from each of the neutron detection devices, the one or more measured response signals responsive to a detected neutron event; and
    determine one or more characteristics of neutrons emanating from a measured neutron source by comparing the one or more measured neutron response signals to the detector response library.

16. The apparatus of claim 1, further comprising:
    one or more cameras communicatively coupled to the analyzer, wherein the one or more cameras are configured to acquire one or more images containing the one or more neutron sources.

17. The apparatus of claim 16, wherein the analyzer is further configured to map a location of the one or more neutron sources to the one or more images acquired by the one or more cameras.

18. The apparatus of claim 1, wherein the detected neutron event comprises:
at least one of a neutron absorption event, a neutron-induced fission event or a neutron scattering event.

19. The apparatus of claim 1, wherein at least some of the neutron detection devices comprise:
at least one of a gas-based high thermal-neutron detection efficiency detector or a semiconductor-based high thermal-neutron detection efficiency detector.

20. The apparatus of claim 19, wherein at least some of the neutron detection devices comprise:
a microstructured semiconductor neutron detector (MSND).

21. The apparatus of claim 1, further comprising:
an additional neutron detector, wherein the analyzer is configured to determine a location of the one or more neutron sources based on the determined direction from first detector and a determined direction from the additional detector.

22. A neutron detector comprising:
a plurality of neutron detector assemblies, each of the neutron detector assemblies including a plurality of neutron detection devices, wherein the neutron detection devices are configured to detect one or more characteristics of neutrons emanating from one or more neutron sources and impinging on one or more neutron detection devices; and
a moderating volume, wherein the plurality of neutron detector assemblies are disposed within the moderating volume so as to form a three-dimensional array of neutron detection devices within the moderating volume, wherein the moderating volume is configured to moderate the energy of neutrons impinging on one or more of the neutron detector assemblies.

23. An apparatus for determination of one or more neutron source characteristics comprising:
a neutron-photon detector including:
a plurality of neutron-photon detector assemblies, each of the neutron-photon detector assemblies including a plurality of detection devices, wherein the detection devices are configured to detect one or more characteristics of at least one of neutrons or photons emanating from one or more neutron sources and impinging on one or more of the detection devices;
a moderating volume, wherein the plurality of neutron-photon detector assemblies are disposed within the moderating volume so as to form a three-dimensional array of detection devices within the moderating volume, wherein the moderating volume is configured to moderate the energy of neutrons impinging on one or more of the neutron detector assemblies; and
an analyzer communicatively coupled to each of the detection devices of the plurality of neutron-photon detector assemblies, the analyzer configured to:
receive one or more measured response signals from each of the detection devices, the one or more measured response signals indicative of at least one of a detected neutron event or a detected photon event; and
determine one or more characteristics of the one or more neutron sources based on the received one or more measured response signals.

24. The apparatus of claim 23, wherein the moderating volume comprises:
a plurality of discrete moderating elements, wherein each of the discrete moderating elements is disposed proximate to at least one neutron-photon detector assembly.

25. The apparatus of claim 24, wherein the plurality of neutron-photon detector assemblies and the plurality of discrete moderating elements are disposed along a common axis.

26. The apparatus of claim 23, wherein at least some of the detection devices comprise:
one or more neutron-photon detection devices, wherein the neutron-photon detection devices are sensitive to neutrons and photons.

27. The apparatus of claim 23, wherein at least some of the detection devices comprise:
one or more neutron detection devices.

28. The apparatus of claim 23, wherein at least some of the neutron detection devices comprise:
at least one of a gas-based high thermal-neutron detection efficiency detector or a semiconductor-based high thermal-neutron detection efficiency detector.

29. The apparatus of claim 28, wherein at least some of the neutron detection devices comprise:
a microstructured semiconductor neutron detector (MSND).

30. The apparatus of claim 23, wherein at least some of the detection devices comprise:
one or more photon detection devices.

31. The apparatus of claim 30, wherein at least some of the detection devices comprise:
one or more scintillator-type photon detection devices.

32. The apparatus of claim 23, wherein the analyzer is configured to:
determine a direction of emanation of neutrons from the one or more neutron sources based on the received one or more measured response signals.

33. The apparatus of claim 23, wherein the analyzer is configured to:
determine a neutron dose of one or more neutrons emanating from the one or more neutron sources based on the received one or more measured response signals.

34. The apparatus of claim 23, wherein the analyzer is configured to:
identify one or more neutron sources based on the received one or more measured response signals.

35. The apparatus of claim 23, wherein the analyzer is configured to:
determine a local shielding configuration of the one or more neutron sources based on the received one or more measured response signals.

36. The apparatus of claim 23, wherein the analyzer is configured to:
determine the kinetic energy of one or more neutrons emanating from the one or more neutron sources based on the received one or more measured response signals.

37. The apparatus of claim 23, wherein the analysis procedure performed by the analyzer comprises:
a template-matching procedure to determine at least one a direction of emanation of neutrons from the one or more neutron sources, a neutron dose associated with the one or more neutron sources or the type of the one or more neutron sources.

38. The apparatus of claim 37, wherein the template-matching procedure comprises:
at least one of a cross-correlation procedure or a goodness-of-fit procedure.

39. The apparatus of claim 23, wherein the analysis procedure performed by the analyzer comprises:
a spatial analysis procedure to determine at least one a direction of emanation of neutrons from the one or more neutron sources or the type of the one or more neutron sources.

40. The apparatus of claim 39, wherein the spatial analysis procedure comprises:
at least one of a vectorization procedure or a detector volume ratio procedure.

41. The apparatus of claim 23, wherein the analysis procedure performed by the analyzer comprises:
a machine learning procedure to determine at least one a direction of emanation of neutrons from the one or more neutron sources, a neutron dose associated with one or more neutrons emanating from the one or more neutron sources, a kinetic energy associated with one or more neutrons emanating from the one or more neutron sources or the type of the one or more neutron sources.

42. The apparatus of claim 41, wherein the machine learning procedure comprises:
at least one of an artificial neural network or a genetic algorithm.

43. The apparatus of claim 23, wherein the analyzer is configured to:
generate a detector response library, wherein the detector response library includes one or more sets of data indicative of a response of the neutron-photon detector to one or more known neutron sources;
acquire one or more measured response signals from each of the detection devices; and
determine one or more characteristics of neutrons emanating from a measured neutron source by comparing the one or more measured response signals to the detector response library.

44. The apparatus of claim 23, further comprising:
one or more cameras communicatively coupled to the analyzer, wherein the one or more cameras are configured to acquire one or more images containing the one or more neutron sources.

45. The apparatus of claim 44, wherein the analyzer is further configured to map a location of the one or more neutron sources to the one or more images acquired by the one or more cameras.

46. The apparatus of claim 23, wherein the detected neutron event comprises:
at least one of a neutron absorption event, a neutron-induced fission event or a neutron scattering event.

47. An apparatus for determination of one or more neutron source characteristics comprising:
a neutron detector including:
a plurality of neutron detector assemblies, each of the neutron detector assemblies including a plurality of neutron detection devices, wherein the neutron detection devices are configured to detect one or more characteristics of neutrons emanating from one or more sources and impinging on one or more of the neutron detection devices;
a moderating volume, wherein the plurality of neutron detector assemblies are disposed within the moderating volume so as to form a three-dimensional array of neutron detection devices within the moderating volume;
a photon detector disposed at a location remote from the neutron detector; and
an analyzer communicatively coupled to each of the neutron detection devices of the plurality of neutron detector assemblies, the analyzer communicatively coupled to the photon detector, the analyzer configured to:
receive one or more measured neutron response signals from each of the neutron detection devices, the one or more measured response signals indicative of a detected neutron event;
receive one or more measured photon response signals from the photon detector indicative of a detected photon event;
determine one or more characteristics of the one or more neutron sources based on the received one or more measured neutron response signals and the received one or more measured photon response signals; and
perform a measurement fusion process on the one or more neutron response signals and the one or more photon response signals to form a combined response signal.

48. The apparatus of claim 47, wherein the moderating volume comprises:
a plurality of discrete moderating elements, wherein each of the discrete moderating elements is disposed proximate to at least one neutron detector assembly.

49. The apparatus of claim 48, wherein the plurality of neutron detector assemblies and the plurality of discrete moderating elements are disposed along a common axis.

50. The apparatus of claim 47, wherein analyzer is further configured to:
perform a measurement fusion process on the one or more neutron response signals and the one or more photon response signals to form a combined response signal.

51. The apparatus of claim 47, wherein at least some of the neutron detection devices comprise:
at least one of a gas-based high thermal-neutron detection efficiency detector or a semiconductor-based high thermal-neutron detection efficiency detector.

52. The apparatus of claim 51, wherein at least some of the neutron detection devices comprise:
a microstructured semiconductor neutron detector (MSND).

53. The apparatus of claim 47, wherein the photon detector comprise:
one or more scintillator-type photon detectors.

* * * * *